(12) United States Patent
Ishizeki et al.

(10) Patent No.: US 11,077,736 B2
(45) Date of Patent: Aug. 3, 2021

(54) VEHICULAR AIR CONDITIONER

(71) Applicant: SANDEN AUTOMOTIVE CLIMATE SYSTEMS CORPORATION, Isesaki (JP)

(72) Inventors: Tetsuya Ishizeki, Isesaki (JP); Yoshiyuki Okamoto, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 0 days.

(21) Appl. No.: 16/631,948

(22) PCT Filed: Jun. 18, 2018

(86) PCT No.: PCT/JP2018/023913
§ 371 (c)(1),
(2) Date: Jan. 17, 2020

(87) PCT Pub. No.: WO2019/021710
PCT Pub. Date: Jan. 31, 2019

(65) Prior Publication Data
US 2020/0171919 A1    Jun. 4, 2020

(30) Foreign Application Priority Data

Jul. 24, 2017   (JP) ............................ JP2017-142671

(51) Int. Cl.
*F25B 29/00* (2006.01)
*B60H 1/14* (2006.01)
*B60H 1/00* (2006.01)

(52) U.S. Cl.
CPC ......... *B60H 1/143* (2013.01); *B60H 1/00278* (2013.01); *B60H 1/00914* (2013.01); *B60H 1/00485* (2013.01)

(58) Field of Classification Search
CPC ............... B60H 1/143; B60H 1/00278; B60H 1/00914; B60H 1/00485
(Continued)

(56) References Cited

U.S. PATENT DOCUMENTS 6,430,951 B1 * 8/2002 Iritani ................ B60H 1/00021
62/229
2012/0241139 A1 * 9/2012 Katoh ..................... F25B 41/20
165/202

(Continued)

FOREIGN PATENT DOCUMENTS

DE   10 2013 206 630    10/2014
EP       2 554 410       2/2013
(Continued)

OTHER PUBLICATIONS

Office Action dated May 26, 2021 issued in Japanese Patent Application No. 2017-142671.

*Primary Examiner* — Davis D Hwu
(74) *Attorney, Agent, or Firm* — Cozen O'Connor

(57) ABSTRACT

A vehicular air conditioner is provided which is capable of heating a vehicle interior with heat of a battery and also preventing deterioration in heating performance due to a decrease in circulating refrigerant. The vehicular air conditioner includes a battery temperature adjustment device 61 to circulate a heat medium to thereby adjust the temperature of a battery 55 mounted on a vehicle. The battery temperature adjustment device 61 has a refrigerant-heat medium heat exchanger 64 to exchange heat between the refrigerant and the heat medium, and includes a check valve 30 to return the refrigerant flowing out from the refrigerant-heat medium heat exchanger 64 to a suction side of the compressor 2 and to obstruct the flow of the refrigerant flowing out from the (Continued)

refrigerant-heat medium heat exchanger 64 and directed toward an outdoor heat exchanger 7 and a heat absorber 9.

7 Claims, 40 Drawing Sheets

(58) Field of Classification Search
USPC .......................................................... 62/159
See application file for complete search history.

(56) References Cited

U.S. PATENT DOCUMENTS

| | | | |
|---|---|---|---|
| 2016/0116197 A1* | 4/2016 | Takeuchi | F25B 5/04 62/276 |
| 2016/0185185 A1* | 6/2016 | Suzuki | B60L 1/02 237/5 |

FOREIGN PATENT DOCUMENTS

| | | |
|---|---|---|
| JP | 2012-96634 | 5/2012 |
| JP | 2013-217631 | 10/2013 |
| JP | 2013-254725 | 12/2013 |
| JP | 2014-213765 | 11/2014 |
| JP | 2016-90201 | 5/2016 |
| JP | 2017-77880 | 4/2017 |
| JP | 2017-105425 | 6/2017 |

* cited by examiner

VEHICULAR AIR CONDITIONER

RELATED APPLICATIONS

This is a U.S. National Phase Application under 35 USC 371 of International Application PCT/JP2018/023913 filed on Jun. 18, 2018.

This application claims the priority of Japanese application no. 2017-142671 filed Jul. 24, 2017, the entire content of which is hereby incorporated by reference.

TECHNICAL FIELD

The present invention relates to an air conditioner of a heat pump system which conditions air of a vehicle interior of a vehicle, and more particularly, it relates to a vehicular air conditioner which is suitable for a hybrid car and an electric vehicle each having a battery.

BACKGROUND ART

Due to actualization of environmental problems in recent years, hybrid cars and electric vehicles each of which drives a motor for running by power supplied from a battery have spread. Further, as an air conditioning device which is applicable to such a vehicle, there has been developed an air conditioning device which includes a refrigerant circuit to which a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let outdoor air flow and let the refrigerant absorb or radiate heat are connected, and which changes and executes a heating mode (a heating operation) to let the refrigerant discharged from the compressor radiate heat in the radiator and let the refrigerant from which the heat has been radiated in the radiator absorb heat in the outdoor heat exchanger, a cooling mode (a cooling operation) to let the refrigerant discharged from the compressor radiate heat in the outdoor heat exchanger and let the refrigerant absorb heat in the heat absorber, etc. (refer to, for example, Patent Document 1).

On the other hand, the battery mounted in the vehicle becomes high in temperature during its charging, or due to self-heat generation during its discharging. There is a risk that when the charging/discharging of the battery is performed in such a state, its deterioration progresses and soon the battery causes an operation failure to lead to breakage. Thus, there has also been developed a battery capable of adjusting the temperature of a secondary battery (battery) by circulating through the battery, air (heat medium) cooled by a refrigerant circulated in a refrigerant circuit (refer to, for example, Patent Document 2).

CITATION LIST

Patent Documents

Patent Document 1: Japanese Patent Application Publication No. 2014-213765
Patent Document 2: Japanese Patent Application Publication No. 2016-90201

SUMMARY OF THE INVENTION

Problems to be Solved by the Invention

Here, the conventional constitution shown in Patent Document 2 described above has shown a mode of heating the battery (second battery) while heating a vehicle interior, but does not show a mode of cooling the battery while heating the vehicle interior. On the other hand, since the battery generates heat due to the charging/discharging even under an environment in which it is desired to heat the vehicle interior (e.g., a low outdoor air temperature environment), it is possible to suppress frosting of an outdoor heat exchanger and extend a heating operation time if it is possible to pump up the heat of the battery by the refrigerant and let the refrigerant radiate heat in a radiator without letting the refrigerant absorb heat in the outdoor heat exchanger thereby to heat the vehicle interior.

However, when the refrigerant is evaporated to absorb heat from only the battery, and the refrigerant is returned to the suction side of a compressor, the temperatures of a heat absorber and the outdoor heat exchanger through which the refrigerant does not flow become lower than the temperature on the battery side under the environment in which the outdoor air temperature is low, and hence, a phenomenon occurs in which the refrigerant having absorbed heat from the battery reversely flows into the heat absorber and the outdoor heat exchanger. Further, a problem arises in that since the reversely flowing refrigerant stays in the heat absorber and the outdoor heat exchanger, the circulating refrigerant is reduced and hence sufficient heating performance cannot be exerted.

The present invention has been developed to solve such conventional technical problems, and an object thereof is to provide a vehicular air conditioner which is capable of heating a vehicle interior with heat of a battery and also preventing deterioration in heating performance due to a decrease in circulating refrigerant.

Means for Solving the Problems

There is provided a vehicular air conditioner which conditions air of a vehicle interior, including a compressor to compress a refrigerant, an air flow passage through which the air to be supplied to the vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant absorb or radiate heat, a battery temperature adjustment device to let a heat medium circulate, thereby adjusting a temperature of a battery mounted in a vehicle, and a control device. The battery temperature adjustment device has a refrigerant-heat medium heat exchanger to perform exchange of heat between the refrigerant and the heat medium, and returns the refrigerant flowing out from the refrigerant-heat medium heat exchanger to a suction side of the compressor, and includes a check valve which obstructs the flow of the refrigerant flowing out from the refrigerant-heat medium heat exchanger and directed toward the outdoor heat exchanger and/or the heat absorber.

The vehicular air conditioner of the invention of claim 2 is characterized in that in the above invention, the control device executes a first operation mode to let the refrigerant discharged from the compressor radiate heat in the radiator and the outdoor heat exchanger, decompress the refrigerant from which the heat has been radiated, and then let the refrigerant absorb heat in the refrigerant-heat medium heat exchanger.

The vehicular air conditioner of the invention of claim 3 is characterized in that in the above respective inventions, the control device executes a second operation mode to obstruct inflow of the refrigerant into the outdoor heat exchanger, let the refrigerant discharged from the compressor radiate heat in the radiator, decompress the refrigerant from which the heat has been radiated, and then let the refrigerant absorb heat only in the refrigerant-heat medium heat exchanger.

The vehicular air conditioner of the invention of claim 4 is characterized in the above respective inventions by including a first refrigerant pipe into which the refrigerant flowing out from the outdoor heat exchanger flows, a second refrigerant pipe into which the refrigerant flowing out from the heat absorber flows, and a third refrigerant pipe to let a joining point between the first refrigerant pipe and the second refrigerant pipe, and the suction side of the compressor communicate with each other, and in that the check valve is disposed in the third refrigerant pipe and lets the flow of the refrigerant toward the compressor serve as a forward direction, and the refrigerant flowing out from the refrigerant-heat medium heat exchanger is returned between the check valve and the compressor.

The vehicular air conditioner of the invention of claim 5 is characterized in the inventions of claims 1 to 3 by including a first refrigerant pipe into which the refrigerant flowing out from the outdoor heat exchanger flows, and a second refrigerant pipe into which the refrigerant flowing out from the heat absorber flows, and in that the first refrigerant pipe and the second refrigerant pipe communicate with the suction side of the compressor, and further in that the check valve is disposed in each of the first refrigerant pipe and the second refrigerant pipe, each check valve lets the flow of the refrigerant toward the compressor serve as a forward direction, and the refrigerant flowing out from the refrigerant-heat medium heat exchanger is returned between each of the check valves and the compressor.

The vehicular air conditioner of the invention of claim 6 is characterized in the invention of claim 1 or 2 by including a first refrigerant pipe into which the refrigerant flowing out from the outdoor heat exchanger flows, and a second refrigerant pipe into which the refrigerant flowing out from the heat absorber flows, and in that the first refrigerant pipe and the second refrigerant pipe communicate with the suction side of the compressor and further in that the check valve is disposed in the second refrigerant pipe and lets the flow of the refrigerant toward the compressor serve as a forward direction, and the refrigerant flowing out from the refrigerant-heat medium heat exchanger is returned between the check valve and the compressor.

The vehicular air conditioner of the invention of claim 7 is characterized in the above invention by including a shutter to obstruct the inflow of running wind into the outdoor heat exchanger and in that the control device executes a second operation mode to obstruct the inflow of the refrigerant into the outdoor heat exchanger, let the refrigerant discharged from the compressor radiate heat in the radiator, decompress the refrigerant from which the heat has been radiated, and then let the refrigerant absorb heat only in the refrigerant-heat medium heat exchanger, and obstructs the inflow of the running wind into the outdoor heat exchanger by the shutter when the second operation mode is executed.

The vehicular air conditioner of the invention of claim 8 is characterized in the inventions of claims 2 to 7 by including an outdoor expansion valve to decompress the refrigerant flowing out from the radiator and flowing into the outdoor heat exchanger, a valve device to control the inflow of the refrigerant into the heat absorber, a first refrigerant pipe to let the refrigerant flowing out from the outdoor heat exchanger suck into the compressor without flowing into the valve device, a first solenoid valve disposed in the first refrigerant pipe, a bypass circuit to distribute the refrigerant flowing out from the radiator from a refrigerant upstream side of the outdoor expansion valve to let the refrigerant flow to a refrigerant upstream side of the valve device, a second solenoid valve disposed in the bypass circuit, a branch circuit to let the refrigerant flowing out from the bypass circuit flow into the refrigerant-heat medium heat exchanger, an auxiliary expansion valve disposed in the branch circuit to decompress the refrigerant flowing into the refrigerant-heat medium heat exchanger, and another check valve to obstruct the flow of the refrigerant flowing out from the bypass circuit and directed toward the outdoor heat exchanger, and in that the control device opens the outdoor expansion valve, closes the first solenoid valve, the second solenoid valve, and the valve device, decompresses the refrigerant flowing into the refrigerant-heat medium heat exchanger by the auxiliary expansion valve, and controls the battery temperature adjustment device to thereby execute a first operation mode, or opens the second solenoid valve, closes the outdoor expansion valve, the first solenoid valve, and the valve device, decompresses the refrigerant flowing into the refrigerant-heat medium heat exchanger by the auxiliary expansion valve, and controls the battery temperature adjustment device to thereby execute a second operation mode, or executes by switching between the first operation mode and the second operation mode.

Advantageous Effect of the Invention

According to the present invention, in a vehicular air conditioner which conditions air of a vehicle interior, including a compressor to compress a refrigerant, an air flow passage through which the air to be supplied to the vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant absorb or radiate heat, a battery temperature adjustment device to let a heat medium circulate, thereby adjusting a temperature of a battery mounted in a vehicle, and a control device, the battery temperature adjustment device has a refrigerant-heat medium heat exchanger to perform exchange of heat between the refrigerant and the heat medium, and returns the refrigerant flowing out from the refrigerant-heat medium heat exchanger to a suction side of the compressor, and includes a check valve which obstructs the flow of the refrigerant flowing out from the refrigerant-heat medium heat exchanger and directed toward the outdoor heat exchanger and/or the heat absorber. Therefore, in a situation in which the temperatures of the outdoor heat exchanger and the heat absorber become lower than that of the refrigerant-heat medium heat exchanger under an environment in which an outdoor air temperature is low, the flow of the refrigerant flowing out from the refrigerant-heat medium heat exchanger toward the outdoor heat exchanger and the heat absorber can be obstructed by the check valve.

For example, as in the invention of claim 2, the control device executes a first operation mode to let the refrigerant discharged from the compressor radiate heat in the radiator and the outdoor heat exchanger, decompress the refrigerant from which the heat has been radiated, and then let the refrigerant absorb heat in the refrigerant-heat medium heat exchanger. Thus, when the amount of heat generation of the battery is large, the heat of the battery is pumped up and discharged into outdoor air by the outdoor heat exchanger, thereby making it possible to heat the vehicle interior by the radiator while cooling the battery. In that case, however, since the refrigerant does not flow into the heat absorber, the refrigerant flowing out from the refrigerant-heat medium heat exchanger reversely flows into the heat absorber and remains stayed therein in a situation in which the outdoor air temperature is low and the temperature of the heat absorber becomes lower than that of the refrigerant-heat medium heat exchanger.

Further, for example, as in the invention of claim 3, the control device executes a second operation mode to obstruct inflow of the refrigerant into the outdoor heat exchanger, let the refrigerant discharged from the compressor radiate heat in the radiator, decompress the refrigerant from which the heat has been radiated, and then let the refrigerant absorb heat only in the refrigerant-heat medium heat exchanger. Thus, when the amount of heat required to heat the vehicle interior and the amount of heat generation of the battery become almost equal to each other, it is possible to heat the vehicle interior only by the heat pumped up from the battery through the radiator. In that case, however, since the refrigerant does not flow into the outdoor heat exchanger and the heat absorber, the refrigerant flowing out from the refrigerant-heat medium heat exchanger reversely flows into the outdoor heat exchanger and the heat absorber and remains stayed therein in a situation in which the outdoor air temperature is low and the temperatures of the outdoor heat exchanger and the heat absorber become lower than that of the refrigerant-heat medium heat exchanger.

In the present invention, in the first operation mode and the second operation mode as described above, it is possible to obstruct by the check valve, the flowing of the refrigerant flowing out from the refrigerant-heat medium heat exchanger toward the outdoor heat exchanger and the heat absorber in the situation in which the outdoor air temperature is low and the temperatures of the outdoor heat exchanger and the heat absorber become lower than that of the refrigerant-heat medium heat exchanger, thereby making it possible to eliminate the disadvantage that the refrigerant reversely flows into the outdoor heat exchanger and the heat absorber and remains stayed therein, and a circulated refrigerant amount is reduced to degrade a heating capability.

Specifically, as in the invention of claim 4, when there are provided a first refrigerant pipe into which the refrigerant flowing out from the outdoor heat exchanger flows, a second refrigerant pipe into which the refrigerant flowing out from the heat absorber flows, and a third refrigerant pipe to let a joining point between the first refrigerant pipe and the second refrigerant pipe, and the suction side of the compressor communicate with each other, the check valve is disposed in the third refrigerant pipe to let the flow of the refrigerant toward the compressor serve as a forward direction and to return the refrigerant flowing out from the refrigerant-heat medium heat exchanger between the check valve and the compressor, whereby the above effect is achieved.

Further, as in the invention of claim 5, when there are provided a first refrigerant pipe into which the refrigerant flowing out from the outdoor heat exchanger flows, and a second refrigerant pipe into which the refrigerant flowing out from the heat absorber flows, and the first refrigerant pipe and the second refrigerant pipe are made to communicate with the suction side of the compressor, the check valve is disposed in each of the first refrigerant pipe and the second refrigerant pipe, and each check valve lets the flow of the refrigerant toward the compressor serve as a forward direction and returns the refrigerant flowing out from the refrigerant-heat medium heat exchanger between each of the check valves and the compressor. Even by this, the above effect is achieved.

Additionally, as in the invention of claim 6, when there are provided a first refrigerant pipe into which the refrigerant flowing out from the outdoor heat exchanger flows, and a second refrigerant pipe into which the refrigerant flowing out from the heat absorber flows, and the first refrigerant pipe and the second refrigerant pipe are made to communicate with the suction side of the compressor, the check valve is disposed in the second refrigerant pipe to let the flow of the refrigerant toward the compressor serve as a forward direction, and return the refrigerant flowing out from the refrigerant-heat medium heat exchanger between the check valve and the compressor. Even by this, the reverse inflow of the refrigerant into the heat absorber in the first operation mode of the invention of claim 2 can be obstructed.

Furthermore, in this case, as in the invention of claim 7, if the inflow of running wind into the outdoor heat exchanger is obstructed by a shutter to raise the pressure of the outdoor heat exchanger, it is possible to block the reverse inflow of the refrigerant into the outdoor heat exchanger and the heat absorber even in the second operation mode of the invention of claim 3.

Then, as in the invention of claim 8, there are provided an outdoor expansion valve to decompress the refrigerant flowing out from the radiator and flowing into the outdoor heat exchanger, a valve device to control the inflow of the refrigerant into the heat absorber, a first refrigerant pipe to let the refrigerant flowing out from the outdoor heat exchanger suck into the compressor without flowing into the valve device, a first solenoid valve disposed in the first refrigerant pipe, a bypass circuit to distribute the refrigerant flowing out from the radiator from a refrigerant upstream side of the outdoor expansion valve to let the refrigerant flow to a refrigerant upstream side of the valve device, a second solenoid valve disposed in the bypass circuit, a branch circuit to let the refrigerant flowing out from the bypass circuit flow into the refrigerant-heat medium heat exchanger, an auxiliary expansion valve disposed in the branch circuit to decompress the refrigerant flowing into the refrigerant-heat medium heat exchanger, and another check valve to obstruct the flow of the refrigerant flowing out from the bypass circuit and directed toward the outdoor heat exchanger. The control device opens the outdoor expansion valve, closes the first solenoid valve, the second solenoid valve, and the valve device, decompresses the refrigerant flowing into the refrigerant-heat medium heat exchanger by the auxiliary expansion valve, and controls the battery temperature adjustment device to thereby execute a first operation mode, or opens the second solenoid valve, closes the outdoor expansion valve, the first solenoid valve, and the valve device, decompresses the refrigerant flowing into the refrigerant-heat medium heat exchanger by the auxiliary expansion valve, and controls the battery temperature adjustment device to thereby execute a second operation mode, or executes by switching between the first operation mode and the second operation mode, thereby enabling each operation mode to be executed smoothly.

MODE FOR CARRYING OUT THE INVENTION

Hereinafter, description will be made as to embodiments of the present invention in detail with reference to the drawings.

Embodiment 1

Figure 1:
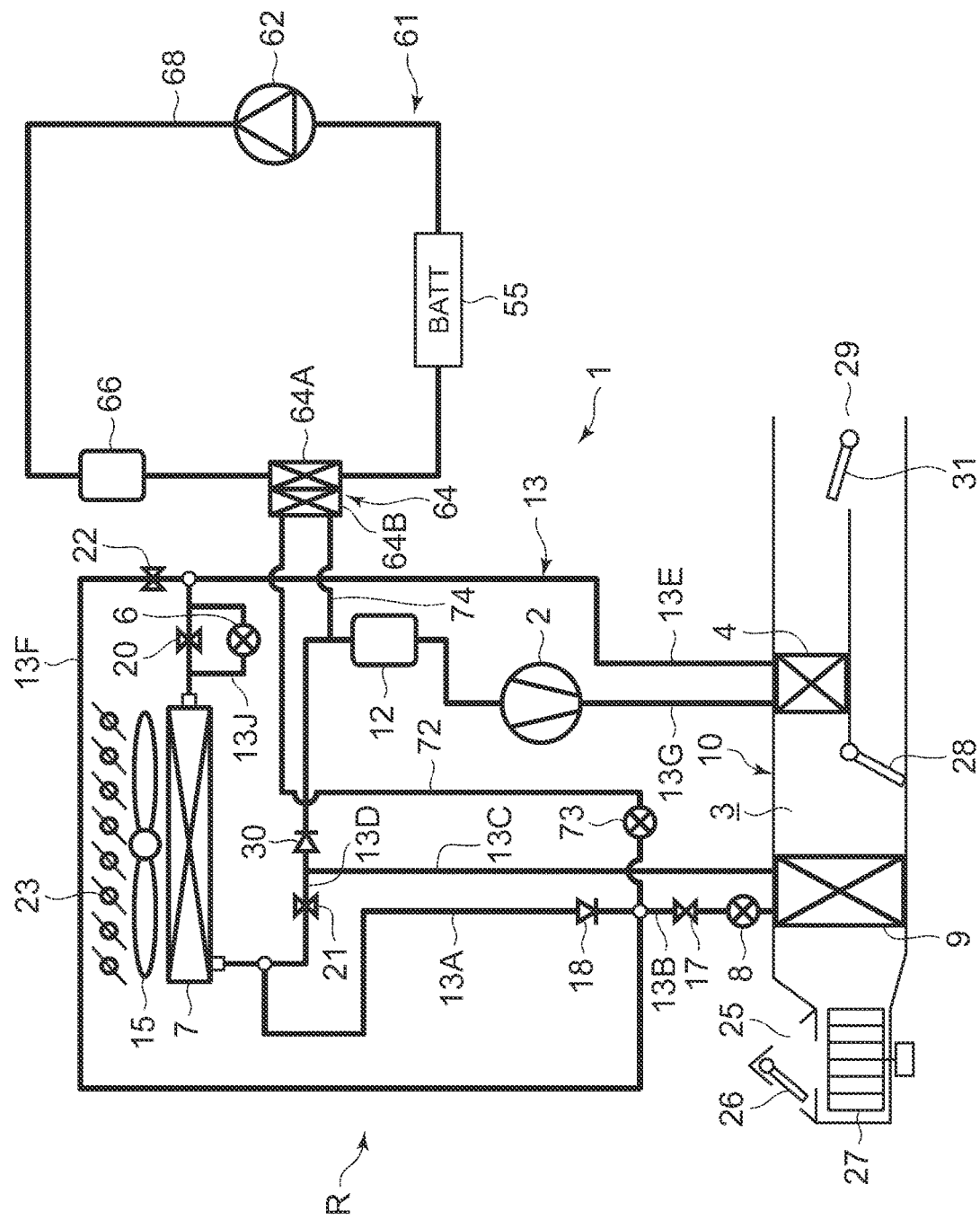
FIG. 1 is a constitutional view of a vehicular air conditioner of an embodiment to which the present invention is applied (Embodiment 1)

FIG. 1 illustrates a constitutional view of a vehicular air conditioner 1 of an embodiment of the present invention. A vehicle of the embodiment to which the present invention is applied is an electric vehicle (EV) in which an engine (an internal combustion engine) is not mounted, and is mounted with a battery 55 and runs with an electric motor for running (not shown in the drawing) which is driven by being supplied with power charged in the battery 55. The vehicular air conditioner 1 of the present invention is also driven by the power of the battery 55.

That is, in the electric vehicle which is not capable of performing heating by engine waste heat, the vehicular air conditioner 1 of the embodiment performs a heating operation by a heat pump operation in which a refrigerant circuit R is used. Further, the vehicular air conditioner 1 selectively executes respective air conditioning operations of a dehumidifying and heating operation, an internal cycle operation, a dehumidifying and cooling operation, and a cooling operation to perform air conditioning of a vehicle interior.

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine.

The vehicular air conditioner 1 of the embodiment performs air conditioning (heating, cooling, dehumidifying, and ventilation) of the vehicle interior of the electric vehicle. An electric type of compressor 2 to compress a refrigerant, a radiator 4 which is provided in an air flow passage 3 of an HVAC unit 10 in which air in the vehicle interior is ventilated and circulated, to let the high-temperature high-pressure refrigerant discharged from the compressor 2 flow therein via a refrigerant pipe 13G and to let the refrigerant radiate heat to the vehicle interior, an outdoor expansion valve 6 constituted of an electric valve which decompresses and expands the refrigerant during the heating, an outdoor heat exchanger 7 which performs heat exchange between the refrigerant and outdoor air to function as a radiator to let the refrigerant radiate heat during the cooling and to function as an evaporator to let the refrigerant absorb heat during the heating, an indoor expansion valve 8 constituted of an electric valve (which may be a mechanical expansion valve) to decompress and expand the refrigerant, a heat absorber 9 provided in the air flow passage 3 to let the refrigerant absorb heat during the cooling and dehumidifying from interior and exterior of the vehicle, an accumulator 12, and others are successively connected by a refrigerant pipe 13, whereby a refrigerant circuit R is constituted. The outdoor expansion valve 6 decompresses and expands the refrigerant flowing out from the radiator 4 and flowing in the outdoor heat exchanger 7 and can also be fully closed.

Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h). Further, 23 in the drawing is a shutter referred to as a grille shutter. When the shutter 23 is closed, it is constituted to prevent running wind from flowing into the outdoor heat exchanger 7.

Further, a refrigerant pipe 13A connected to a refrigerant outlet side of the outdoor heat exchanger 7 is connected to a refrigerant pipe 13B via a check valve 18 (another check valve in the present invention). Incidentally, the check valve 18 has a refrigerant pipe 13B side which serves as a forward direction. The refrigerant pipe 13B is connected to the indoor expansion valve 8 via a solenoid valve 17 be opened during the cooling. In the embodiment, these solenoid valve 17 and indoor expansion valve 8 constitute a valve device to control the inflow of the refrigerant into the heat absorber 9. Incidentally, the solenoid valve 17 can block the flow of the refrigerant directed to the indoor expansion valve 8 by closing the solenoid valve 17, but cannot block the flow thereof in a reverse direction.

In addition, the refrigerant pipe 13A extending out from the outdoor heat exchanger 7 branches, and this branching refrigerant pipe 13D as a first refrigerant pipe communicates and connects with a refrigerant pipe 13C as a second refrigerant pipe connected to an outlet side of the heat absorber 9 via a solenoid valve 21 as a first solenoid valve to be opened during the heating. Incidentally, the solenoid valve 21 is also capable of obstructing the flow of the refrigerant directed to the refrigerant pipe 13C, but cannot obstruct the flow thereof in a reverse direction. Then, the refrigerant pipe 13C is connected to the accumulator 12, and the accumulator 12 communicates and connects with a refrigerant suction side of the compressor 2.

Moreover, in the present embodiment, a check valve 30 is connected to the refrigerant pipe 13C at a portion between a joining point between the refrigerant pipe 13D (first refrigerant pipe) and the refrigerant pipe 13C (second refrigerant pipe), and the accumulator 12 located on the refrigerant suction side of the compressor 2 (the refrigerant pipe 13C at this portion serving as a third refrigerant pipe in the present invention). The check valve 30 has the flow of the refrigerant toward the accumulator 12 (compressor 2) which serves as a forward direction.

Furthermore, a refrigerant pipe 13E on an outlet side of the radiator 4 branches to a refrigerant pipe 13J and a refrigerant pipe 13F before the outdoor expansion valve 6 (on a refrigerant upstream side). One branching refrigerant pipe 13J is connected to a refrigerant inlet side of the outdoor heat exchanger 7 via the outdoor expansion valve 6. Additionally, the other branching refrigerant pipe 13F communicates and connects with a connecting part of the refrigerant pipe 13A and the refrigerant pipe 13B located on a refrigerant downstream side of the check valve 18 and a refrigerant upstream side of the solenoid valve 17 via a solenoid valve 22 as a second solenoid valve to be opened during the dehumidifying. Incidentally, the solenoid valve 22 can also block the flow of the refrigerant directed toward the refrigerant pipe 13A by closing the solenoid valve 22, but cannot block the flow thereof in a reverse direction.

Consequently, the refrigerant pipe 13F is connected in parallel with a series circuit of the outdoor expansion valve 6, the outdoor heat exchanger 7, and the check valve 18. The refrigerant pipe 13F serves as a bypass circuit which bypasses the outdoor expansion valve 6, the outdoor heat exchanger 7, and the check valve 18. Further, a solenoid valve 20 as a solenoid valve for bypass is connected in parallel with the outdoor expansion valve 6. Incidentally, the solenoid valve 20 is also capable of blocking the flow of the refrigerant directed toward the outdoor heat exchanger 7 by closing the solenoid valve 20, but not capable of blocking the flow thereof in a reverse direction.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (indoor air circulation) and outdoor air which is air outside the vehicle interior (outdoor air introduction). Furthermore, an indoor blower (a blower fan) 27 to supply the introduced indoor or outdoor air to the air flow passage 3 is disposed on an air downstream side of the suction changing damper 26.

In addition, in the air flow passage 3 on an air upstream side of the radiator 4, there is provided an air mix damper 28 to adjust a ratio at which the air in the air flow passage 3 (the indoor or outdoor air) flowing into the air flow passage 3 and passed through the heat absorber 9 is to be passed through the radiator 4. Furthermore, in the air flow passage 3 on an air downstream side of the radiator 4, there is formed each outlet (represented by an outlet 29 in FIG. 1) of FOOT (foot), VENT(vent) or DEF (defroster), and in the outlet 29, an outlet changing damper 31 is disposed to execute changing control of blowing of the air from each outlet mentioned above.

Furthermore, the vehicular air conditioner 1 of the present invention is provided with a battery temperature adjustment device 61 for circulating a heat medium through the battery 55 to adjust the temperature of the battery 55. The battery temperature adjustment device 61 of the embodiment is provided with a circulating pump 62 as a circulation device to circulate the heat medium through the battery 55, a heat medium heating heater 66 as a heating device, and a refrigerant-heat medium heat exchanger 64. Those and the battery 55 are annularly connected by a heat medium pipe 68.

In the case of the present embodiment, the heat medium heating heater 66 is connected to a discharge side of the circulating pump 62. An inlet of a heat medium flow passage 64A of the refrigerant-heat medium heat exchanger 64 is connected to an outlet of the heat medium heating heater 66. An inlet of the battery 55 is connected to an outlet of the heat medium flow passage 64A, and an outlet of the battery 55 is connected to a suction side of the circulating pump 62.

As the heat medium used in the battery temperature adjustment device 61, for example, water, a refrigerant such as HFO-1234f, liquid such as a coolant or the like, or gas such as air or the like can be employed. Incidentally, in the embodiment, water is employed as the heat medium. Also, the heat medium heating heater 66 is constituted of an electric heater such as a PTC heater or the like. Further, for example, a jacket structure capable of circulating the heat medium in a heat exchange relation with the battery 55 is provided around the battery 55.

Then, when the circulating pump 62 is operated, the heat medium discharged from the circulating pump 62 reaches the heat medium heating heater 66. When the heat medium heating heater 66 generates heat, the heat medium is heated thereat and then next flows into the heat medium flow passage 64A of the refrigerant-heat medium heat exchanger 64. The heat medium flowing out from the heat medium flow passage 64A of the refrigerant-heat medium heat exchanger 64 reaches the battery 55. The heat medium performs heat exchange with the battery 55 thereat and is then sucked into the circulating pump 62 to be circulated in the heat medium pipe 68.

On the other hand, one end of a branch pipe 72 as a branch circuit disposed on a refrigerant downstream side (forward side) of the check valve 18 and a refrigerant upstream side of the solenoid valve 17 is connected to an outlet of the refrigerant pipe 13F of the refrigerant circuit R, i.e., a connecting part of the refrigerant pipe 13F, the refrigerant pipe 13A, and the refrigerant pipe 13B. An auxiliary expansion valve 73 constituted of an electric valve is provided in the branch pipe 72. The auxiliary expansion valve 73 is capable of decompressing and expanding the refrigerant flowing into a refrigerant flow passage 64B to be described later, of the refrigerant-heat medium heat exchanger 64 and also performing full closing. Then, the other end of the branch pipe 72 is connected to the refrigerant flow passage 64B of the refrigerant-heat medium heat exchanger 64. One end of a refrigerant pipe 74 is connected to an outlet of the refrigerant flow passage 64B, and the other end of the refrigerant pipe 74 is connected to the refrigerant pipe 13C (the portion of the third refrigerant pipe) between the check valve 30 and the accumulator 12 (the compressor 2). It is to be noted that these auxiliary expansion valve 73 and others also constitute a part of the refrigerant circuit R, and at the same time constitutes even a part of the battery temperature adjustment device 61.

When the auxiliary expansion valve 73 is opened, the refrigerant (some refrigerant or all refrigerant) flowing out from the refrigerant pipe 13F and the outdoor heat exchanger 7 is decompressed in the auxiliary expansion valve 73 and then flows into the refrigerant flow passage 64B of the refrigerant-heat medium heat exchanger 64 to evaporate there. The refrigerant absorbs heat from the heat medium flowing through the heat medium flow passage 64A in the process of flowing through the refrigerant flow passage 64B, followed by being sucked into the compressor 2 through the accumulator 12.

Figure 2:
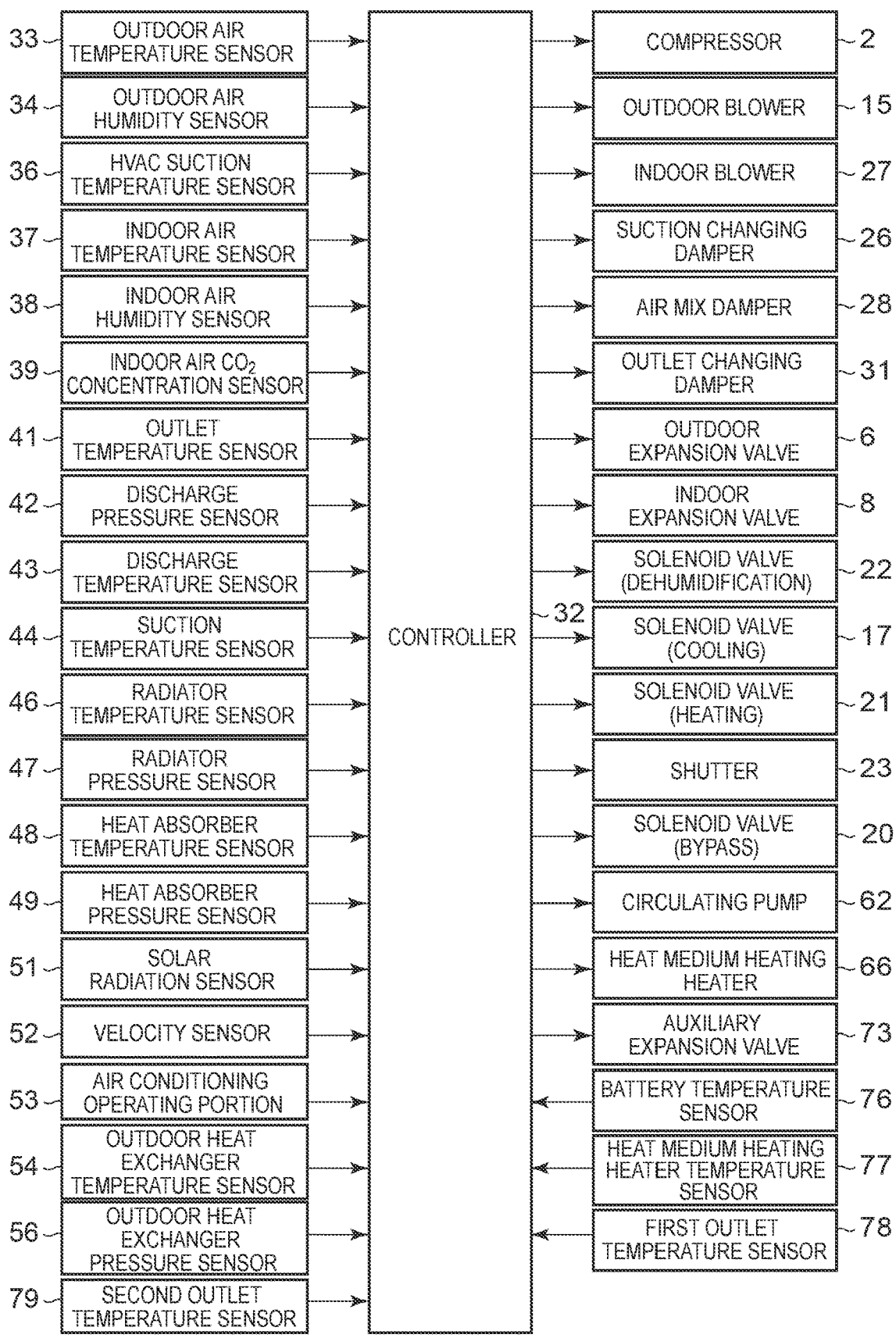
FIG. 2 is a block diagram of an electric circuit of a controller in the vehicular air conditioner of FIG. 1.

Next, in FIG. 2, 32 is a controller (ECU) as a control device. The controller 32 is constituted of a microcomputer that is an example of a computer including a processor, and an input of the controller is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction temperature sensor 44 which detects a temperature of the refrigerant to be sucked into the compressor 2, a radiator temperature sensor 46 which detects a temperature of the radiator 4 (the temperature of the air passed through the radiator 4 or the temperature of the radiator 4 itself: a radiator temperature ICI), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle interior, a velocity sensor 52 to detect a moving speed (a velocity) of the vehicle, an air conditioning (aircon) operating portion 53 to set the changing of a predetermined temperature or an air conditioning operation, an outdoor heat exchanger temperature sensor 54 which detects a temperature of the outdoor heat exchanger 7 (the temperature of the refrigerant immediately after the refrigerant flows out from the outdoor heat exchanger 7, or the temperature of the outdoor heat exchanger 7 itself: an outdoor heat exchanger temperature TXO. When the outdoor heat exchanger 7 functions as an evaporator, the outdoor heat exchanger temperature TXO becomes an evaporation temperature of the refrigerant in the outdoor heat exchanger 7), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7).

Furthermore, the input of the controller 32 is further connected also to respective outputs of a battery temperature sensor 76 which detects a temperature of the battery 55 (a temperature of the battery 55 itself, or a temperature of the heat medium flowing out from the battery 55, or a temperature of the heat medium flowing into the battery 55), a heat medium heating heater temperature sensor 77 which detects a temperature of the heat medium heating heater 66 (a temperature of the heat medium heating heater 66 itself, and a temperature of the heat medium flowing out from the heat medium heating heater 66), a first outlet temperature sensor 78 which detects a temperature of the heat medium flowing out from the heat medium flow passage 64A of the refrigerant-heat medium heat exchanger 64, and a second outlet temperature sensor 79 which detects a temperature of the refrigerant flowing out from the refrigerant flow passage 64B.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves of the solenoid valve 22 (dehumidification), the solenoid valve 17

(cooling), the solenoid valve 21 (heating), and the solenoid valve 20 (bypass), the shutter 23, the circulating pump 62, the heat medium heating heater 66, and the auxiliary expansion valve 73. Then, the controller 32 controls these components on the basis of the outputs of the respective sensors and the setting input by the air conditioning operating portion 53.

Next, an operation of the vehicular air conditioner 1 of the embodiment, having the above constitution will be described. In the embodiment, the controller 32 changes and executes the respective air conditioning operations of the heating operation, the dehumidifying and heating operation, the internal cycle operation, the dehumidifying and cooling operation, and the cooling operation and adjusts the temperature of the battery 55 to within a predetermined appropriate temperature range. Description will initially be made as to each air conditioning operation of the refrigerant circuit R.

(1) Heating Operation

Figure 3:
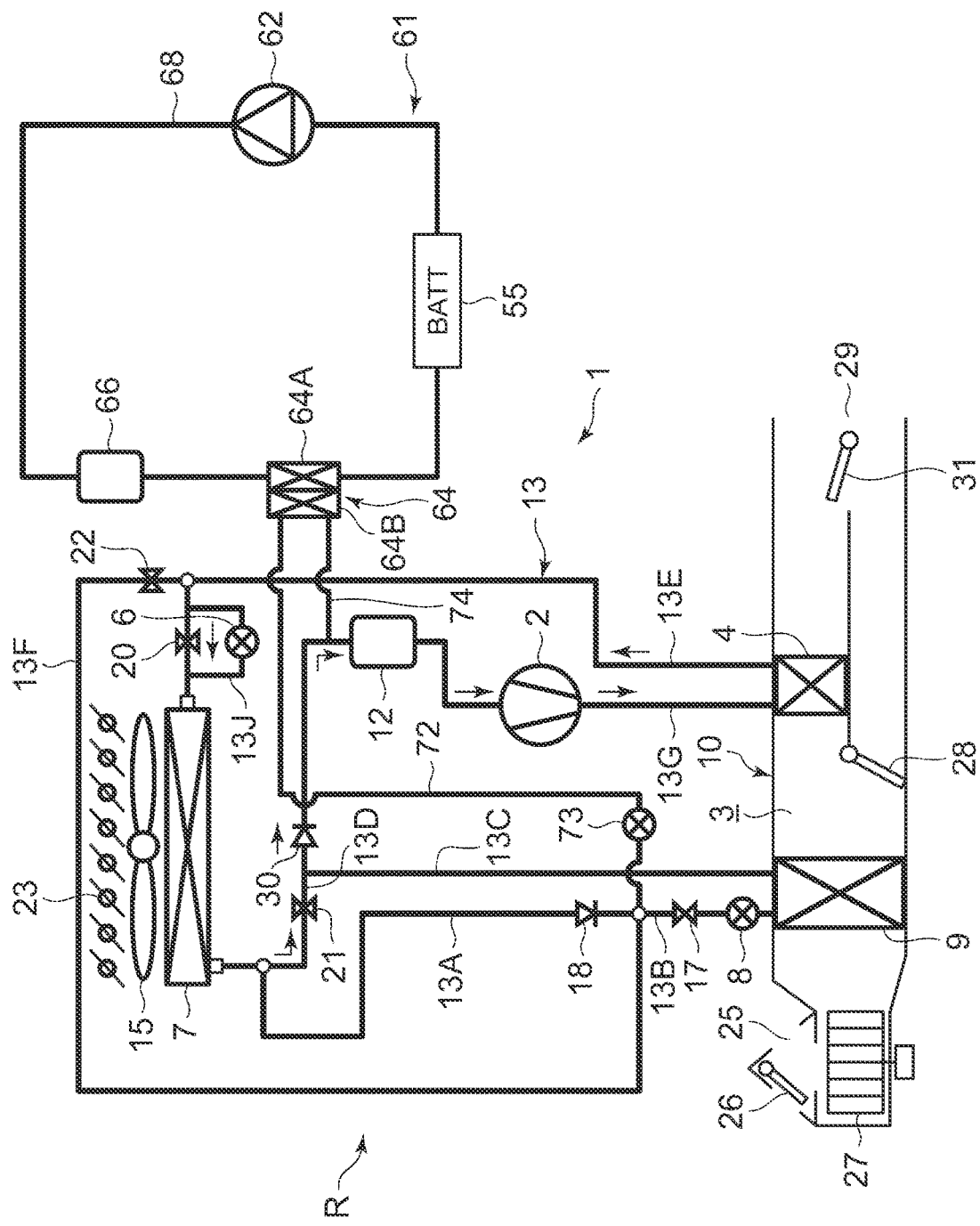
FIG. 3 is a diagram describing a heating operation by the controller of FIG. 2.
Figure 4:
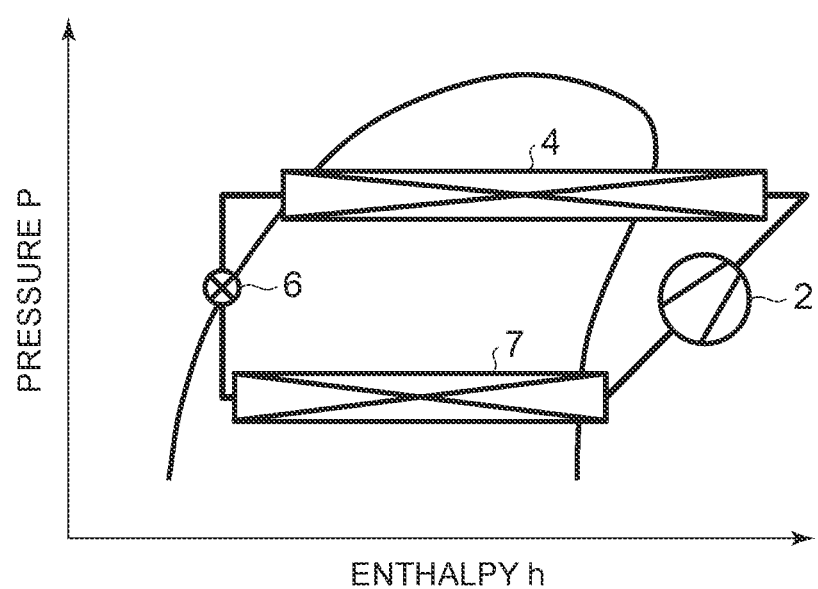
FIG. 4 is a p-h diagram of the heating operation of FIG. 3.

Description will first be made as to the heating operation with reference to FIG. 3 and FIG. 4. FIG. 3 shows the flow (solid line arrows) of the refrigerant of the refrigerant circuit R in the heating operation, and FIG. 4 shows a p-h diagram of the refrigerant circuit R in the heating operation. Incidentally, in FIG. 4, each constituent device of the refrigerant circuit R is shown on the p-h diagram. When the heating operation is selected by the controller 32 (an automatic mode) or a manual operation to the air conditioning operating portion 53 (a manual mode), the controller 32 opens the solenoid valve 21 (for the heating) and closes the solenoid valve 17 (for the cooling). The controller also closes the solenoid valve 22 (for the dehumidification) and the solenoid valve 20 (for the bypass). Incidentally, the shutter 23 is opened.

Then, the controller operates the compressor 2 and the respective blowers 15 and 27, and the air mix damper 28 has a state of adjusting a ratio at which the air blown out from the indoor blower 27 is to be passed through the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). In other words, the refrigerant circuit R functions as a heat pump. Then, the low-temperature refrigerant flowing out from the outdoor heat exchanger 7 flows out to the refrigerant pipe 13A and flows into the refrigerant pipe 13D, and flows into the refrigerant pipe 13C through the solenoid valve 21. Then, the refrigerant flows into the accumulator 12 through the check valve 30 to perform gas-liquid separation, and the gas refrigerant is then sucked into the compressor 2, thereby repeating this circulation. The air heated in the radiator 4 is blown out from the outlet 29, thereby performing the heating of the vehicle interior.

The controller 32 calculates a target radiator pressure PCO (a target value of the pressure PCI of the radiator 4) from a target heater temperature TCO (a target value of a heating temperature TH being the temperature of air on the leeward side of the radiator 4) calculated from an aftermentioned target outlet temperature TAO, and controls the number of revolutions of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Furthermore, the controller controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree of the refrigerant in an outlet of the radiator 4. The target heater temperature TCO is basically TCO=TAO, but a predetermined limit of controlling is provided.

(2) Dehumidifying and Heating Operation

Figure 5:
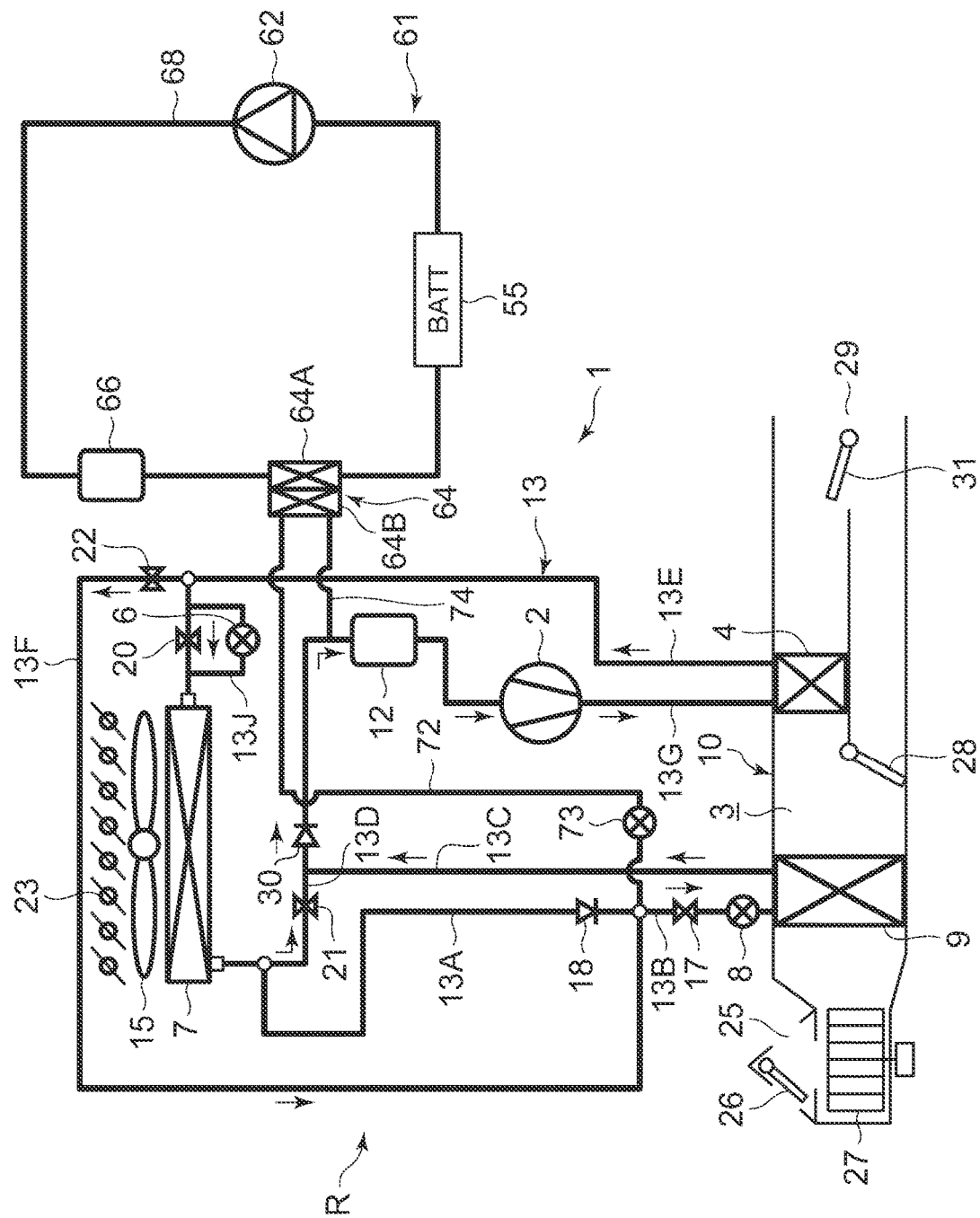
FIG. 5 is a diagram describing a dehumidifying and heating operation by the controller of FIG. 2.
Figure 6:
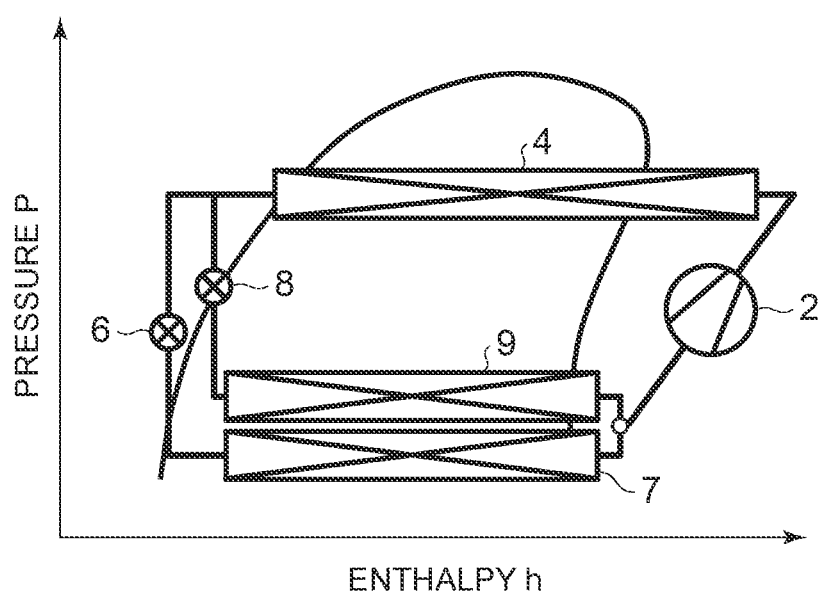
FIG. 6 is a p-h diagram of the dehumidifying and heating operation of FIG. 5.

Next, description will be made as to the dehumidifying and heating operation with reference to FIG. 5 and FIG. 6. FIG. 5 shows the flow (solid line arrows) of the refrigerant of the refrigerant circuit R in the dehumidifying and heating operation, and FIG. 6 shows a p-h diagram of the refrigerant circuit R in the dehumidifying and heating operation. Incidentally, in FIG. 6, each constituent device of the refrigerant circuit R is shown on the p-h diagram. In the dehumidifying and heating operation, the controller 32 opens the solenoid valve 22 and the solenoid valve 17 in the above state of the heating operation. Further, the shutter 23 is opened. In consequence, a part of the condensed refrigerant flowing into the refrigerant pipe 13E through the radiator 4 is distributed, the distributed refrigerant flows through the solenoid valve 22 into the refrigerant pipe 13F and flows from the refrigerant pipe 13B into the indoor expansion valve 8, and the residual refrigerant flows through the outdoor expansion valve 6. That is, the distributed part of the refrigerant is decompressed in the indoor expansion valve 8, and then flows into the heat absorber 9 to evaporate.

The controller 32 controls a valve position of the indoor expansion valve 8 to maintain a superheat degree (SH) of the refrigerant in an outlet of the heat absorber 9 at a predetermined value, but water in the air blown out from the indoor blower 27 coagulates to adhere to the heat absorber 9 by a heat absorbing operation of the refrigerant which occurs in the heat absorber 9 at this time, and hence, the air is cooled and dehumidified. The distributed residual refrigerant flowing into the refrigerant pipe 13J is decompressed in the outdoor expansion valve 6, and then evaporates in the outdoor heat exchanger 7.

The refrigerant evaporated in the heat absorber 9 and flowing out from the heat absorber flows into to the refrigerant pipe 13C to join the refrigerant (the refrigerant from the outdoor heat exchanger 7) from the refrigerant pipe 13D, and then flows through the check valve 30 into the accumulator 12 to be sucked into the compressor 2, thereby repeating this circulation. The air dehumidified in the heat absorber 9 is reheated in the process of passing the radiator 4, thereby performing the dehumidifying and heating of the vehicle interior.

The controller 32 controls the number of revolutions of the compressor 2 on the basis of the target radiator pressure PCO calculated from the target heater temperature TCO and the radiator pressure PCI detected by the radiator pressure sensor 47 (the high pressure of the refrigerant circuit R), and the controller controls the valve position of the outdoor expansion valve 6 on the basis of the temperature (the heat absorber temperature Te) of the heat absorber 9 which is detected by the heat absorber temperature sensor 48.

(3) Internal Cycle Operation

Figure 7:
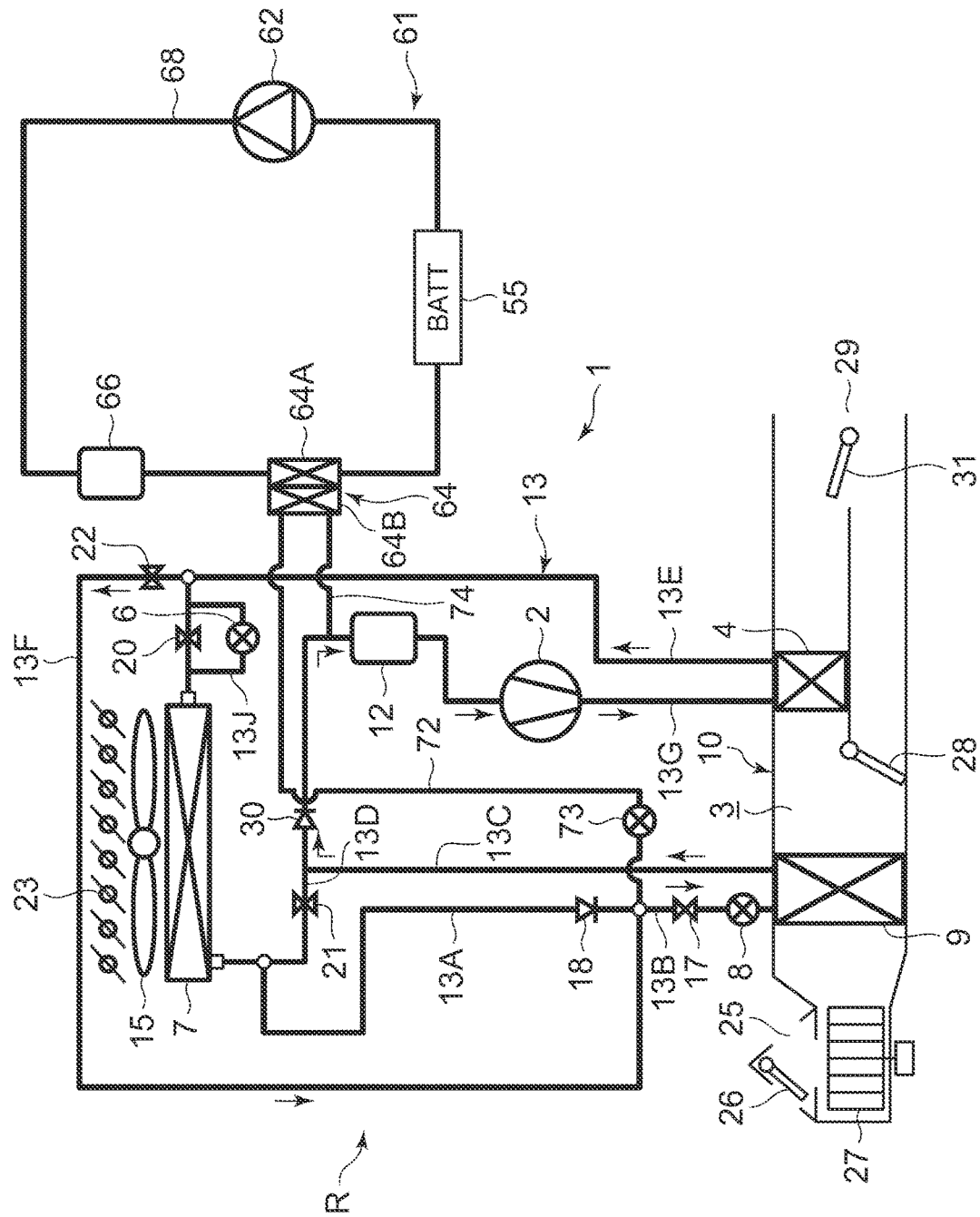
FIG. 7 is a diagram describing an internal cycle operation by the controller of FIG. 2.
Figure 8:
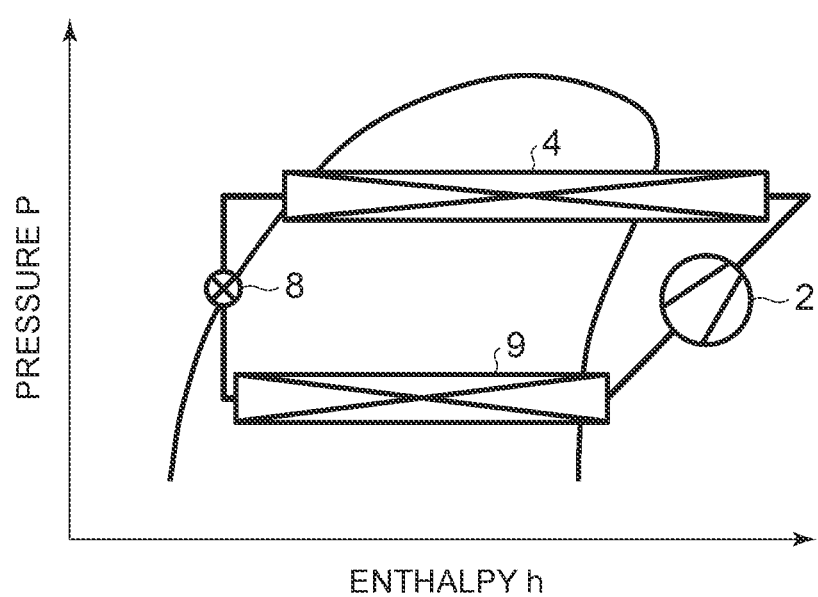
FIG. 8 is a p-h diagram of the internal cycle operation of FIG. 7.

Next, description will be made as to the internal cycle operation with reference to FIG. 7 and FIG. 8. FIG. 7 shows the flow (solid line arrows) of the refrigerant of the refrigerant circuit R in the internal cycle operation, and FIG. 8 shows a p-h diagram of the refrigerant circuit R in the internal cycle operation. Incidentally, in FIG. 8, each constituent device of the refrigerant circuit R is shown on the p-h diagram. In the internal cycle operation, the controller 32 fully closes the outdoor expansion valve 6 in the above state of the dehumidifying and heating operation (a fully-closed position). However, the solenoid valve 21 is maintained in an opened state, and the refrigerant outlet of the outdoor heat exchanger 7 is made to communicate with the refrigerant suction side of the compressor 2. That is, this internal cycle operation is a state where the outdoor expansion valve 6 is fully closed under the control of the outdoor expansion valve 6 in the dehumidifying and heating operation, and hence, this internal cycle operation can also be grasped as a part of the dehumidifying and heating operation (the shutter 23 being opened).

However, the outdoor expansion valve 6 is closed, thereby obstructing inflow of the refrigerant into the outdoor heat exchanger 7, and hence, all the condensed refrigerant flowing through the radiator 4 into the refrigerant pipe 13E flows through the solenoid valve 22 to the refrigerant pipe 13F. Then, the refrigerant flowing through the refrigerant pipe 13F flows from the refrigerant pipe 13B through the solenoid valve 17 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 and flowing out from the heat absorber 9 flows into the refrigerant pipe 13C and flows through the check valve 30 and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle operation, the refrigerant circulates between the radiator 4 (heat radiation) and the heat absorber 9 (heat absorption) which are present in the air flow passage 3 on an indoor side, and hence, the heat is not pumped up from the outdoor air, but the heating capability for a consumed power of the compressor 2 is exerted. The whole amount of the refrigerant flows through the heat absorber 9 which exerts a dehumidifying operation, and hence, as compared with the above dehumidifying and heating operation, a dehumidifying capability is higher, but the heating capability becomes low.

Further, the outdoor expansion valve 6 is closed but the solenoid valve 21 is opened, and the refrigerant outlet of the outdoor heat exchanger 7 communicates with the refrigerant suction side of the compressor 2. Hence, the liquid refrigerant in the outdoor heat exchanger 7 flows out to the refrigerant pipe 13C through the refrigerant pipe 13D and the solenoid valve 21 and is recovered to the accumulator 12, so that the outdoor heat exchanger 7 is subjected to a state of the gas refrigerant therein. Thus, as compared with the case where the solenoid valve 21 is closed, the amount of the refrigerant circulated in the refrigerant circuit R is increased, thereby making it possible to enhance the heating capability of the radiator 4 and the dehumidifying capability of the heat absorber 9.

The controller 32 controls the number of revolutions of the compressor 2 on the basis of the temperature of the heat absorber 9 or the above-mentioned radiator pressure PCI (the high pressure of the refrigerant circuit R). At this time, the controller 32 selects a smaller compressor target number of revolutions from compressor target numbers of revolutions obtainable by either of calculations from the temperature of the heat absorber 9 and the radiator pressure PCI, to control the compressor 2.

(4) Dehumidifying and Cooling Operation

Figure 9:
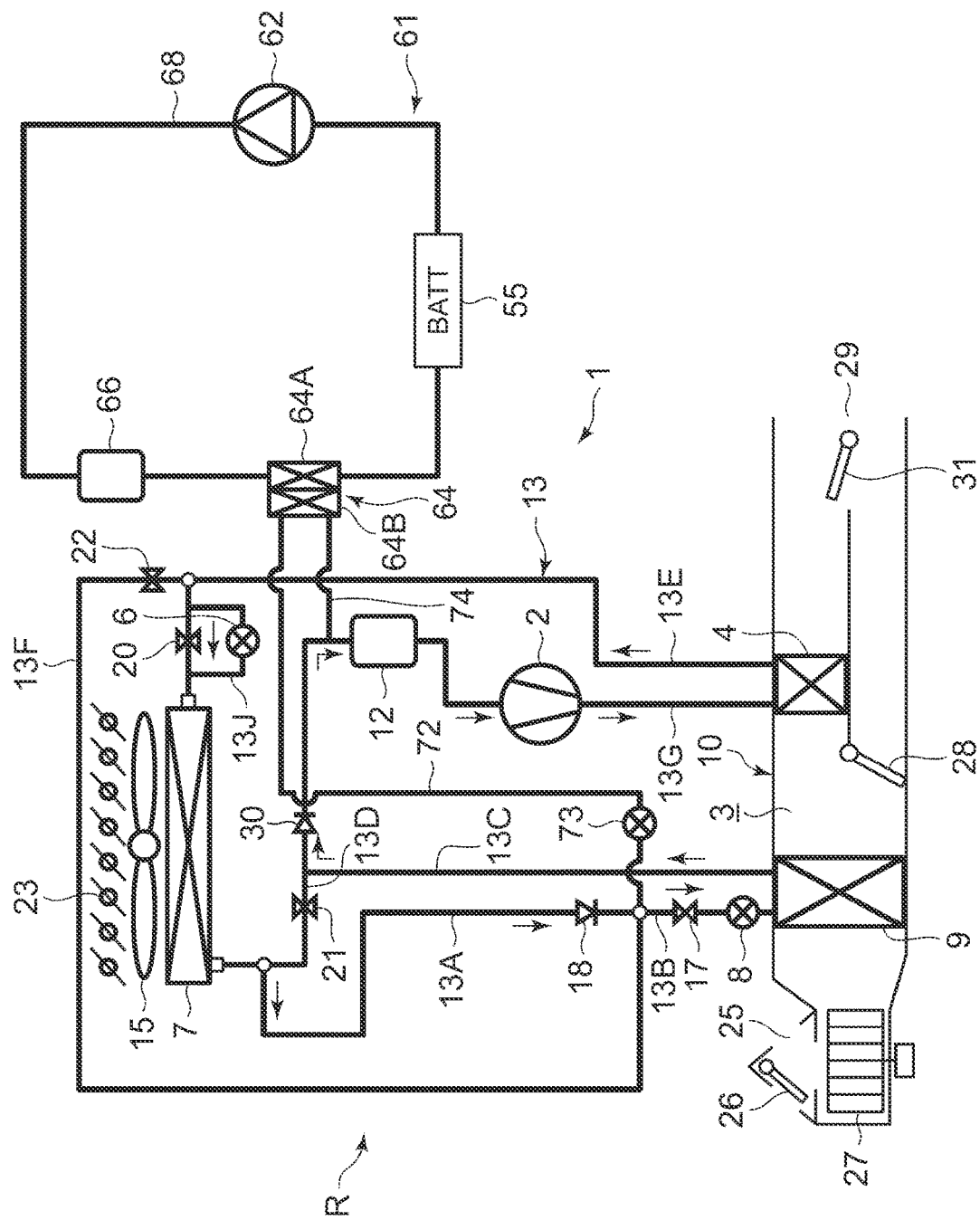
FIG. 9 is a diagram describing a dehumidifying and cooling operation by the controller of FIG. 2.
Figure 10:
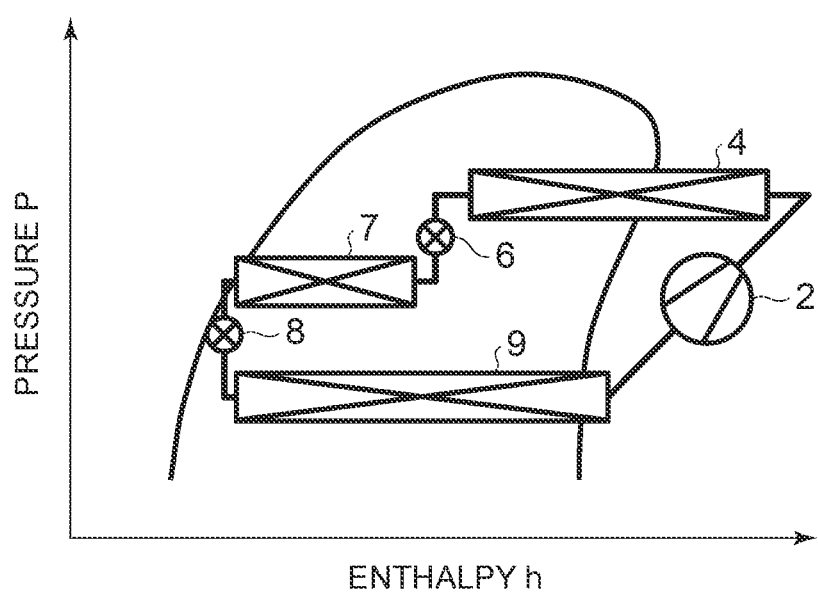
FIG. 10 is a p-h diagram of the dehumidifying and cooling operation of FIG. 9.

Next, description will be made as to the dehumidifying and cooling operation with reference to FIG. 9 and FIG. 10. FIG. 9 shows the flow (solid line arrows) of the refrigerant of the refrigerant circuit R in the dehumidifying and cooling operation, and FIG. 10 shows a p-h diagram of the refrigerant circuit R in the dehumidifying and cooling operation. Incidentally, in FIG. 10, each constituent device of the refrigerant circuit R is shown on the p-h diagram. In the dehumidifying and cooling operation, the controller 32 opens the solenoid valve 17 and closes the solenoid valve 21. The controller also closes the solenoid valve 22 and the solenoid valve 20. Then, the controller operates the compressor 2 and the respective blowers 15 and 27, and the air mix damper 28 has a state of adjusting a ratio at which the air blown out from the indoor blower 27 is to be passed through the radiator 4. Further, the shutter 23 is opened. Consequently, the high-temperature high-pressure gas refrigerant discharged from the compressor 2 flows into the radiator 4. The air in the air flow passage 3 passes through the radiator 4, and hence, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15 to condense. The refrigerant flowing out from the outdoor heat exchanger 7 flows through the refrigerant pipe 13A and the check valve 18 to enter the refrigerant pipe 13B, and further flows through the solenoid valve 17 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 and flowing out from the heat absorber 9 flows into the refrigerant pipe 13C and flows through the check valve 30 and the accumulator 12 to be sucked into the compressor 2, thereby repeating this circulation. The air cooled and dehumidified in the heat absorber 9 is reheated in the process of passing the radiator 4 (reheating: a radiation capability is lower than that during the heating), thereby performing the dehumidifying and cooling of the vehicle interior.

The controller 32 controls, based on the temperature (the heat absorber temperature Te) of the heat absorber 9 which is detected by the heat absorber temperature sensor 48, and a target heat absorber temperature TEO being its target value, the number of revolutions of the compressor 2 to set the heat absorber temperature Te to the target heat absorber temperature TEO, and controls, based on the radiator pressure PCI (the high pressure of the refrigerant circuit R)

detected by the radiator pressure sensor 47 and the target radiator pressure PCO calculated from the target heater temperature TCO, the valve position of the outdoor expansion valve 6 to set the radiator pressure PCI to the target radiator pressure PCO, thereby obtaining a required amount of reheat by the radiator 4.

(5) Cooling Operation

Figure 11:
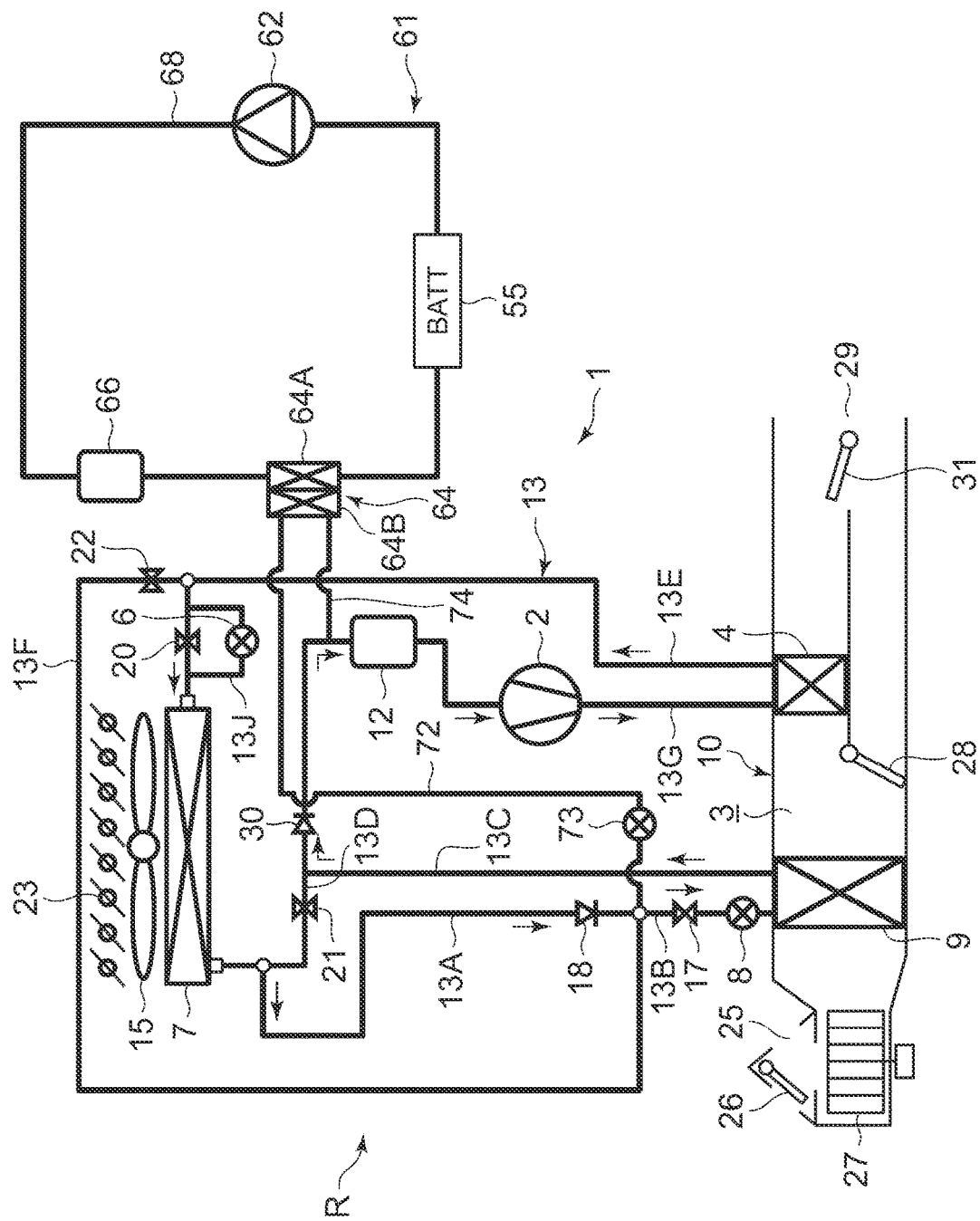
FIG. 11 is a diagram describing a cooling operation by the controller of FIG. 2.
Figure 12:
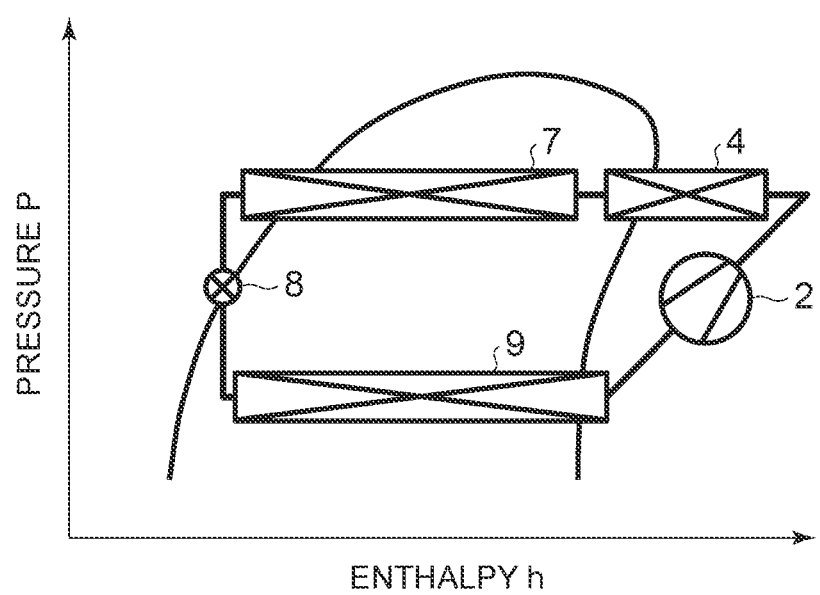
FIG. 12 is a p-h diagram of the cooling operation of FIG. 11.

Next, description will be made as to the cooling operation with reference to FIG. 11 and FIG. 12. FIG. 11 shows the flow (solid line arrows) of the refrigerant of the refrigerant circuit R in the cooling operation, and FIG. 12 shows a p-h diagram of the refrigerant circuit R in the cooling operation. Incidentally, in FIG. 12, each constituent device of the refrigerant circuit R is shown on the p-h diagram. In the cooling operation, the controller 32 opens the solenoid valve 20 in the above state of the dehumidifying and cooling operation (the valve position of the outdoor expansion valve 6 is free). It is to be noted that the air mix damper 28 has a state of adjusting a ratio at which the air is to be passed through the radiator 4. Further, the shutter 23 is opened.

In consequence, the high-temperature high-pressure gas refrigerant discharged from the compressor 2 flows into the radiator 4. The air in the air flow passage 3 is passed through the radiator 4 but its ratio becomes small (because of only reheat during the cooling). The refrigerant therefore only passes the radiator, and the refrigerant flowing out from the radiator 4 flows through the refrigerant pipe 13E to reach the outdoor expansion valve 6. At this time, the solenoid valve 20 is opened, and hence, the refrigerant flows through the solenoid valve 20 to pass the refrigerant pipe 13J, and flows into the outdoor heat exchanger 7 as it is, in which the refrigerant is cooled by the running therein or the outdoor air to pass through the outdoor blower 15, to condense and liquefy. The refrigerant flowing out from the outdoor heat exchanger 7 flows through the refrigerant pipe 13A and the check valve 18 to enter the refrigerant pipe 13B, and further flows through the solenoid valve 17 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled.

The refrigerant evaporated in the heat absorber 9 and flowing out from the heat absorber 9 flows into the refrigerant pipe 13C and flows through the check valve 30 and the accumulator 12 to be sucked into the compressor 2, thereby repeating this circulation. The air cooled and dehumidified in the heat absorber 9 is blown out from the outlet 29 to the vehicle interior, thereby performing the cooling of the vehicle interior. In this cooling operation, the controller 32 controls the number of revolutions of the compressor 2 on the basis of the temperature (the heat absorber temperature Te) of the heat absorber 9 which is detected by the heat absorber temperature sensor 48.

(6) Changing of Air Conditioning Operation

The controller 32 calculates the above-mentioned target outlet temperature TAO from the following equation (I). The target outlet temperature TAO is a target value of the temperature of the air to be blown out from the outlet 29 to the vehicle interior.

$$TAO=(Tset-Tin)\times K+Tbal(f(Tset, SUN, Tam)) \quad (I)$$

where Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature TAO becomes.

Then, the controller 32 selects any air conditioning operation from the above respective air conditioning operations on the basis of the outdoor air temperature Tam detected by the outdoor air temperature sensor 33 and the target outlet temperature TAO on startup. Furthermore, after the startup, the controller selects and changes the above respective air conditioning operations in accordance with changes of environments and setting conditions such as the outdoor air temperature Tam and the target outlet temperature TAO.

(7) Control of Shutter 23 During Dehumidifying and Cooling Operation and Changing to Internal Cycle Operation Here, in the aforementioned dehumidifying and cooling operation, the controller 32 controls, based on the temperature (the heat absorber temperature Te) of the heat absorber 9 detected by the heat absorber temperature sensor 48 and the target heat absorber temperature TEO being its target value, the number of revolutions of the compressor 2 to set the heat absorber temperature Te to the target heat absorber temperature TEO. Accordingly, when the heat absorber temperature Te is in a state of its satisfaction (in which the heat absorber temperature Te becomes the target heat absorber temperature TEO or becomes a value close to it), the number of revolutions of the compressor 2 also becomes low.

Further, the controller 32 controls the valve position of the outdoor expansion valve 6 to set the radiator pressure PCI to the target radiator pressure PCO on the basis of the radiator pressure PCI (the high pressure of the refrigerant circuit R) detected by the radiator pressure sensor 47 and the target radiator pressure PCO. Thus, the number of revolutions of the compressor 2 cannot be increased either in the state in which the heat absorber temperature Te is satisfied. Therefore, as the radiator pressure PCI becomes lower than the target radiator pressure PCO, the controller 32 reduces the valve position of the outdoor expansion valve 6 to enhance the radiation capability of the radiator 4 so that the refrigerant is made to stay in the radiator 4 as much as possible.

However, since the amount of the refrigerant circulated in the heat absorber 9 decreases as the valve position of the outdoor expansion valve 6 becomes small, a temperature spot occurs in the heat absorber 9. Then, when the valve position of the outdoor expansion valve 6 is reduced to the minimum valve position of controlling, the temperature spot of the heat absorber 9 becomes extremely large, thereby deteriorating air conditioning performance of the vehicle interior (the temperature of the air blown out through the outlet varies). In particular, since the radiation capability of the radiator 4 becomes low by exchange of heat between the refrigerant and the outdoor air in the outdoor heat exchanger 7 as mentioned above in the dehumidifying and cooling operation, such a problem is easy to occur in the cases such as where the outdoor air temperature being lowered, etc., thereby leading to early transition to the internal cycle operation or the dehumidifying and heating operation. In order to prevent such a thing, there is a need to heat the air blown out to the vehicle interior by providing a special electric heater or the like, but power consumption is increased correspondingly.

Figure 13:
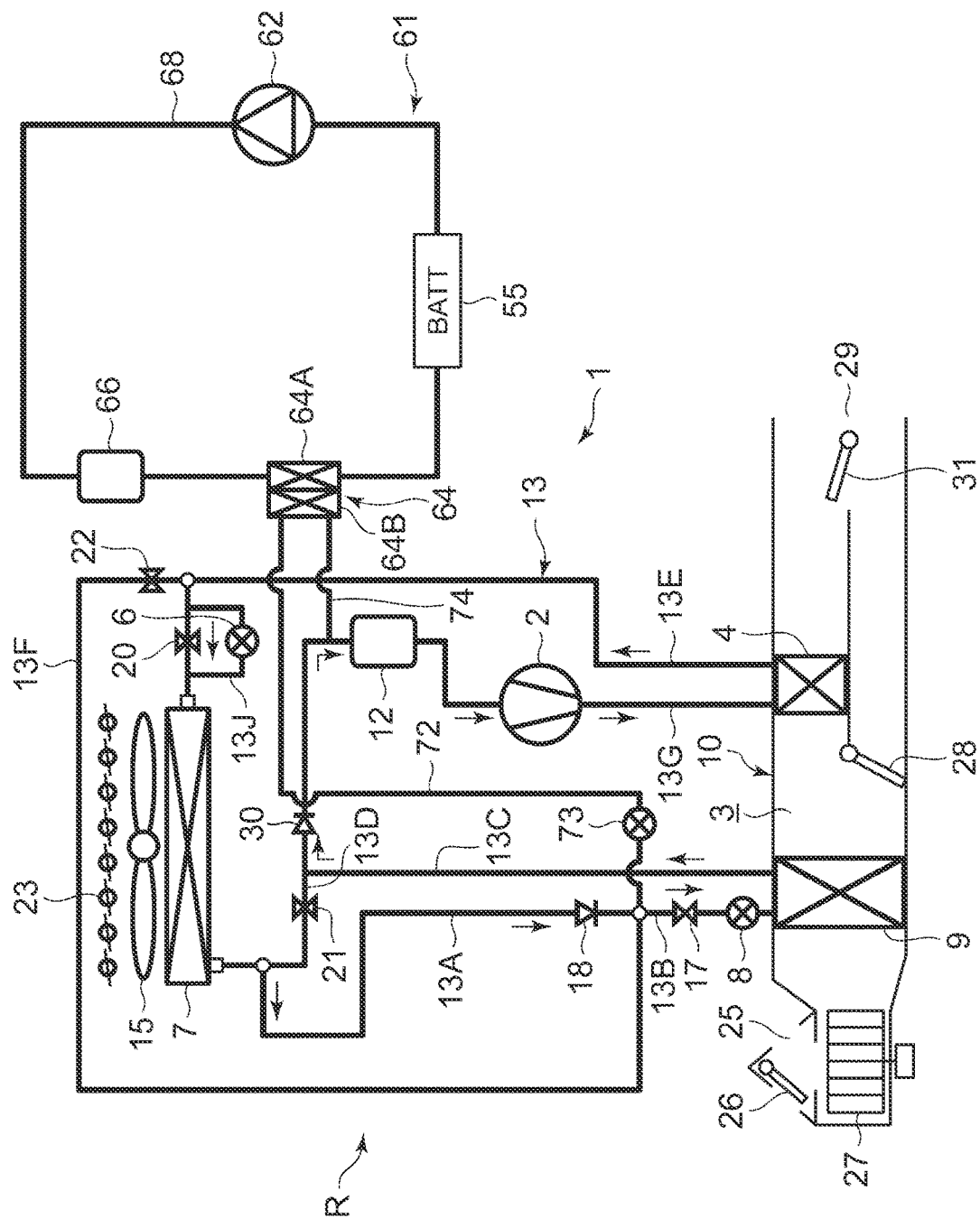
FIG. 13 is a diagram describing a dehumidifying and cooling operation (shutter being closed) by the controller of FIG. 2.

Thus, when it is not possible to set the radiator pressure PCI to the target radiator pressure PCO (i.e., when it is not possible to achieve the target radiator pressure PCO under the control of the outdoor expansion valve 6) in the dehumidifying and cooling operation of FIGS. 9 and 10 described above even when the valve position of the outdoor expansion valve 6 is reduced, in the present embodiment, when the radiator pressure PCI cannot be set to the target radiator pressure PCO even when the valve position of the outdoor expansion valve 6 is taken as the minimum valve position of controlling in the state in which the heat absorber temperature Te is satisfied, the controller 32 judges that the radiation capability of the radiator 4 becomes insufficient, and closes the shutter 23 and also stops the outdoor blower 15 as shown in FIG. 13.

Figure 14:
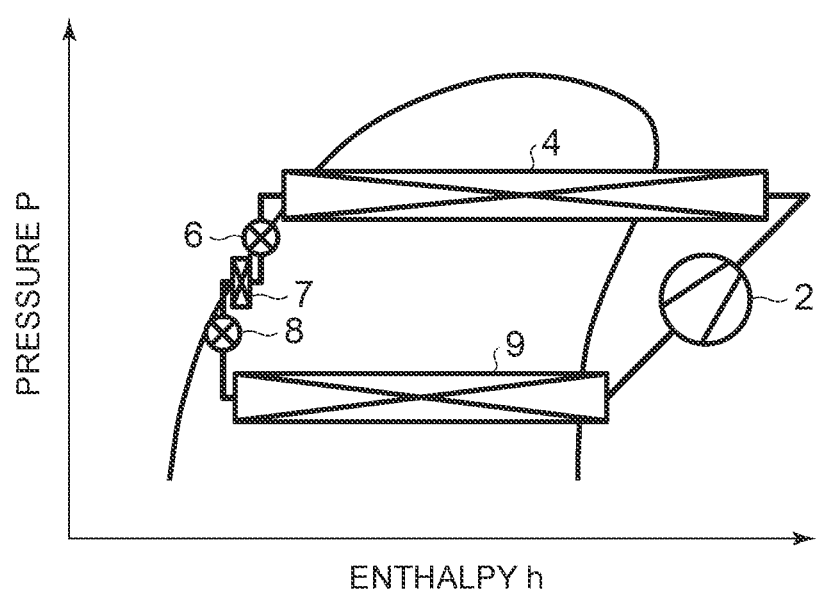
FIG. 14 is a p-h diagram of the dehumidifying and cooling operation of FIG. 13.

Consequently, the running wind does not flow into the outdoor heat exchanger 7, and the outdoor air is not passed therethrough. Therefore, as shown in the p-h diagram of FIG. 14, the exchange of heat between the refrigerant and the outdoor air in the outdoor heat exchanger 7 is absent, or the amount of heat exchange between the refrigerant and the outdoor air in the outdoor heat exchanger 7 becomes extremely small. Since the amount of radiation of the refrigerant in the radiator 4 increases correspondingly, the valve position of the outdoor expansion valve 6 is greatly reduced, or the radiator pressure PCI can be set to the target radiator pressure PCO even without taking the minimum valve position, thereby making it possible to eliminate or suppress even the temperature spot which occurs in the heat absorber 9.

Further, the shutter 23 is closed in this manner, thereby making it possible to extend the dehumidifying and cooling operation and enlarge its executable range without using the special electric heater or the like. When, however, the radiator pressure PCI cannot be set to the target radiator pressure PCO even when the shutter 23 is closed as described above, the controller 32 changes the air conditioning operation to the internal cycle operation in FIGS. 7 and 8. Thus, the amount of the refrigerant circulated in the radiator 4 (on the high pressure side of the refrigerant circuit R) is increased more than in the dehumidifying and cooling operation, and the radiation capability of the radiator 4 is increased, thereby maintaining comfortable air conditioning of the vehicle interior.

Incidentally, in the present embodiment, when the radiator pressure PCI cannot be set to the target radiator pressure PCO even when the valve position of the outdoor expansion valve 6 is reduced to the minimum valve position of controlling in the state in which the heat absorber temperature Te is satisfied, the controller judges that the radiation capability of the radiator 4 runs short. However, when the radiator pressure PCI cannot be set to the target radiator pressure PCO even when the valve position of the outdoor expansion valve 6 is simply reduced to a predetermined small value in the dehumidifying and cooling operation regardless of the heat absorber temperature Te, or when the radiator pressure PCI cannot be set to a value close to the target radiator pressure PCO, the controller may judge that the radiation capability of the radiator 4 runs short.

(8) Temperature Adjustment of Battery 55

Next, description will be made as to temperature adjustment control of the battery 55 by the controller 32 with reference to FIGS. 15 to 36. When the battery 55 performs charging/discharging in a state in which its temperature becomes high due to its self-heat generation or the like as described above, its deterioration progresses. Thus, the controller 32 of the vehicular air conditioner 1 of the present invention cools the temperature of the battery 55 to within an appropriate temperature range by the battery temperature adjustment device 61 while executing the air conditioning operation as described above. It is to be noted that since the appropriate temperature range of the battery 55 is generally from above +25° C. to below +45°, the target battery temperature TBO (e.g., +35° C.) being the target value of the temperature (the battery temperature Tb) of the battery 55 is set to within the appropriate temperature range in the embodiment.

(8-1) First Heating/Battery Cooling Mode

In the heating operation (FIGS. 3 and 4), the controller 32 calculates a required heating capability Qtgt being the heating capability of the vehicle interior required for the radiator 4, and a heating capability Qhp generable by the radiator 4 by using the following equations (II) and (III), for example.

$$Qtgt=(TCO-Te) \times Cpa \times \rho \times Qair \tag{II}$$

$$Qhp=f(Tam, NC, BLV, VSP, FANVout, Te) \tag{III}$$

where Te is a temperature of the heat absorber 9 detected by the heat absorber temperature sensor 48, Cpa is a specific heat of air flowing into the radiator 4 [kj/kg·K], ρ is a density of the air flowing into the radiator 4 (specific volume) [kg/m³], Qair is an amount of the air passing through the radiator 4 [m³/h] (estimated from the blower voltage BLV of the indoor blower 27, etc.), VSP is a velocity obtained from the velocity sensor 52, and FANVout is a voltage of the outdoor blower 15.

Further, the controller 32 calculates a required battery cooling capability Qbat being a cooling capability of the battery 55 required for the battery temperature adjustment device 61 by using, for example, the following equation (IV) on the basis of the temperature (the battery temperature Tb) of the battery 55 detected by the battery temperature sensor 76 and the above-mentioned target battery temperature TBO.

$$Qbat=(Tb-TBO) \times k1 \times k2 \tag{IV}$$

where k1 is a specific heat of the heat medium circulated in the battery temperature adjustment device 61 [kj/kg·K], and k2 is a flow rate of the heat medium [m³/h]. Incidentally, the equation of calculating the required battery cooling capability Qbat is not limited to the above, but the required battery cooling capability may be calculated in addition to other factors related to battery cooling other than the above.

When the battery temperature Tb is lower than the target battery temperature TBO (Tb<TBO), the required battery cooling capability Qbat calculated in the above equation (IV) becomes minus, and hence, in the embodiment, the controller 32 fully closes the auxiliary expansion valve 73 and also stops the battery temperature adjustment device 61. On the other hand, when the battery temperature Tb rises by charging/discharging or the like and becomes higher than the target battery temperature TBO during the above-described heating operation (TBO<Tb), the required battery cooling capability Qbat calculated in the equation (IV) is turned plus, and hence, in the embodiment, the controller 32 opens the auxiliary expansion valve 73 and operates the battery temperature adjustment device 61 to start the cooling of the battery 55.

In that case, the controller 32 compares both of the above-described required heating capability Qtgt and required battery cooling capability Qbat on the basis of the required heating capability Qtgt and the required battery cooling capability Qbat, and changes and executes the first heating/battery cooling mode described here, and a second heating/battery cooling mode (a first operation mode of the present invention) and a third heating/battery cooling mode (a second operation mode of the present invention) to be described later.

Figure 15:
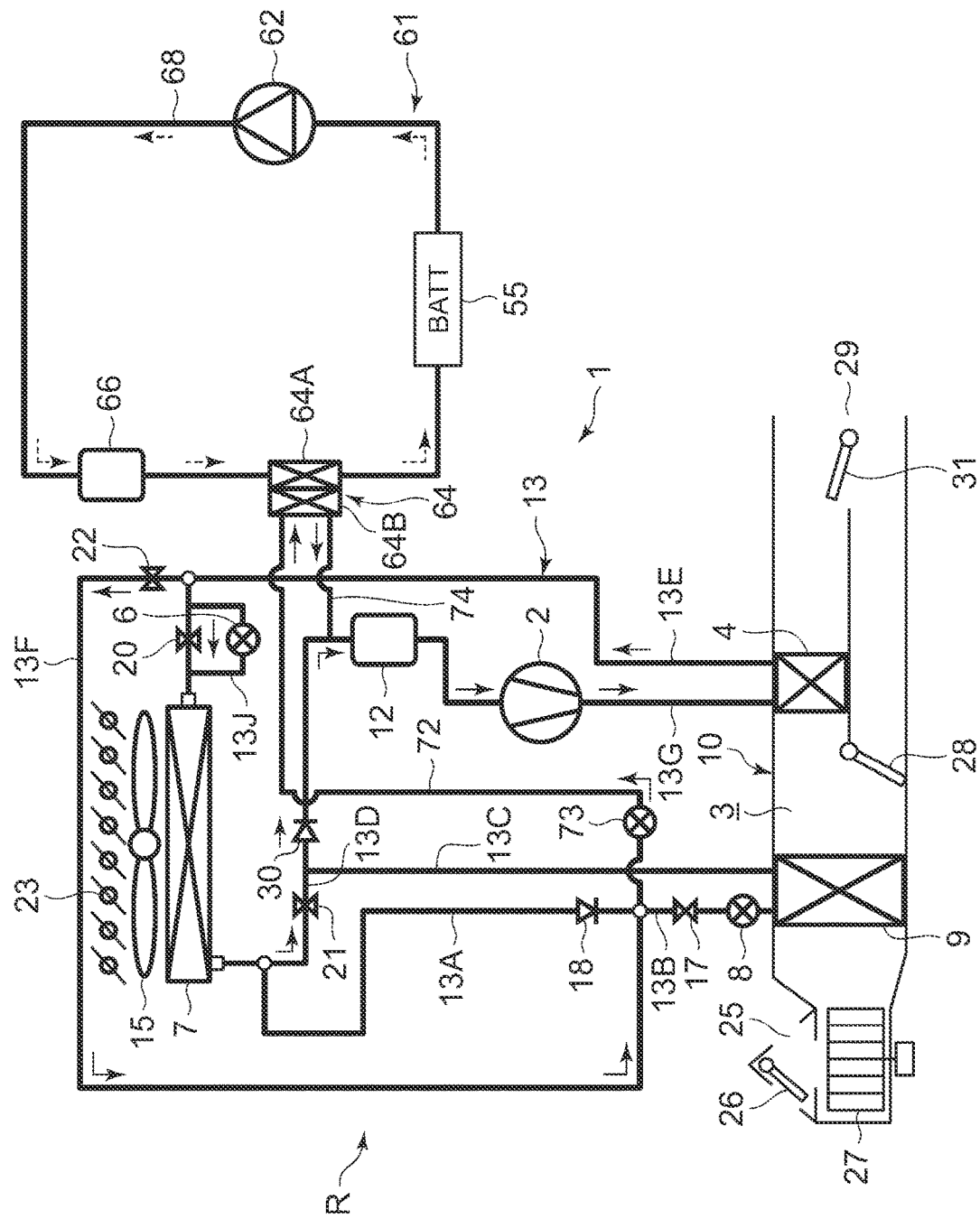
FIG. 15 is a diagram describing a first heating/battery cooling mode by the controller of FIG. 2.
Figure 16:
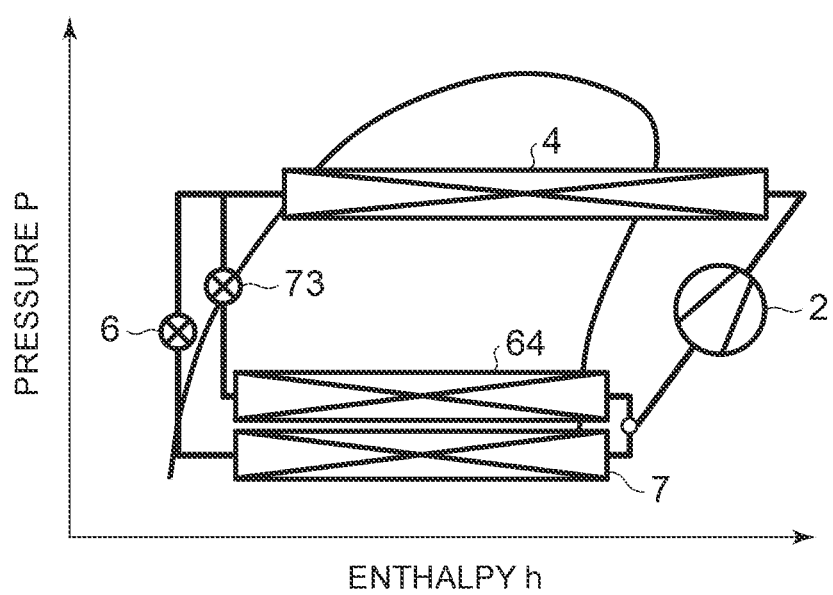
FIG. 16 is a p-h diagram of the first heating/battery cooling mode of FIG. 15.

Firstly, when the required heating capability Qtgt is larger than the required battery cooling capability Qbat in the situation in which a heating load of the vehicle interior is large (e.g., the temperature of indoor air is low), and the amount of heat generated from the battery 55 is small (a cooling load is small) (Qtgt>Qbat), the controller 32 executes the first heating/battery cooling mode. FIG. 15 shows the flow (solid line arrows) of the refrigerant of the refrigerant circuit R in the first heating/battery cooling mode, and the flow (broken line arrows) of the heat medium of the battery temperature adjustment device 61. FIG. 16 shows a p-h diagram of the refrigerant circuit R in the first heating/battery cooling mode. Incidentally, in FIG. 16, each constituent device of the refrigerant circuit R is shown on the p-h diagram.

In the first heating/battery cooling mode, the controller 32 has a state of, in the state of the heating operation of the refrigerant circuit R shown in FIGS. 3 and 4, further opening the solenoid valve 22 and also opening the auxiliary expansion valve 73 to control its valve position. Then, the controller operates the circulating pump 62 of the battery temperature adjustment device 61. Consequently, a part of the refrigerant flowing out from the radiator 4 is distributed on a refrigerant upstream side of the outdoor expansion valve 6 and flows through the refrigerant pipe 13F to reach a refrigerant upstream side of the solenoid valve 17. The refrigerant then enters the branch pipe 72 and is decompressed in the auxiliary expansion valve 73 and then flows through the branch pipe 72 into the refrigerant flow passage 64B of the refrigerant-heat medium heat exchanger 64 to evaporate. At this time, a heat absorbing operation is exerted. A circulation is repeated in which the refrigerant evaporated in the refrigerant flow passage 64B flows through the refrigerant pipe 74 to enter the refrigerant pipe 13C on the downstream side of the check valve 30 and flows through the accumulator 12 to be sucked into the compressor 2 (this is indicated by the solid line arrows in FIG. 15).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed therefrom by the refrigerant evaporated in the refrigerant flow passage 64B, whereby the heat medium is cooled. The heat medium cooled by the heat absorbing operation of the refrigerant flows out from the refrigerant-heat medium heat exchanger 64 and reaches the battery 55 to cool the battery 55, and the heat medium is then sucked into the circulating pump 62, thereby repeating this circulation (indicated by the broken line arrows in FIG. 15).

Thus, in the first heating/battery cooling mode, the refrigerant of the refrigerant circuit R evaporates in the outdoor heat exchanger 7 and the refrigerant-heat medium heat exchanger 64 and absorbs heat from the outdoor air, and absorbs heat even from the heat medium (battery 55) of the battery temperature adjustment device 61. Consequently, the heat is pumped up from the battery 55 through the heat medium, and the pumped-up heat can be transferred to the radiator 4 and utilized for the heating of the vehicle interior, while cooling the battery 55.

In the first heating/battery cooling mode, when it is not possible to achieve the required heating capability Qtgt by the above-described heating capability Qhp of radiator 4 even by the heat absorption from the outdoor air and the heat absorption from the battery 55 as described above (Qtgt>Qhp), the controller 32 allows the heat medium heating heater 66 to generate heat (energization).

When the heat medium heating heater 66 generates heat, the heat medium discharged from the circulating pump 62 of the battery temperature adjustment device 61 is heated in the heat medium heating heater 66 and then flows into the heat medium flow passage 64A of the refrigerant-heat medium heat exchanger 64. Hence, the heat of the heat medium heating heater 66 is also pumped up by the refrigerant evaporated in the refrigerant flow passage 64B, whereby the heating capability Qhp by the radiator 4 is increased, thereby making it possible to achieve the required heating capability Qtgt. Incidentally, the controller 32 stops the heat generation of the heat medium heating heater 66 when the required heating capability Qtgt has been achieved for the heating capability Qhp (non-energization).

(8-2) Third Heating/Battery Cooling Mode (Second Operation Mode of the Present Invention)

Figure 17:
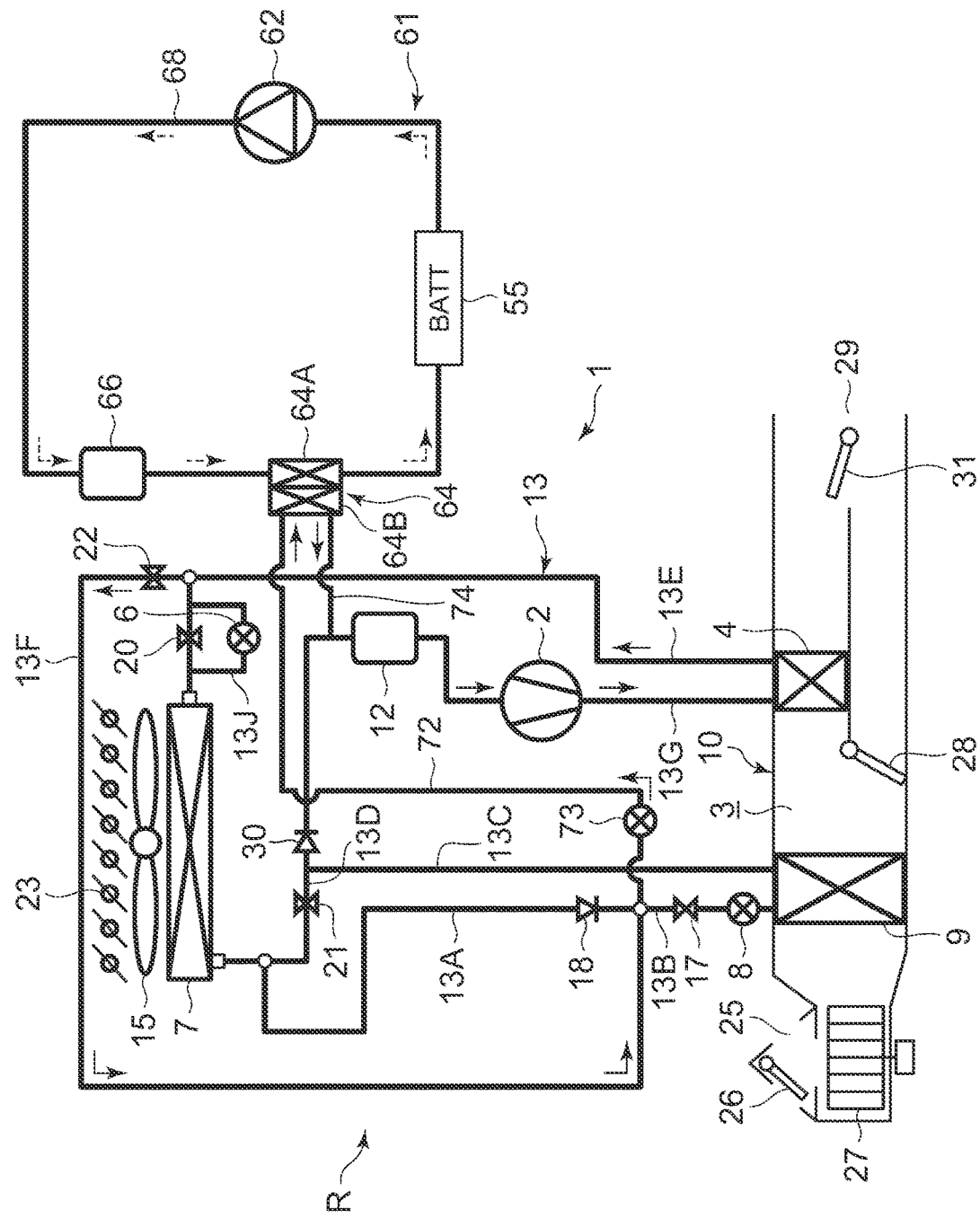
FIG. 17 is a diagram describing a third heating/battery cooling mode by the controller of FIG. 2.
Figure 18:
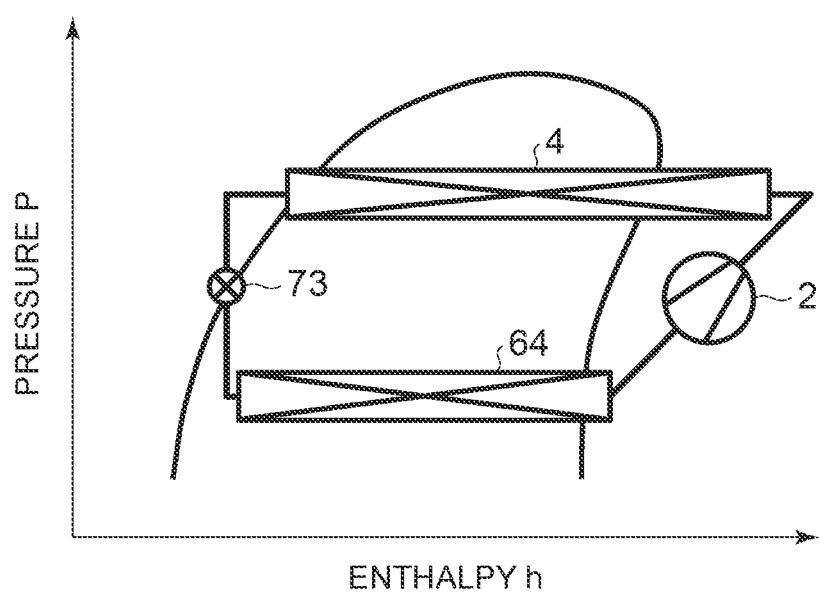
FIG. 18 is a p-h diagram of the third heating/battery cooling mode of FIG. 17.

Next, when the heating load of the vehicle interior and the cooling load of the battery 55 are almost the same, i.e., when the required heating capability Qtgt and the required battery cooling capability Qbat are equal or close to each other (Qtgt≈Qbat), the controller 32 executes the third heating/battery cooling mode. FIG. 17 shows the flow of the refrigerant of the refrigerant circuit R in the third heating/battery cooling mode (solid line arrows), and the flow of the heat medium of the battery temperature adjustment device 61 (broken line arrows). FIG. 18 shows a p-h diagram of the refrigerant circuit R in the third heating/battery cooling mode (the second operation mode). Incidentally, in FIG. 18, each constituent device of the refrigerant circuit R is shown on the p-h diagram.

In the third heating/battery cooling mode (the second operation mode), the controller 32 has a state of closing the solenoid valves 17, 20, and 21, fully closing the outdoor expansion valve 6, opening the solenoid valve 22, and also opening the auxiliary expansion valve 73 to control its valve position. Then, the controller operates the compressor 2 and the indoor blower 27 and also operates the circulating pump 62 of the battery temperature adjustment device 61 (the heat medium heating heater 66 being non-energized). Consequently, all the refrigerant flowing out from the radiator 4 flows into the solenoid valve 22 and reaches the refrigerant upstream side of the solenoid valve 17 through the refrigerant pipe 13F. The refrigerant then enters the branch pipe 72 and is decompressed in the auxiliary expansion valve 73, and then flows through the branch pipe 72 into the refrigerant flow passage 64B of the refrigerant-heat medium heat exchanger 64 to evaporate. At this time, a heat absorbing operation is exerted. A circulation is repeated in which the refrigerant evaporated in the refrigerant flow passage 64B flows into the refrigerant pipe 13C on the downstream side of the check valve 30 through the refrigerant pipe 74 and flows through the accumulator 12 to be sucked into the compressor 2 (this is indicated by the solid line arrows in FIG. 17).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed therefrom by the refrigerant evaporated in the refrigerant flow passage 64B, whereby the heat medium is cooled. The heat medium cooled by the heat absorbing operation of the refrigerant flows out from the refrigerant-heat medium heat exchanger 64 and reaches the battery 55 to cool the battery 55, and the heat medium is then sucked into the circulating pump 62, thereby repeating this circulation (indicated by the broken line arrows in FIG. 18).

Thus, in the third heating/battery cooling mode (the second operation mode), the refrigerant of the refrigerant circuit R evaporates in the refrigerant-heat medium heat exchanger 64 and absorbs heat from only the heat medium (battery 55) of the battery temperature adjustment device 61. Consequently, the refrigerant does not flow into the outdoor heat exchanger 7, and pumps up the heat from only the battery 55 through the heat medium. Therefore, while eliminating the problem of frosting to the outdoor heat exchanger 7, the battery 55 is cooled and the heat pumped up from the battery 55 is transferred to the radiator 4, thereby making it possible to heat the vehicle interior.

(8-2-1) Obstruction of Reverse Flowing into Outdoor Heat Exchanger 7 and Heat Absorber 9 in Third Heating/Battery Cooling Mode (Second Operation Mode of the Present Invention)

Here, when the refrigerant circuit R is in the third heating/battery cooling mode (the second operation mode of the present invention), the refrigerant does not flow into the outdoor heat exchanger 7 and the heat absorber 9. When the environment in which the outdoor air temperature is low is reached in such a state, there is a case where the temperatures of the outdoor heat exchanger 7 and the heat absorber 9 become lower than the temperature of the refrigerant having absorbed heat from the heat medium by the refrigerant-heat medium heat exchanger 64. When such a state is reached, the pressure of the refrigerant discharged from the refrigerant flow passage 64B of the refrigerant-heat medium heat exchanger 64 and flowing into the refrigerant pipe 13C becomes higher than on the side of the outdoor heat exchanger 7 and the heat absorber 9, so that the refrigerant flowing into the refrigerant pipe 13C flows toward the outdoor heat exchanger 7 and the heat absorber 9 other than the accumulator 12.

On the other hand, it is not possible to obstruct the refrigerant flowing in the direction of the outdoor heat exchanger 7 even when the solenoid valve 21 is closed. Therefore, when the pressure of the refrigerant flowing out from the refrigerant flow passage 64B of the refrigerant-heat medium heat exchanger 64 and flowing into the refrigerant pipe 13C as described above becomes higher than on the side of the outdoor heat exchanger 7 and the heat absorber 9, the refrigerant reversely flows into the outdoor heat exchanger 7 and the heat absorber 9 and remains stayed thereinside to reduce its circulated refrigerant amount, so that a sufficient heating capability cannot be exerted.

In the present invention, however, the check valve 30 is connected to the refrigerant pipe 13C at the portion between the joining point between the refrigerant pipe 13D and the refrigerant pipe 13C, and the accumulator 12 located on the refrigerant suction side of the compressor 2, and the check valve 30 allows the flow of the refrigerant toward the accumulator 12 (the compressor 2) to serve as the forward direction. It is therefore possible to obstruct the flow of the refrigerant discharged from the refrigerant flow passage 64B of the refrigerant-heat medium heat exchanger 64 toward the outdoor heat exchanger 7 and the heat absorber 9 by the check valve 30. It is thus possible to eliminate the disadvantage that the refrigerant reversely flows into the outdoor heat exchanger 7 and the heat absorber 9 and remains stayed therein, and the circulated refrigerant amount of the refrigerant circuit R is reduced to degrade the heating capability.

(8-3) Second Heating/Battery Cooling Mode (First Operation Mode of the Present Invention)

Figure 19:
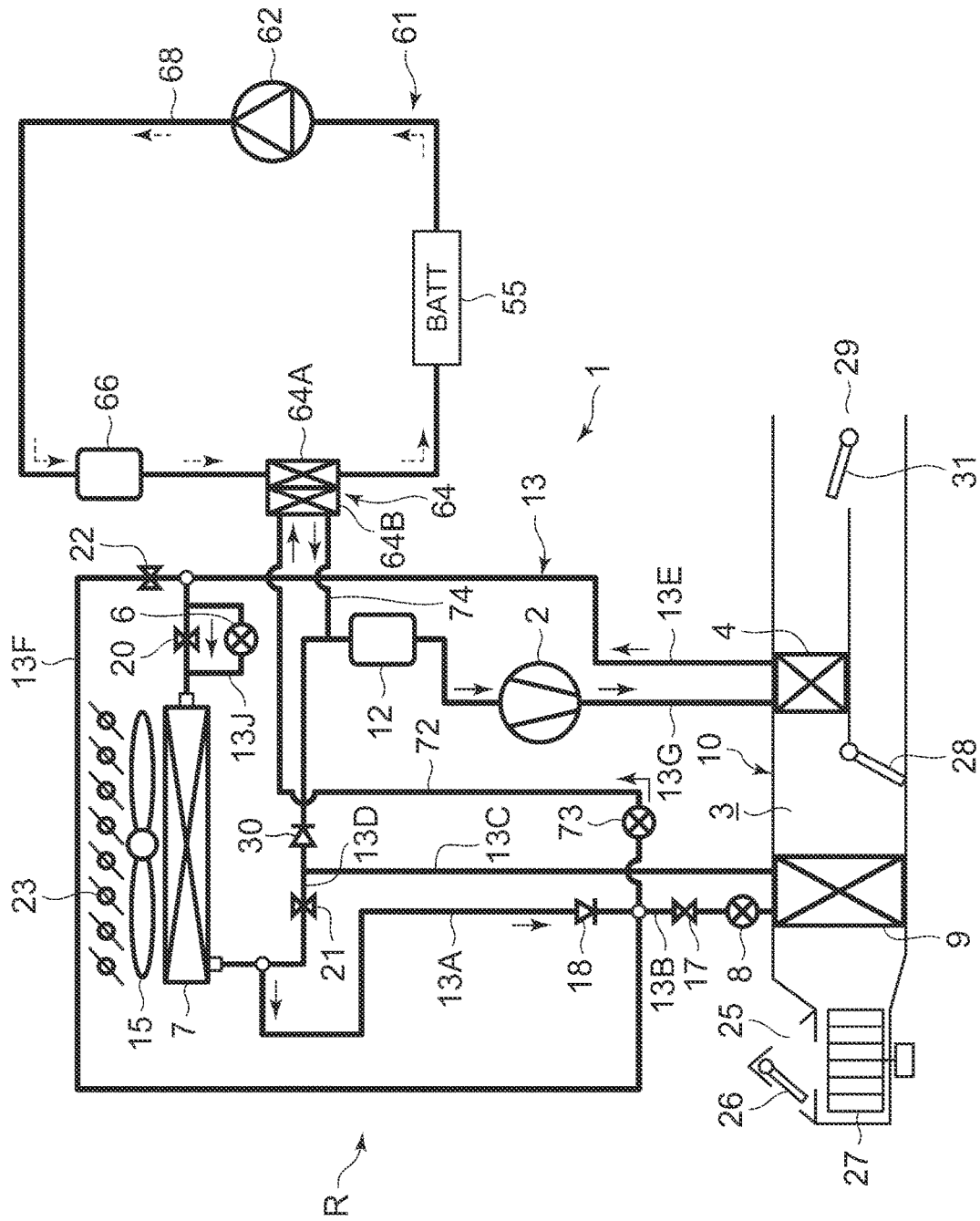
FIG. 19 is a diagram describing a second heating/battery cooling mode by the controller of FIG. 2.
Figure 20:
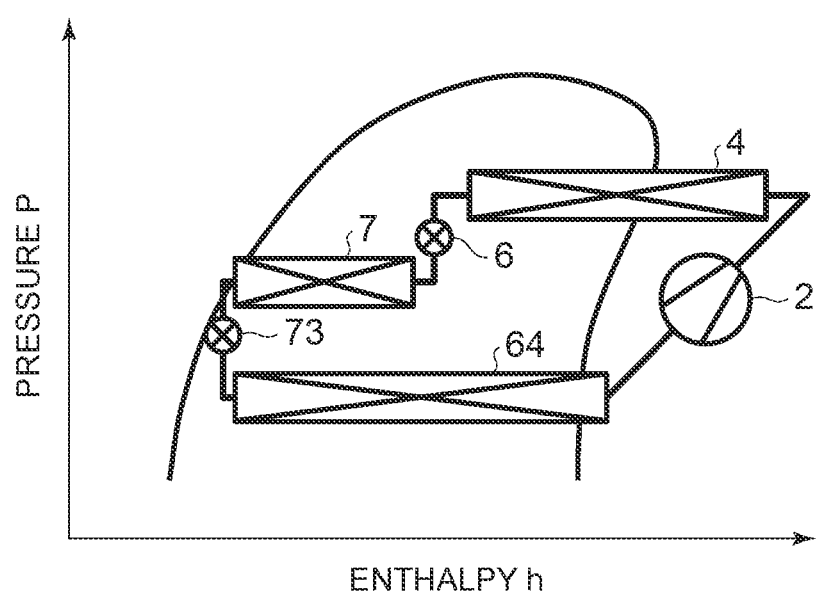
FIG. 20 is a p-h diagram of the second heating/battery cooling mode of FIG. 19.

Next, when the heating load of the vehicle interior is small (e.g., the temperature of indoor air is relatively high), and the amount of heat generation of the battery 55 is large (the cooling load is large), i.e., when the required battery cooling capability Qbat is larger than the required heating capability Qtgt (Qtgt<Qbat), the controller 32 executes the second heating/battery cooling mode. FIG. 19 shows the flow (solid line arrows) of the refrigerant of the refrigerant circuit R in the second heating/battery cooling mode (the first operation mode), and the flow (broken line arrows) of the heat medium of the battery temperature adjustment device 61. FIG. 20 shows a p-h diagram of the refrigerant circuit R in the second heating/battery cooling mode. Incidentally, in FIG. 20, each constituent device of the refrigerant circuit R is shown on the p-h diagram.

In the second heating/battery cooling mode (the first operation mode), the controller 32 has a state of closing the solenoid valves 17, 20, 21, and 22, opening the outdoor expansion valve 6, and also opening the auxiliary expansion valve 73 to control its valve position. Then, the controller operates the compressor 2, the outdoor blower 15, and the indoor blower 27, opens the shutter 23, and also operates the circulating pump 62 of the battery temperature adjustment device 61 (the heat medium heating heater 66 being non-energized). Consequently, the refrigerant flowing out from the radiator 4 flows through the outdoor expansion valve 6 into the outdoor heat exchanger 7 and flows through the refrigerant pipe 13A to reach the refrigerant upstream side of the solenoid valve 17. The refrigerant then enters the branch pipe 72 and is decompressed in the auxiliary expansion valve 73 and then flows through the branch pipe 72 into the refrigerant flow passage 64B of the refrigerant-heat medium heat exchanger 64 to evaporate. At this time, a heat absorbing operation is exerted. A circulation is repeated in which the refrigerant evaporated in the refrigerant flow passage 64B flows through the refrigerant pipe 74 into the refrigerant pipe 13C, and flows through the accumulator 12 to be sucked into the compressor 2 (this is indicated by the solid line arrows in FIG. 19).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed therefrom by the refrigerant evaporated in the refrigerant flow passage 64B, whereby the heat medium is cooled. The heat medium cooled by the heat absorbing operation of the refrigerant flows out from the refrigerant-heat medium heat exchanger 64 and reaches the battery 55 to cool the battery 55, and the heat medium is then sucked into the circulating pump 62, thereby repeating this circulation (indicated by the broken line arrows in FIG. 20).

Thus, in the second heating/battery cooling mode (the first operation mode), the refrigerant of the refrigerant circuit R radiates heat in the radiator 4 and the outdoor heat exchanger 7 and evaporates in the refrigerant-heat medium heat exchanger 64, and absorbs heat from the heat medium (battery 55) of the battery temperature adjustment device 61. The controller 32 controls the operation (the number of revolutions NC) of the compressor 2 on the basis of the battery temperature Tb detected by the battery temperature sensor 76, and the target battery temperature TBO to adjust the cooling capability of the battery 55 by the battery temperature adjustment device 61.

Further, the valve position of the outdoor expansion valve 6 is controlled to control the circulation of the refrigerant in the radiator 4 and thereby to adjust the amount of heat radiation of the refrigerant in the radiator 4. The valve position of the auxiliary expansion valve 73 is controlled to control the circulation of the refrigerant in the outdoor heat exchanger 7 and thereby to adjust the amount of heat radiation of the refrigerant in the outdoor heat exchanger 7. Consequently, it is possible to cool the battery 55 to thereby discard its heat into the outdoor air, and also perform the heating of the vehicle interior.

Figure 21:
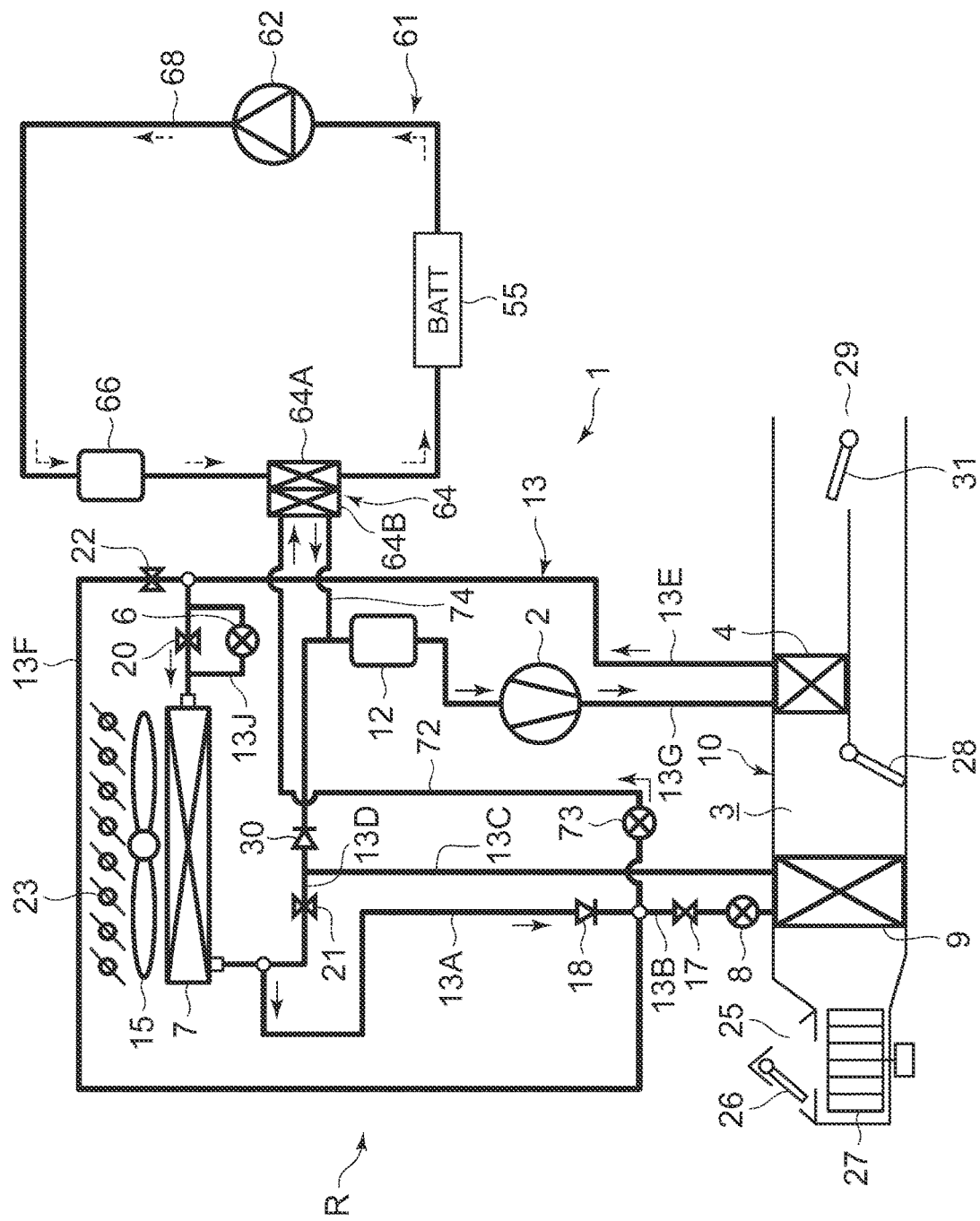
FIG. 21 is another diagram describing the second heating/battery cooling mode by the controller of FIG. 2.
Figure 22:
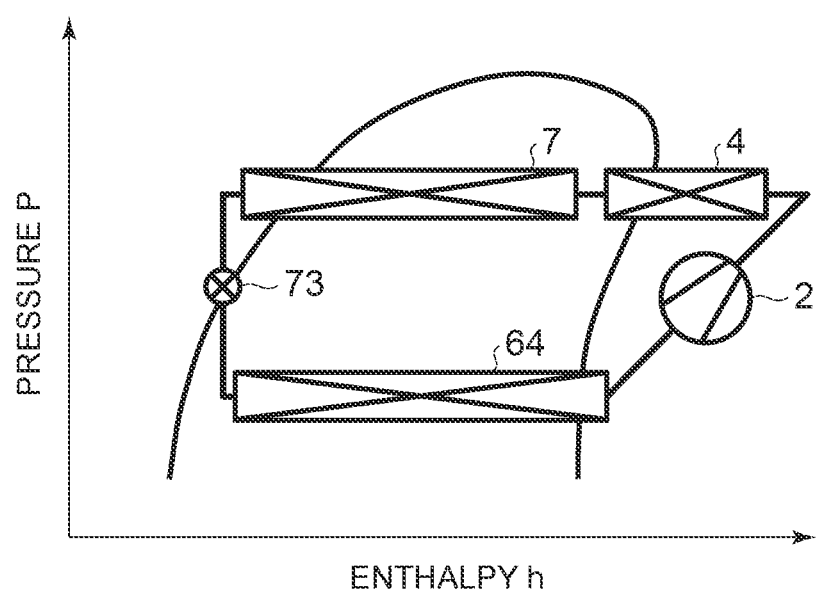
FIG. 22 is a p-h diagram of the second heating/battery cooling mode of FIG. 21.

Here, when due to execution of rapid charging of the battery 55, etc., the amount of heat generation of the battery 55 becomes extremely large, and the required battery cooling capability Qbat becomes extremely larger than the required heating capability Qtgt (Qtgt<<Qbat), the controller 32 further opens the solenoid valve 20 in the state of the second heating/battery cooling mode in FIGS. 19 and 20. FIG. 21 shows the flow (solid line arrows) of the refrigerant of the refrigerant circuit R in the second heating/battery cooling mode in this case, and the flow (broken line arrows) of the heat medium of the battery temperature adjustment device 61. FIG. 22 shows a p-h diagram of the refrigerant circuit R in the second heating/battery cooling mode in this case (in FIG. 22, each constituent device of the refrigerant circuit R is shown on the p-h diagram).

With the solenoid valve 20 of the refrigerant circuit R being opened in addition to the states of FIGS. 19 and 20 as described above, the refrigerant radiated in the radiator 4 flows out from the radiator 4 and flows into the outdoor heat exchanger 7 as it is, followed by being radiated into the outdoor air (the refrigerant is indicated by the solid line arrows in FIG. 21). Consequently, a great amount of excessive heat can be discharged into the outdoor air while heating the vehicle interior by using a great amount of heat generated in the battery 55. Even in this case, the controller 32 controls the operation of the compressor 2 (the number of revolutions NC) on the basis of the battery temperature Tb detected by the battery temperature sensor 76 and the target battery temperature TBO to thereby adjust the cooling capability of the battery 55 by the battery temperature adjustment device 61.

Further, the controller 32 controls passing of the air through the outdoor heat exchanger 7 by the number of revolutions of the outdoor blower 15 and the opening/closing of the shutter 23 to adjust the heating capability of the vehicle interior. When, however, the heating capability in the radiator 4 becomes excessive even with the number of revolutions of the outdoor blower 15 as the maximum (a situation in which the amount of heat generation of the battery 55 is extremely large), the controller 32 controls the air mix damper 28 to control a ratio at which the air is to be passed through the radiator 4, for example, in its decreasing direction, thereby adjusting the heating capability of the vehicle interior.

(8-3-1) Obstruction of Reverse Flowing into Heat Absorber 9 in Second Heating/Battery Cooling Mode (First Operation Mode of the Present Invention)

Here, even when the refrigerant circuit R is in the second heating/battery cooling mode (the first operation mode of the present invention), the refrigerant does not flow into the heat absorber 9. When the environment in which the outdoor air temperature is low is reached in such a state, there is a case where the temperature of the heat absorber 9 becomes lower than the temperature of the refrigerant having absorbed heat from the heat medium by the refrigerant-heat medium heat exchanger 64. When such a state is reached, the pressure of the refrigerant discharged from the refrigerant flow passage 64B of the refrigerant-heat medium heat exchanger 64 and flowing into the refrigerant pipe 13C becomes higher than on the heat absorber 9 side, so that the refrigerant flowing into the refrigerant pipe 13C flows toward the heat absorber 9 other than the accumulator 12 and reversely flows into the heat absorber 9, where the refrigerant remains stayed thereinside to thereby reduce its circulated refrigerant amount, whereby a sufficient heating capability cannot be exerted.

In the present invention, however, the check valve 30 is connected to the refrigerant pipe 13C at the portion between the joining point between the refrigerant pipe 13D and the refrigerant pipe 13C, and the accumulator 12 located on the refrigerant suction side of the compressor 2, and the check valve 30 allows the flow of the refrigerant toward the accumulator 12 (the compressor 2) to serve as the forward direction. It is therefore possible to obstruct the flow of the refrigerant discharged from the refrigerant flow passage 64B of the refrigerant-heat medium heat exchanger 64 toward the heat absorber 9 by the check valve 30. It is thus possible to eliminate the disadvantage that the refrigerant reversely flows into the heat absorber 9 and remains stayed therein, and the circulated refrigerant amount of the refrigerant circuit R is reduced to degrade the heating capability.

In the present invention as described above, there is provided the check valve 30 for obstructing the flow of the refrigerant discharged from the refrigerant-heat medium heat exchanger 64 and directed toward the outdoor heat exchanger 7 and the heat absorber 9. Therefore, in the situation in which the temperatures of the outdoor heat exchanger 7 and the heat absorber 9 become lower than that of the refrigerant-heat medium heat exchanger 64 under the environment in which the outdoor air temperature is low, the flow of the refrigerant flowing out from the refrigerant-heat medium heat exchanger 64 toward the outdoor heat exchanger 7 and the heat absorber 9 can be obstructed by the check valve 30.

Thus, as described above, since the flow of the refrigerant discharged from the refrigerant-heat medium heat exchanger 64 toward the outdoor heat exchanger 7 and the heat absorber 9 can be obstructed by the check valve 30 in the situation in which in the second heating/battery cooling mode (the first operation mode) and the third heating/battery cooling mode (the second operation mode), the outdoor air temperature is low, and the temperatures of the outdoor heat exchanger 7 and the heat absorber 9 become lower than that of the refrigerant-heat medium heat exchanger 64, it is possible to eliminate the disadvantage that the refrigerant reversely flows into the outdoor heat exchanger 7 and the heat absorber 9 and remains stayed therein to reduce the circulated refrigerant amount, thereby degrading the heating capability.

Then, in the embodiment, there are provided the outdoor expansion valve 6 to decompress the refrigerant flowing out from the radiator 4 and flowing into the outdoor heat exchanger 7, the solenoid valve 17 and the indoor expansion valve 8 (the valve device) to control the inflow of the refrigerant into the heat absorber 9, the refrigerant pipe 13D (the first refrigerant pipe) to absorb the refrigerant flowing out from the outdoor heat exchanger 7 in the compressor 2 without allowing the refrigerant to flow in the solenoid valve 17, the solenoid valve 21 (the first solenoid valve) disposed in the refrigerant pipe 13D, the refrigerant pipe 13F (the bypass circuit) to distribute the refrigerant flowing out from the radiator 4 from the refrigerant upstream side of the outdoor expansion valve 6 to allow the refrigerant to flow to the refrigerant upstream side of the solenoid valve 17, the solenoid valve 22 (the second solenoid valve) disposed in the refrigerant pipe 13F, the branch pipe 72 (the branch circuit) to let the refrigerant flowing out from the refrigerant pipe 13F flow through the refrigerant-heat medium heat exchanger 64, the auxiliary expansion valve 73 disposed in the branch pipe 72 to decompress the refrigerant flowing into the refrigerant-heat medium heat exchanger 64, and the check valve 18 to obstruct the flow of the refrigerant flowing out from the refrigerant pipe 13F and flowing to the outdoor heat exchanger 7. The controller 32 changes and executes the second heating/battery cooling mode (the first operation mode) to open the outdoor expansion valve 6, close the solenoid valve 21, the solenoid valve 22, and the solenoid valve 17, decompress the refrigerant flowing into the refrigerant-heat medium heat exchanger 64 by the auxiliary expansion valve 73, and thereby control the battery temperature adjustment device 61, and the third heating/battery cooling mode (the second operation mode) to open the solenoid valve 22, close the outdoor expansion valve 6, the solenoid valve 21, and the solenoid valve 17, decompress the refrigerant flowing into the refrigerant-heat medium heat exchanger 64 by the auxiliary expansion valve 73, and thereby control the battery temperature adjustment device 61, thereby making it possible to execute each heating/battery cooling mode smoothly.

Incidentally, in the embodiment, the inflow of the refrigerant into the heat absorber 9 is controlled by the solenoid valve 17 and the indoor expansion valve 8, but if the indoor expansion valve 8 is constituted of a fully-closable electric valve, it is also possible to delete the solenoid valve 17 and achieve its role by the indoor expansion valve 8 alone. That is, in that case, the operation of closing the solenoid valve 17 becomes equivalent to the operation of fully closing the valve position of the indoor expansion valve 8 in the embodiment of the present application.

(8-4) Defrosting/Heating/Battery Cooling Mode

Figure 23:
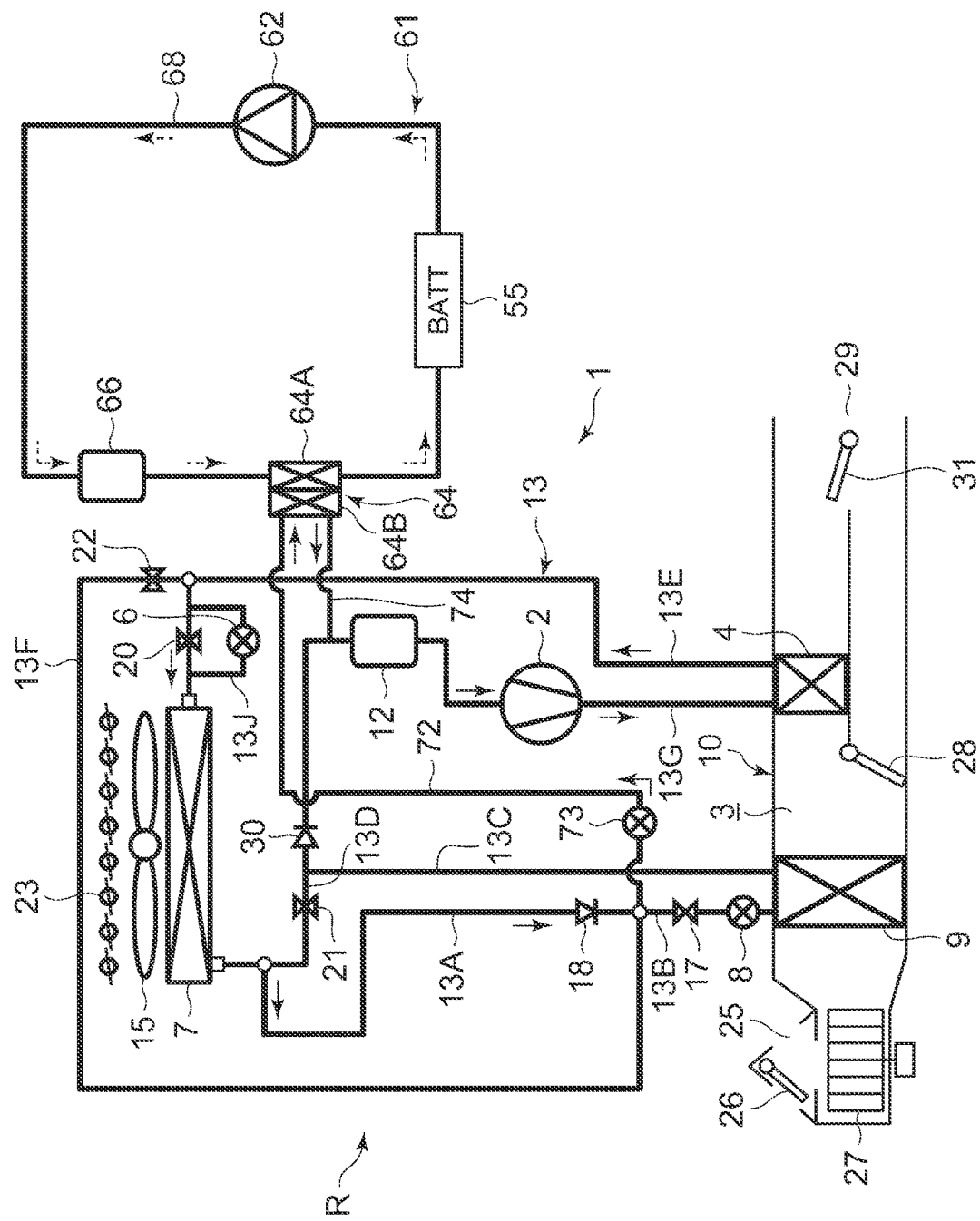
FIG. 23 is another diagram describing a defrosting/heating/battery cooling mode by the controller of FIG. 2.
Figure 24:
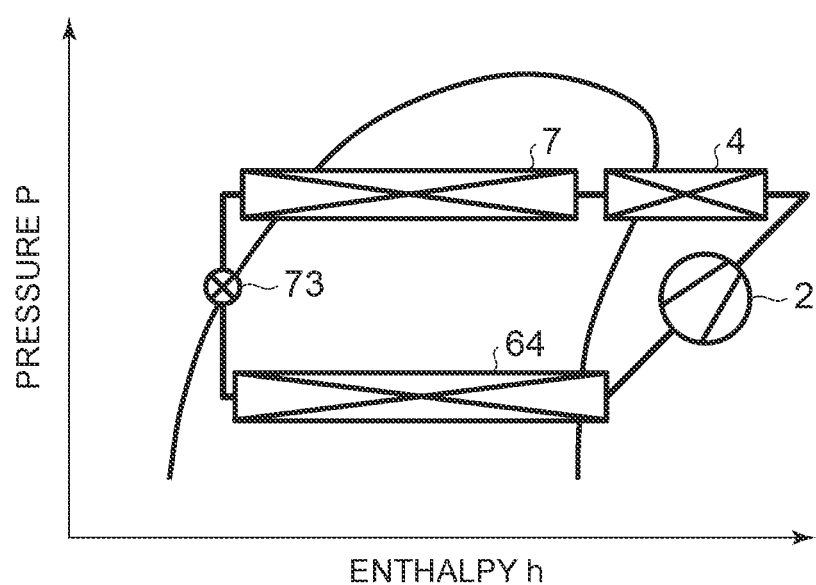
FIG. 24 is a p-h diagram of the defrosting/heating/battery cooling mode of FIG. 23.

Next, description will be made as to the defrosting/heating/battery cooling mode by the controller 32. Since the outdoor heat exchanger 7 functions as the evaporator as described above during the heating operation, the water in the outdoor air grows into frost in the outdoor heat exchanger 7, and heat exchange efficiency is deteriorated. The controller 32 calculates an outdoor heat exchanger temperature TXObase at the time of non-frosting which is calculated from, for example, the outdoor air temperature Tam, the number of revolutions NC of the compressor 2, etc., and always compares the outdoor heat exchanger temperature TXObase at the non-frosting time and the outdoor heat exchanger temperature TXO detected by the outdoor heat exchanger temperature sensor 54. Then, when the outdoor heat exchanger temperature TXO is lowered than the outdoor heat exchanger temperature TXObase at the time of non-frosting, and the difference therebetween becomes a predetermined value or more, the controller executes the defrosting/heating/battery cooling mode to perform the heating of the vehicle interior and the cooling of the battery 55 while defrosting the outdoor heat exchanger 7 when the required battery cooling capability Qbat calculated in the aforementioned equation (IV) becomes plus (FIG. 23 and FIG. 24).

In the defrosting/heating/battery cooling mode, the shutter 23 is closed in the state of the refrigerant circuit R in the aforementioned second heating/battery cooling mode of FIG. 21 to obstruct the inflow of the running wind into the outdoor heat exchanger 7. Further, the outdoor blower 15 is stopped, and the compressor 2 and the indoor blower 27 are operated. Then, the circulating pump 62 of the battery temperature adjustment device 61 is also operated, and the heat is exchanged between the refrigerant and the heat medium in the refrigerant-heat medium heat exchanger 64. Incidentally, when the shutter 23 is provided as in the embodiment, the shutter 23 is closed, but when the shutter 23 is not provided, the outdoor blower 15 is stopped and the forced ventilation of the outdoor air is only stopped. FIG. 23 shows the flow (solid line arrows) of the refrigerant of the refrigerant circuit R in the defrosting/heating/battery cooling mode, and the flow (broken line arrows) of the heat medium of the battery temperature adjustment device 61. FIG. 24 shows a p-h diagram of the refrigerant circuit R in the defrosting/heating/battery cooling mode (each constituent device of the refrigerant circuit R is shown on the p-h diagram in FIG. 24).

Thus, the high-temperature refrigerant discharged from the compressor 2 flows into the radiator 4 and radiates heat, and heats the air to be passed into the air flow passage 3, and then flows through the solenoid valve 20 into the outdoor heat exchanger 7. Since the outdoor air and the running wind do not pass through the outdoor heat exchanger 7, the formed frost grown in the outdoor heat exchanger 7 is heated by the flowing high-temperature refrigerant to melt. On the other hand, the refrigerant is condensed in the outdoor heat exchanger 7 and flows out from the outdoor heat exchanger 7 into the branch pipe 72 in the same manner as described above. After the refrigerant is decompressed in the auxiliary expansion valve 73, it evaporates in the refrigerant flow passage 64B of the refrigerant-heat medium heat exchanger 64.

The refrigerant absorbs heat from the heat medium circulated in the battery temperature adjustment device 61 here, and hence, cools the battery 55 as its result, so that the vehicle interior is heated by the heat pumped up from the heat medium while defrosting the outdoor heat exchanger 7. Incidentally, when it is desired to quickly defrost the outdoor heat exchanger 7, the controller 32 may allow the heat medium heating heater 66 to generate heat. In that case, the heat of the heat medium heating heater 66 is also pumped up by the refrigerant, and transferred to the outdoor heat exchanger 7 to contribute to defrosting.

Thus, the controller 32 executes, in the state of the outdoor air not passing through the outdoor heat exchanger 7 or the state of obstructing the inflow of the running wind, the defrosting/heating/battery cooling mode to let the refrigerant discharged from the compressor 2 radiate heat in the radiator 4 and the outdoor heat exchanger 7, decompress the so-radiated refrigerant in the auxiliary expansion valve 73, and then let the refrigerant absorb heat in the refrigerant-heat medium heat exchanger 64. It is therefore possible to pump up the heat of the battery 55 and thereby heat the vehicle interior while defrosting the outdoor heat exchanger 7 by the high-temperature refrigerant discharged from the compressor 2.

(8-5) Cooling/Battery Cooling Mode

Figure 25:
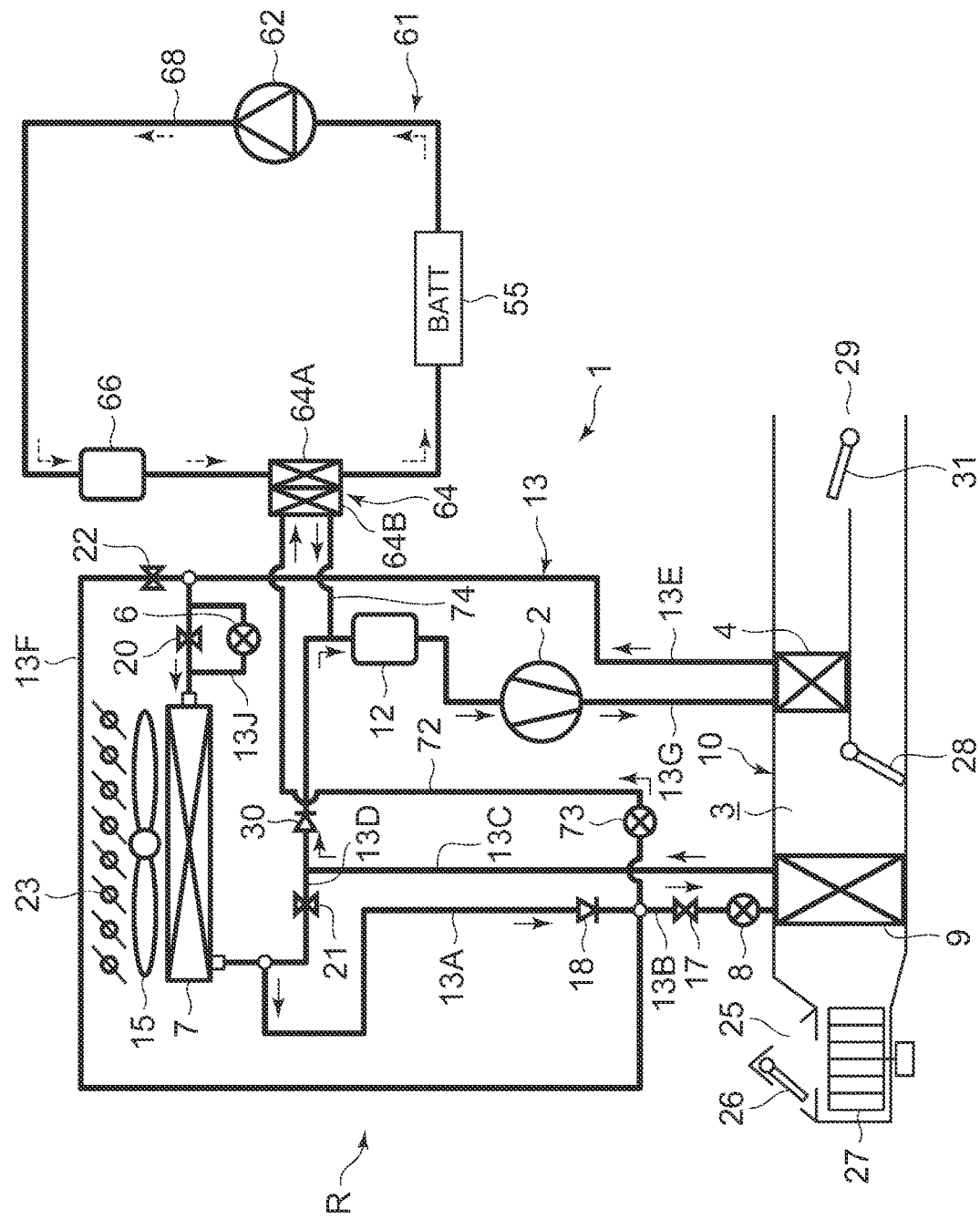
FIG. 25 is a diagram describing a cooling/battery cooling mode by the controller of FIG. 2.
Figure 26:
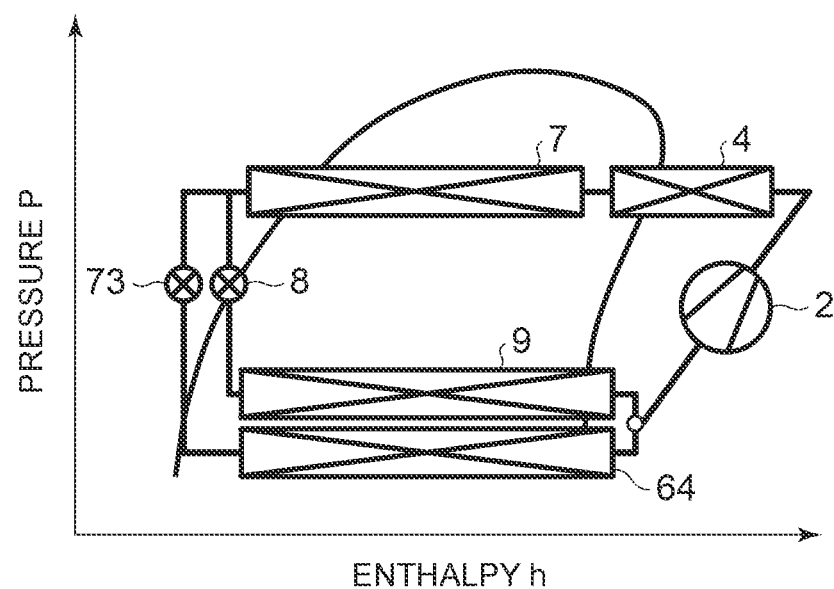
FIG. 26 is a p-h diagram of the cooling/battery cooling mode of FIG. 25.

Next, when the battery temperature Tb rises due to the charging/discharging or the like and becomes higher than the target battery temperature TBO during the aforementioned cooling operation (TBO<Tb), in the embodiment, the controller 32 opens the auxiliary expansion valve 73 and operates the battery temperature adjustment device 61 to start the cooling of the battery 55, thereby executing the cooling/battery cooling mode (FIGS. 25 and 26).

In the cooling/battery cooling mode, the controller 32 has a state of in the state of the refrigerant circuit R in the aforementioned cooling operation of FIG. 11, opening the auxiliary expansion valve 73 to control its valve position, and also operating the circulating pump 62 of the battery temperature adjustment device 61 to exchange the heat between the refrigerant and the heat medium in the refrigerant-heat medium heat exchanger 64. Incidentally, the heat medium heating heater 66 is not energized. FIG. 25 shows the flow (solid line arrows) of the refrigerant of the refrigerant circuit R in the cooling/battery cooling mode, and the flow (broken line arrows) of the heat medium of the battery temperature adjustment device 61. FIG. 26 shows a p-h diagram of the refrigerant circuit R in the cooling/battery cooling mode (in FIG. 26, each constituent device of the refrigerant circuit R is shown on the p-h diagram).

Thus, the high-temperature refrigerant discharged from the compressor 2 flows through the radiator 4 and the solenoid valve 20 successively into the outdoor heat exchanger 7, where the refrigerant exchanges the heat between the outdoor air to be passed by the outdoor blower 15 and the running wind to radiate heat, to condense. A part of the refrigerant condensed in the outdoor heat exchanger 7 reaches the indoor expansion valve 8 and is decompressed therein, and then flows into the heat absorber 9 to evaporate. The air in the air flow passage 3 is cooled by a heat absorbing operation at this time, and hence the vehicle interior is cooled.

The residual refrigerant condensed in the outdoor heat exchanger 7 is distributed to the branch pipe 72 and is decompressed in the auxiliary expansion valve 73, and then evaporates in the refrigerant flow passage 64B of the refrigerant-heat medium heat exchanger 64. Since the refrigerant absorbs heat from the heat medium circulated in the battery temperature adjustment device 61 here, the battery 55 is cooled in the same manner as described above. Incidentally, the refrigerant flowing out from the heat absorber 9 is sucked into the compressor 2 through the refrigerant pipe 13C and the accumulator 12. The refrigerant flowing out from the refrigerant-heat medium heat exchanger 64 is also sucked from the refrigerant pipe 74 to the compressor 2 through the accumulator 12.

(8-6) Dehumidification Cooling/Battery Cooling Mode

Figure 27:
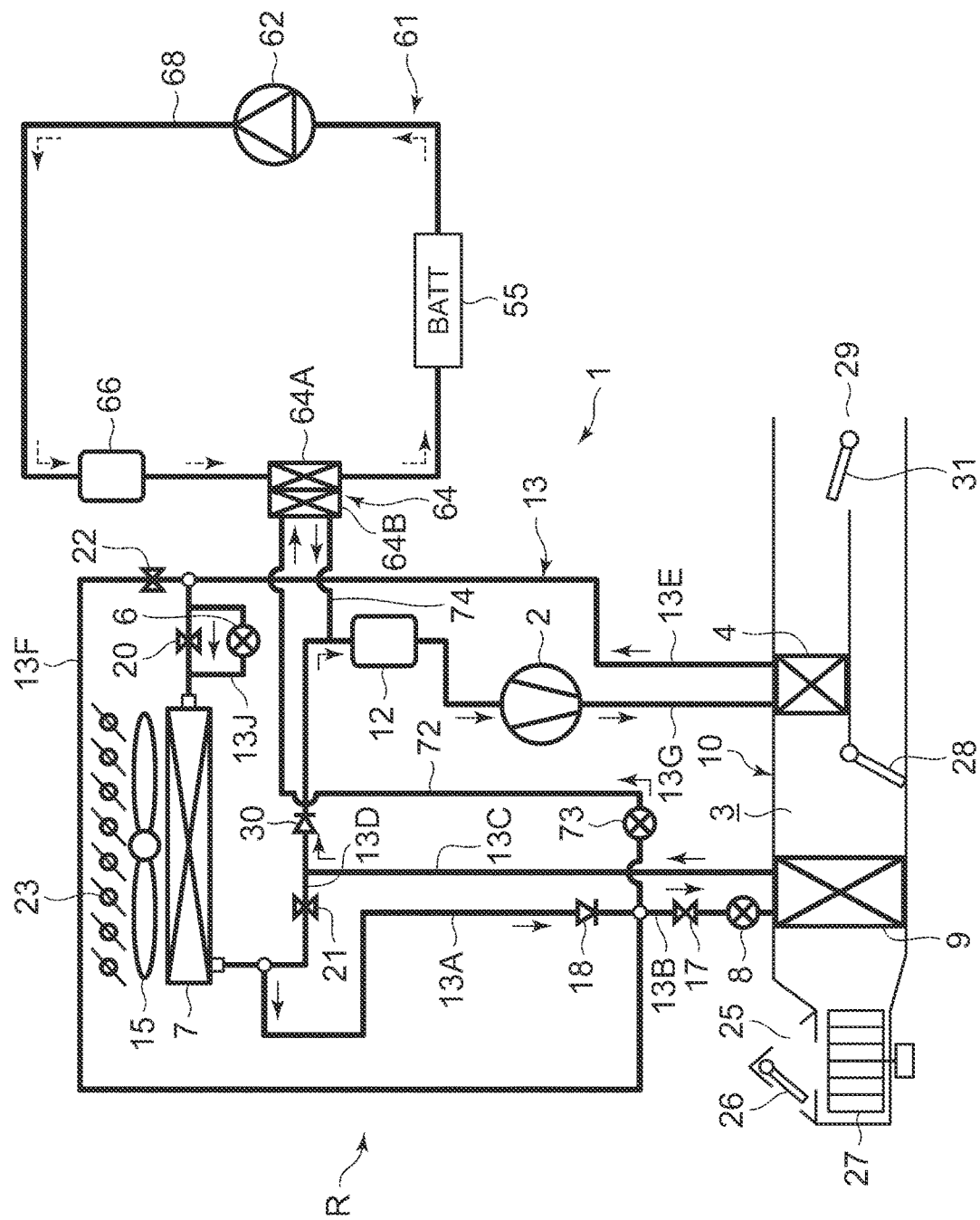
FIG. 27 is a diagram describing a dehumidification cooling/battery cooling mode by the controller of FIG. 2.
Figure 28:
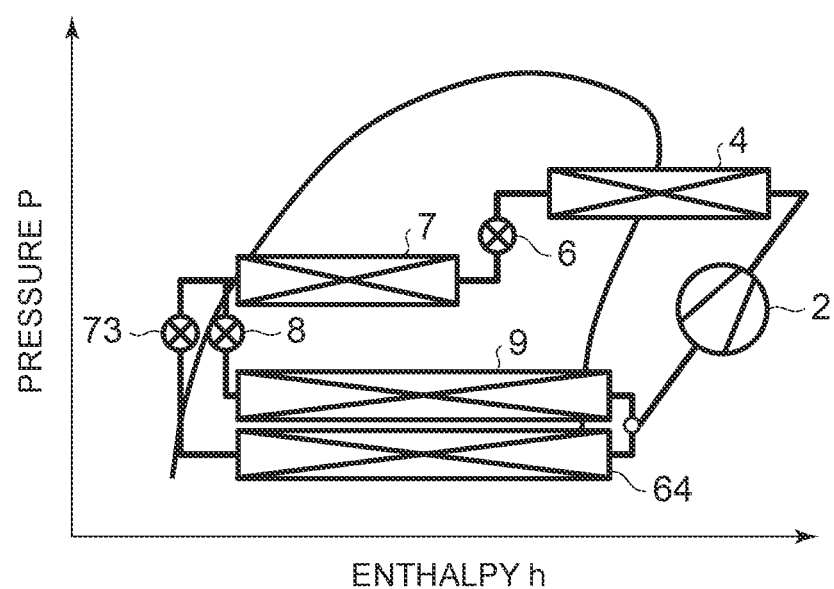
FIG. 28 is a p-h diagram of the dehumidification cooling/battery cooling mode of FIG. 27.

Next, when the battery temperature Tb rises due to the charging/discharging or the like and becomes higher than the target battery temperature TBO during the aforementioned dehumidifying and cooling operation (TBO<Tb), in the embodiment, the controller 32 opens the auxiliary expansion valve 73 and operates the battery temperature adjustment device 61 to start the cooling of the battery 55, thereby executing the dehumidification cooling/battery cooling mode (FIGS. 27 and 28).

In the dehumidification cooling/battery cooling mode, the controller 32 has a state of in the state of the refrigerant circuit R in the aforementioned dehumidifying and cooling operation of FIG. 9, opening the auxiliary expansion valve 73 to control its valve position, and also operating the circulating pump 62 of the battery temperature adjustment device 61 to exchange the heat between the refrigerant and the heat medium in the refrigerant-heat medium heat exchanger 64. Incidentally, the heat medium heating heater 66 is not energized. FIG. 27 shows the flow (solid line arrows) of the refrigerant of the refrigerant circuit R in the dehumidification cooling/battery cooling mode, and the flow (broken line arrows) of the heat medium of the battery temperature adjustment device 61. FIG. 28 shows a p-h diagram of the refrigerant circuit R in the dehumidification cooling/battery cooling mode (in FIG. 28, each constituent device of the refrigerant circuit R is shown on the p-h diagram).

Thus, the high-temperature high-pressure gas refrigerant discharged from the compressor 2 flows into the radiator 4. Since the air in the air flow passage 3 is passed through the radiator 4, the air in the air flow passage 3 is heated by the high-temperature refrigerant in the radiator 4. On the other hand, the refrigerant in the radiator 4 has the heat taken by the air and is cooled to condense and liquefy. The refrigerant flowing out from the radiator 4 reaches the outdoor expansion valve 6 and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15 to condense. A part of the refrigerant flowing out from the outdoor heat exchanger 7 reaches the indoor expansion valve 8 and is decompressed therein, and then flows into the heat absorber 9 to evaporate. The air to be supplied from the air flow passage 3 to the vehicle interior is cooled and dehumidified by a heat absorbing operation at this time and hence, the vehicle interior is dehumidified and cooled.

The residual refrigerant condensed in the outdoor heat exchanger 7 is distributed to the branch pipe 72 and is decompressed in the auxiliary expansion valve 73, and then evaporates in the refrigerant flow passage 64B of the refrigerant-heat medium heat exchanger 64. Since the refrigerant absorbs heat from the heat medium circulated in the battery temperature adjustment device 61 here, the battery 55 is cooled in the same manner as described above. Incidentally, the refrigerant flowing out from the heat absorber 9 is sucked into the compressor 2 through the refrigerant pipe 13C and the accumulator 12. The refrigerant flowing out from the refrigerant-heat medium heat exchanger 64 is also sucked from the refrigerant pipe 74 to the compressor 2 through the accumulator 12.

Figure 29:
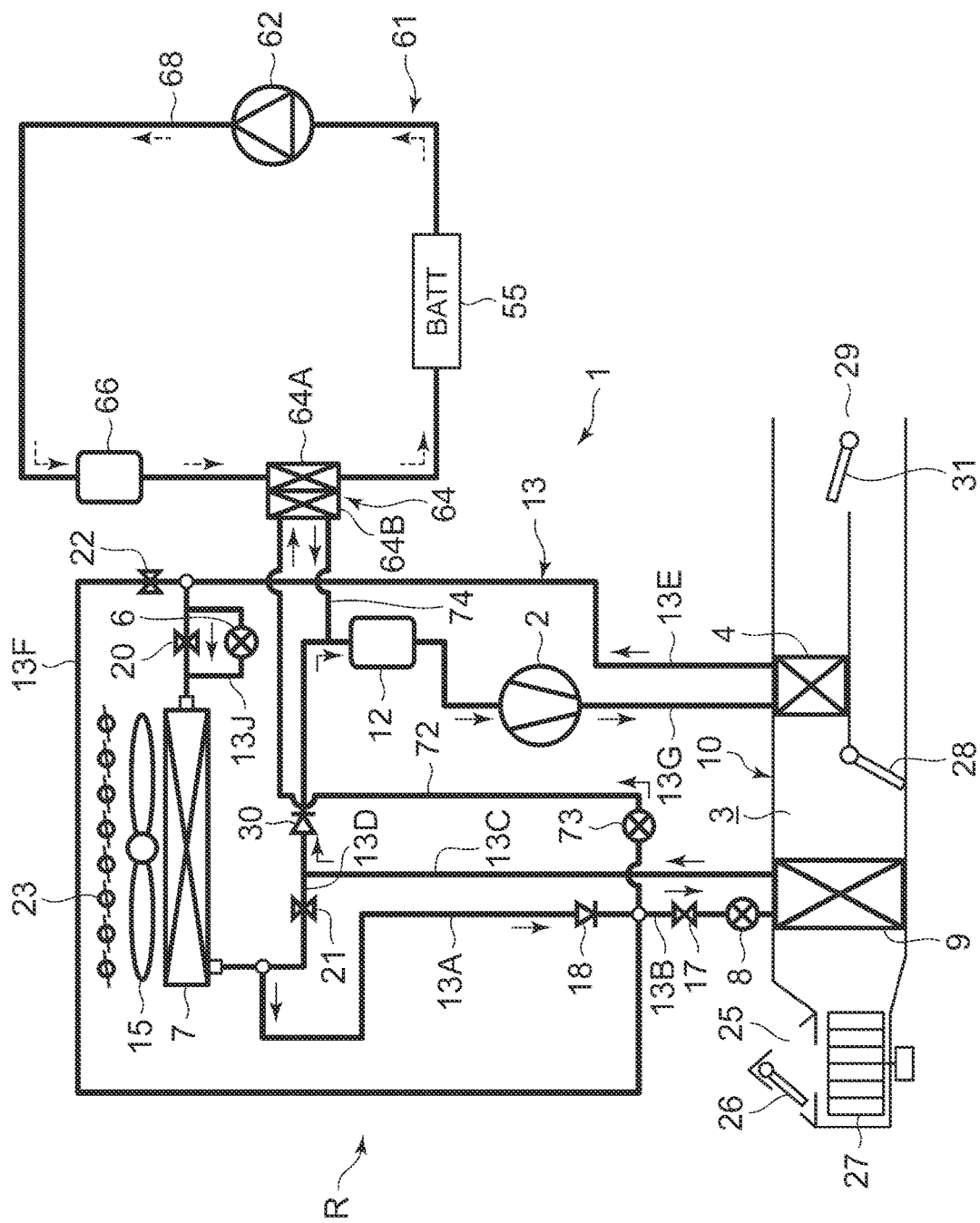
FIG. 29 is a diagram describing a dehumidification cooling/battery cooling mode (shutter being closed) by the controller of FIG. 2.

Incidentally, as shown in FIG. 13 mentioned above, the cooling of the battery 55 can be performed even in the state in which in the dehumidifying and cooling operation, the shutter 23 is closed, and the outdoor blower 15 is also stopped. The flow of the refrigerant and the state of the shutter 23 in the dehumidification cooling/battery cooling mode (the shutter being closed) are shown in FIG. 29, and a p-h diagram of the refrigerant circuit R is shown in FIG. 30 (in FIG. 30, each constituent device of the refrigerant circuit R is shown on the p-h diagram).

Figure 30:
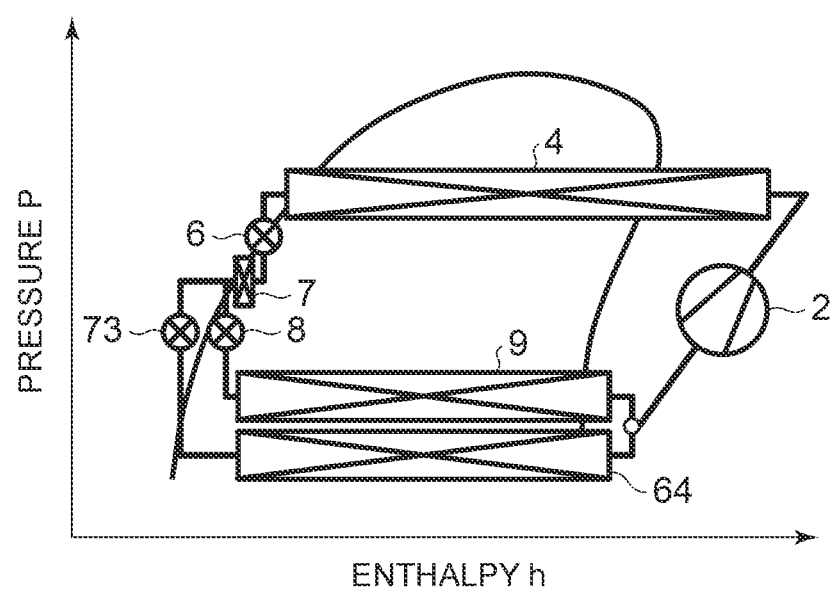
FIG. 30 is a p-h diagram of the dehumidification cooling/battery cooling mode of FIG. 29.

That is, even in this case, the running wind does not flow into the outdoor heat exchanger 7, and the ventilation of the outdoor air is eliminated as well, and hence the amount of heat exchange between the refrigerant and the outdoor air in the outdoor heat exchanger 7 becomes extremely small as shown in the p-h diagram of FIG. 30. Since the amount of radiation of the refrigerant in the radiator 4 increases correspondingly, the valve position of the outdoor expansion valve 6 is greatly reduced, or the radiator pressure PCI can be set to the target radiator pressure PCO even without taking the minimum valve position, thereby making it possible to prevent even the temperature spot which occurs in the heat absorber 9.

The refrigerant flowing out from the outdoor heat exchanger 7 is distributed to the refrigerant directed from the indoor expansion valve 8 to the heat absorber 9 and the refrigerant directed to the branch pipe 72 in the same manner as in FIG. 27. The refrigerant flowing into the branch pipe 72 is decompressed in the auxiliary expansion valve 73, and then evaporates in the refrigerant flow passage 64B of the refrigerant-heat medium heat exchanger 64. Here, the refrigerant absorbs heat from the heat medium circulated in the battery temperature adjustment device 61, and hence, the battery 55 is cooled in the same manner as the above. Incidentally, the refrigerant flowing out from the heat absorber 9 is sucked into the compressor 2 through the refrigerant pipe 13C and the accumulator 12. The refrigerant flowing out from the refrigerant-heat medium heat exchanger 64 is also sucked from the refrigerant pipe 74 to the compressor 2 through the accumulator 12.

(8-7) Internal Cycle/Battery Cooling Mode

Figure 31:
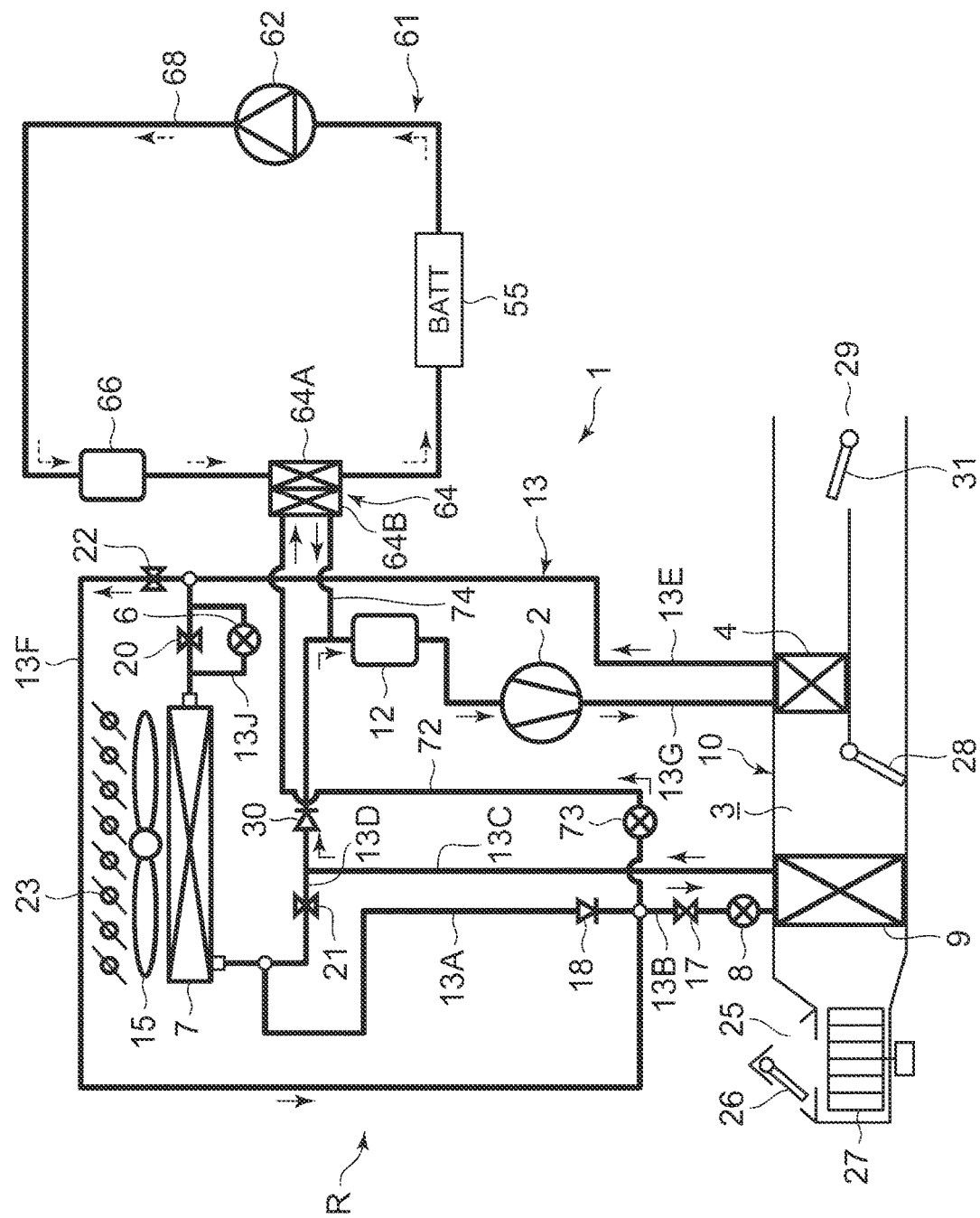
FIG. 31 is a diagram describing an internal cycle/battery cooling mode by the controller of FIG. 2.
Figure 32:
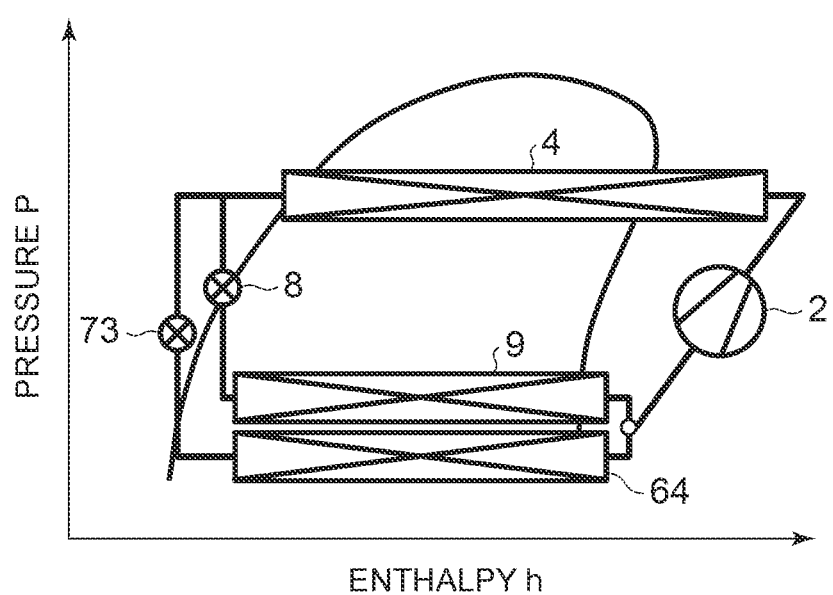
FIG. 32 is a p-h diagram of the internal cycle/battery cooling mode of FIG. 31.

Next, when the battery temperature Tb rises due to the charging/discharging or the like and becomes higher than the target battery temperature TBO during the aforementioned internal cycle operation (TBO<Tb), in the embodiment, the controller 32 opens the auxiliary expansion valve 73 and operates the battery temperature adjustment device 61 to start the cooling of the battery 55, thereby executing the internal cycle/battery cooling mode (FIGS. 31 and 32).

In the internal cycle/battery cooling mode, the controller 32 has a state of in the state of the refrigerant circuit R in the aforementioned internal cycle operation of FIG. 7, opening the auxiliary expansion valve 73 to control its valve position, and also operating the circulating pump 62 of the battery temperature adjustment device 61 to exchange the heat between the refrigerant and the heat medium in the refrigerant-heat medium heat exchanger 64. Incidentally, the heat medium heating heater 66 is not energized. FIG. 31 shows the flow (solid line arrows) of the refrigerant of the refrigerant circuit R in this internal cycle/battery cooling mode, and the flow (broken line arrows) of the heat medium of the battery temperature adjustment device 61. FIG. 32 shows a p-h diagram of the refrigerant circuit R in the internal cycle/battery cooling mode (in FIG. 32, each constituent device of the refrigerant circuit R is shown on the p-h diagram).

Consequently, the high-temperature refrigerant discharged from the compressor 2 radiates heat in the radiator 4, and then, all the refrigerant flows through the solenoid valve 22 into the refrigerant pipe 13F. Then, a part of the refrigerant flowing out from the refrigerant pipe 13F reaches from the refrigerant pipe 13B to the indoor expansion valve 8 through the solenoid valve 17, and is decompressed therein, and then flows into the heat absorber 9 to evaporate. The water in the air blown out from the indoor blower 27 coagulates to adhere to the heat absorber 9 by the heat absorbing operation at this time, and hence, the air is cooled and dehumidified.

The residual refrigerant flowing out from the refrigerant pipe 13F is distributed to the branch pipe 72 and is decompressed in the auxiliary expansion valve 73, and then evaporates in the refrigerant flow passage 64B of the refrigerant-heat medium heat exchanger 64. Since the refrigerant absorbs heat from the heat medium circulated in the battery temperature adjustment device 61 here, the battery 55 is cooled in the same manner as described above. Incidentally, the refrigerant flowing out from the heat absorber 9 is sucked into the compressor 2 through the refrigerant pipe 13C and the accumulator 12. The refrigerant flowing out from the refrigerant-heat medium heat exchanger 64 is also sucked from the refrigerant pipe 74 to the compressor 2 through the accumulator 12.

(8-8) Dehumidification Heating/Battery Cooling Mode

Figure 33:
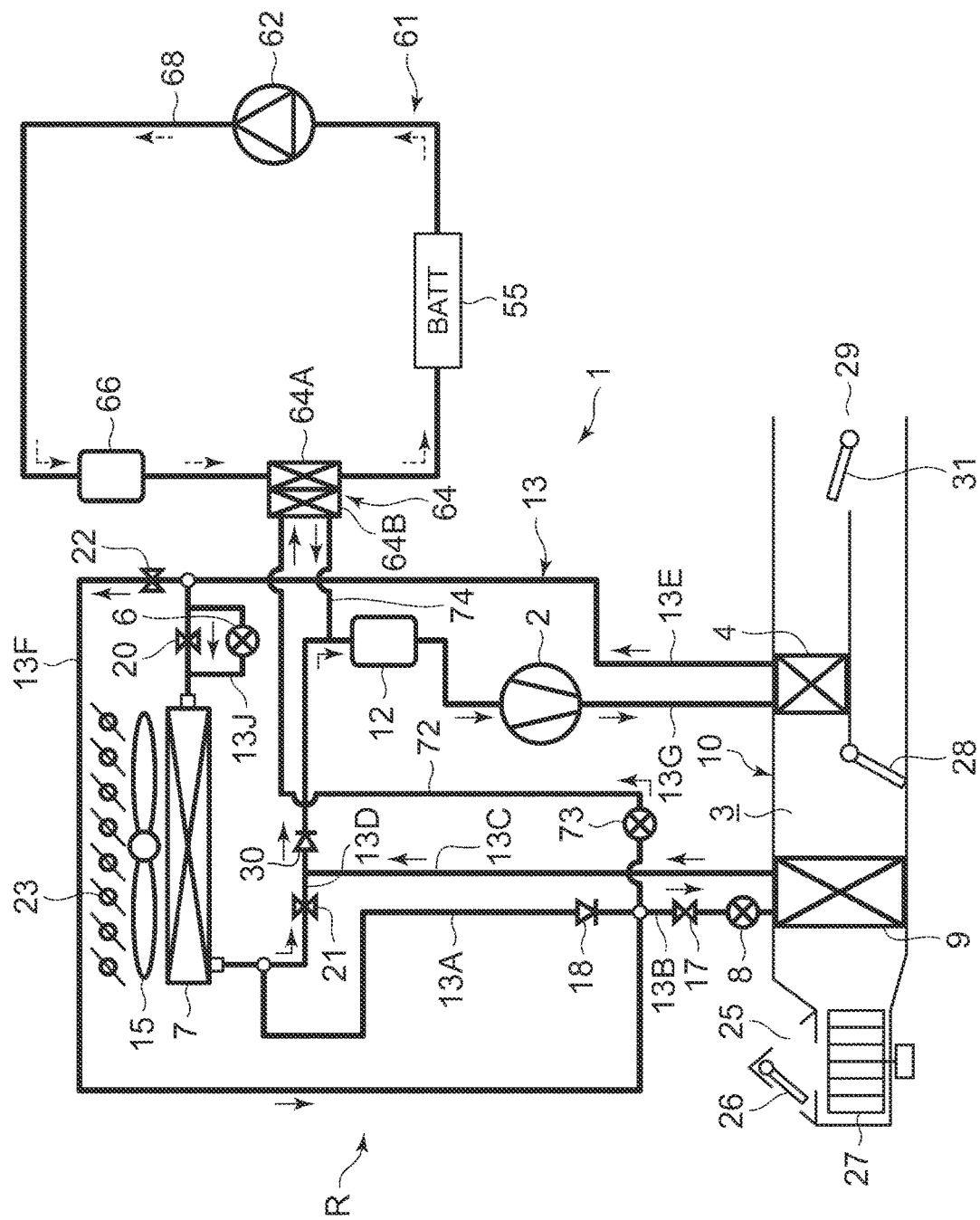
FIG. 33 is a diagram describing a dehumidification heating/battery cooling mode by the controller of FIG. 2.
Figure 34:
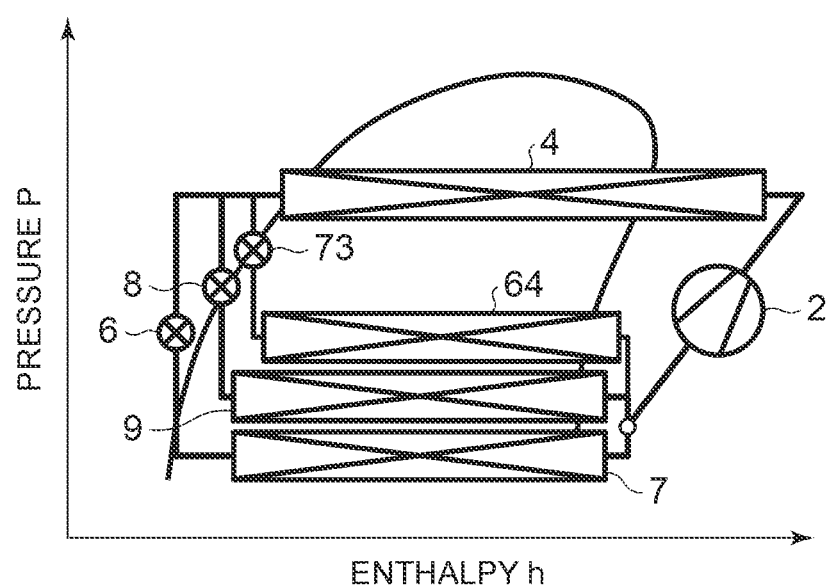
FIG. 34 is a p-h diagram of the dehumidification heating/battery cooling mode of FIG. 33.

Next, when the battery temperature Tb rises due to the charging/discharging or the like and becomes higher than the target battery temperature TBO during the aforementioned dehumidifying and heating operation (TBO<Tb), in the embodiment, the controller 32 opens the auxiliary expansion valve 73 and operates the battery temperature adjustment device 61 to start the cooling of the battery 55, thereby executing the dehumidification heating/battery cooling mode (FIGS. 33 and 34).

In the dehumidification heating/battery cooling mode, the controller 32 has a state of in the state of the refrigerant circuit R in the aforementioned dehumidifying and heating operation of FIG. 5, opening the auxiliary expansion valve 73 to control its valve position, and also operating the circulating pump 62 of the battery temperature adjustment device 61 to exchange the heat between the refrigerant and the heat medium in the refrigerant-heat medium heat exchanger 64. FIG. 33 shows the flow (solid line arrows) of the refrigerant of the refrigerant circuit R in this dehumidification heating/battery cooling mode, and the flow (broken line arrows) of the heat medium of the battery temperature adjustment device 61. FIG. 34 shows a p-h diagram of the refrigerant circuit R in the dehumidification heating/battery cooling mode (in FIG. 34, each constituent device of the refrigerant circuit R is shown on the p-h diagram).

Thus, a part of the condensed refrigerant flowing out from the radiator 4 is distributed, and the so-distributed refrigerant flows through the solenoid valve 22 into the refrigerant pipe 13F and flows out from the refrigerant pipe 13F. A part of the refrigerant flows from the refrigerant pipe 13B to the indoor expansion valve 8, and the residual refrigerant flows into the outdoor expansion valve 6. That is, the part of the distributed refrigerant is decompressed in the indoor expansion valve 8, and then flows into the heat absorber 9 to evaporate. The water in the air blown out from the indoor blower 27 coagulates to adhere to the heat absorber 9 by the heat absorbing operation of the refrigerant which occurs in the heat absorber 9 at this time. Hence, the air is cooled and dehumidified. The air dehumidified in the heat absorber 9 is reheated in the process of passing the radiator 4, whereby the dehumidifying and heating of the vehicle interior are performed. Further, the residual condensed refrigerant flowing out from the radiator 4 is decompressed in the outdoor expansion valve 6, and then evaporates in the outdoor heat exchanger 7 and absorbs heat from the outdoor air.

On the other hand, the residual refrigerant flowing out from the refrigerant pipe 13F flows into the branch pipe 72 and is decompressed in the auxiliary expansion valve 73, and then evaporates in the refrigerant flow passage 64B of the refrigerant-heat medium heat exchanger 64. Since the refrigerant absorbs heat from the heat medium circulated in the battery temperature adjustment device 61 here, the battery 55 is cooled in the same manner as described above. Incidentally, the refrigerant flowing out from the heat absorber 9 is sucked into the compressor 2 through the refrigerant pipe 13C and the accumulator 12. The refrigerant flowing out from the outdoor heat exchanger 7 is sucked into the compressor 2 through the refrigerant pipe 13D, the solenoid valve 21, the refrigerant pipe 13C, and the accumulator 12. The refrigerant flowing out from the refrigerant-heat medium heat exchanger 64 is also sucked from the refrigerant pipe 74 to the compressor 2 through the accumulator 12.

(8-9) Battery Cooling Single Mode

Figure 35:
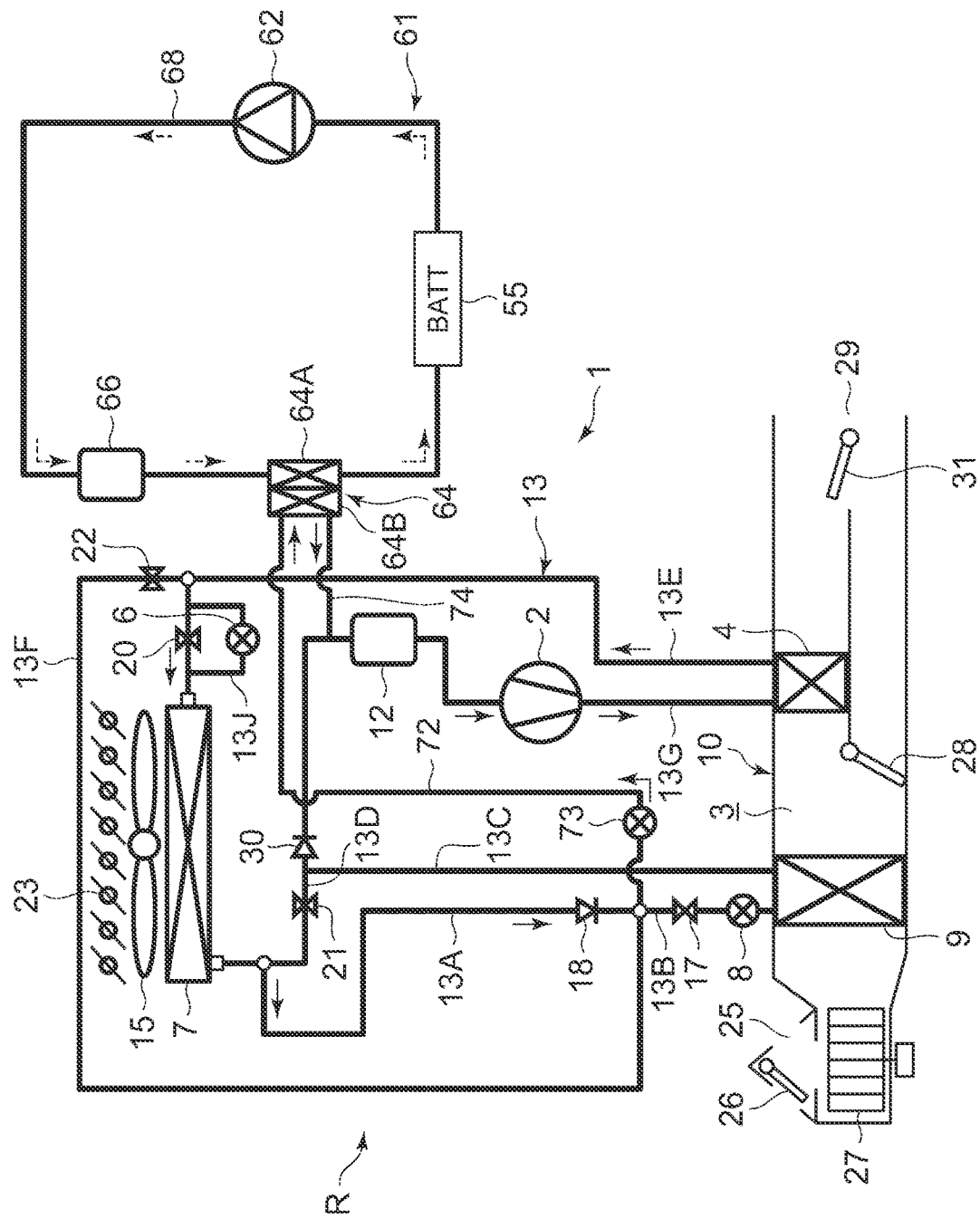
FIG. 35 is a diagram describing a battery cooling single mode by the controller of FIG. 2.
Figure 36:
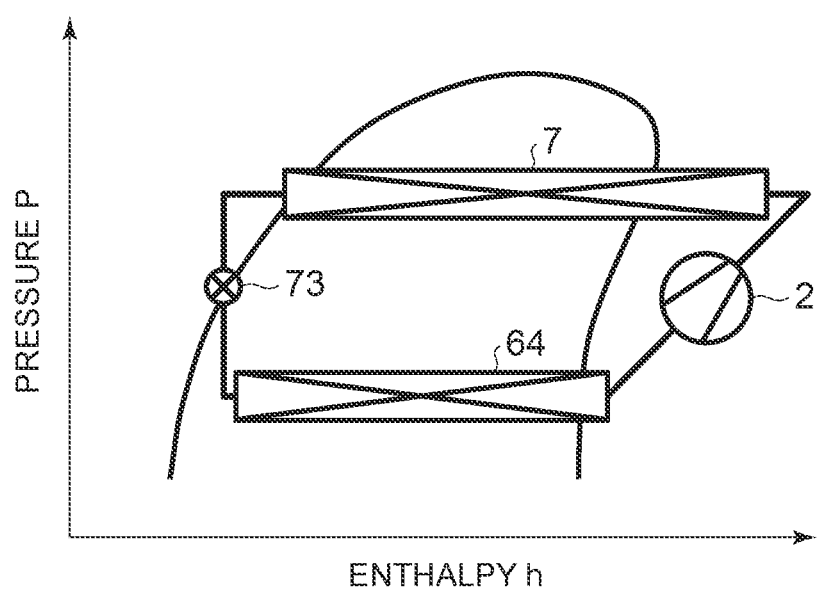
FIG. 36 is a p-h diagram of the battery cooling single mode of FIG. 35.

Next, when in the case such as when the vehicle is stopped and the battery 55 is charged, or the like, the battery temperature Tb rises due to its self-heat generation or the like and becomes higher than the target battery temperature TBO (TBO<Tb), in the embodiment, the controller 32 executes the battery cooling single mode (FIG. 35 and FIG. 36). Since there are no passengers in the vehicle interior in this battery cooling single mode, there is no need to air-condition the vehicle interior, but the controller 32 operates the compressor 2 and operates the outdoor blower 15 as well. Further, the controller opens the solenoid valve 20 and opens even the auxiliary expansion valve 73 to decompress the refrigerant.

Further, the controller 32 closes the solenoid valve 17, the solenoid valve 21, and the solenoid valve 22, and stops the indoor blower 26 as well. Then, the controller 32 has a state of operating the circulating pump 62 and exchanging the heat between the refrigerant and the heat medium in the refrigerant-heat medium heat exchanger 64. FIG. 35 shows the flow (solid line arrows) of the refrigerant of the refrigerant circuit R in this battery cooling single mode, and the flow (broken line arrows) of the heat medium of the battery temperature adjustment device 61. FIG. 36 shows a p-h diagram of the refrigerant circuit R in the battery cooling single mode (in FIG. 36, each constituent device of the refrigerant circuit R is shown on the p-h diagram).

Consequently, the high-temperature high-pressure gas refrigerant discharged from the compressor 2 reaches from the refrigerant pipe 13E to the outdoor expansion valve 6 through the radiator 4. Since the solenoid valve 20 is opened at this time, the refrigerant passes the refrigerant pipe 13J through the solenoid valve 20 and flows into the outdoor heat exchanger 7 as it is, and is cooled by the outdoor air passed through the outdoor blower 15 and then condensed and liquefied. When the formed frost is grown in the outdoor heat exchanger 7, the outdoor heat exchanger 7 is defrosted by the heat absorbing operation at this time.

Since the refrigerant flowing out from the outdoor heat exchanger 7 enters the refrigerant pipe 13A, but the solenoid valve 17 is closed at this time, all the refrigerant flowing out from the outdoor heat exchanger 7 flows through the branch pipe 72 to reach the auxiliary expansion valve 73. After the refrigerant is decompressed in the auxiliary expansion valve 73, the refrigerant flows into the refrigerant flow passage 64B of the refrigerant-heat medium heat exchanger 64 to evaporate. A heat absorbing operation is exerted at this time. A circulation is repeated in which the refrigerant evaporated in the refrigerant flow passage 64B flows through the refrigerant pipe 74, the refrigerant pipe 13C, and the accumulator 12 successively, and is sucked into the compressor 2 (this is indicated by the solid line arrows in FIG. 35).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed by the refrigerant evaporated in the refrigerant flow passage 64B, whereby the heat medium is cooled. A circulation is repeated in which the heat medium cooled by the heat absorbing operation of the refrigerant flows out from the refrigerant-heat medium heat exchanger 64 to reach the battery 55, and cools the battery 55 and is then sucked into the circulating pump 62. The controller 32 controls the operation of the compressor 2 and the circulating pump 62 on the basis of, for example, the battery temperature Tb detected by the battery temperature sensor 76 and the target battery temperature TBO.

Embodiment 2

Figure 37:
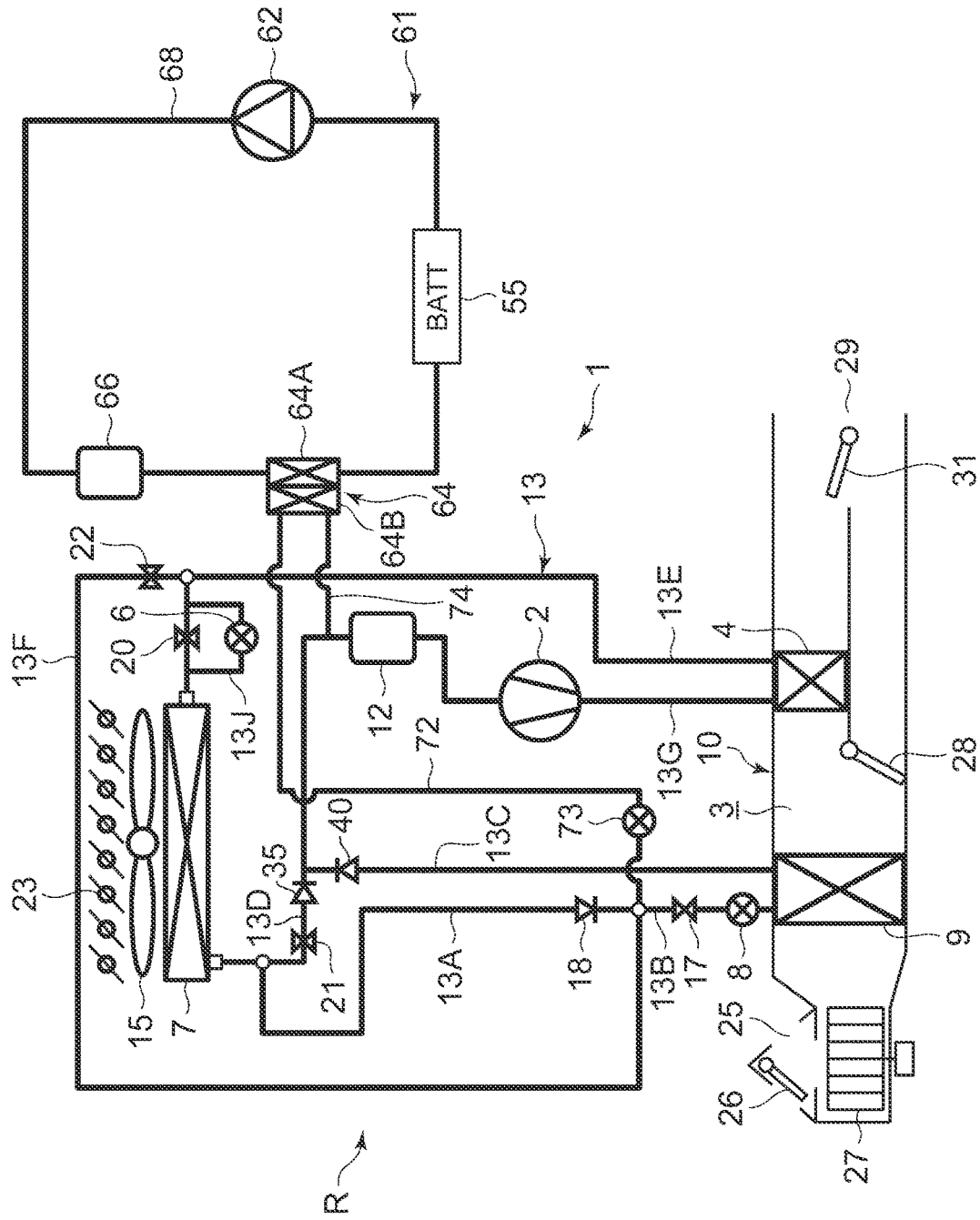
FIG. 37 is a constitutional view of a vehicular air conditioner of another embodiment to which the present invention is applied (Embodiment 2)

Next, FIG. 37 shows a constitutional view of another embodiment of a vehicular air conditioner 1 of the present invention. In the present embodiment, the check valve 30 of FIG. 1 is not provided, and instead, a check valve 35 is provided in the refrigerant pipe 13D (the first refrigerant pipe), and a check valve 40 is provided in the refrigerant pipe 13C (the second refrigerant pipe) before joining the refrigerant pipe 13D (and before the refrigerant pipe 74 is connected). Then, the respective check valves 35 and 40 are constituted so that the flow to the accumulator 12 (the compressor 2) serves as a forward direction. Other constitutions and operations are similar to the case (embodiment 1) of FIG. 1.

Even by provision of the check valves 35 and 40 in the refrigerant pipes 13D and 13C respectively as in the present embodiment, the refrigerant reversely flowing into the outdoor heat exchanger 7 and the heat absorber 9 can be blocked by them, thereby making it possible to achieve an effect similar to the effect in the case of the aforementioned embodiment 1.

Embodiment 3

Figure 38:
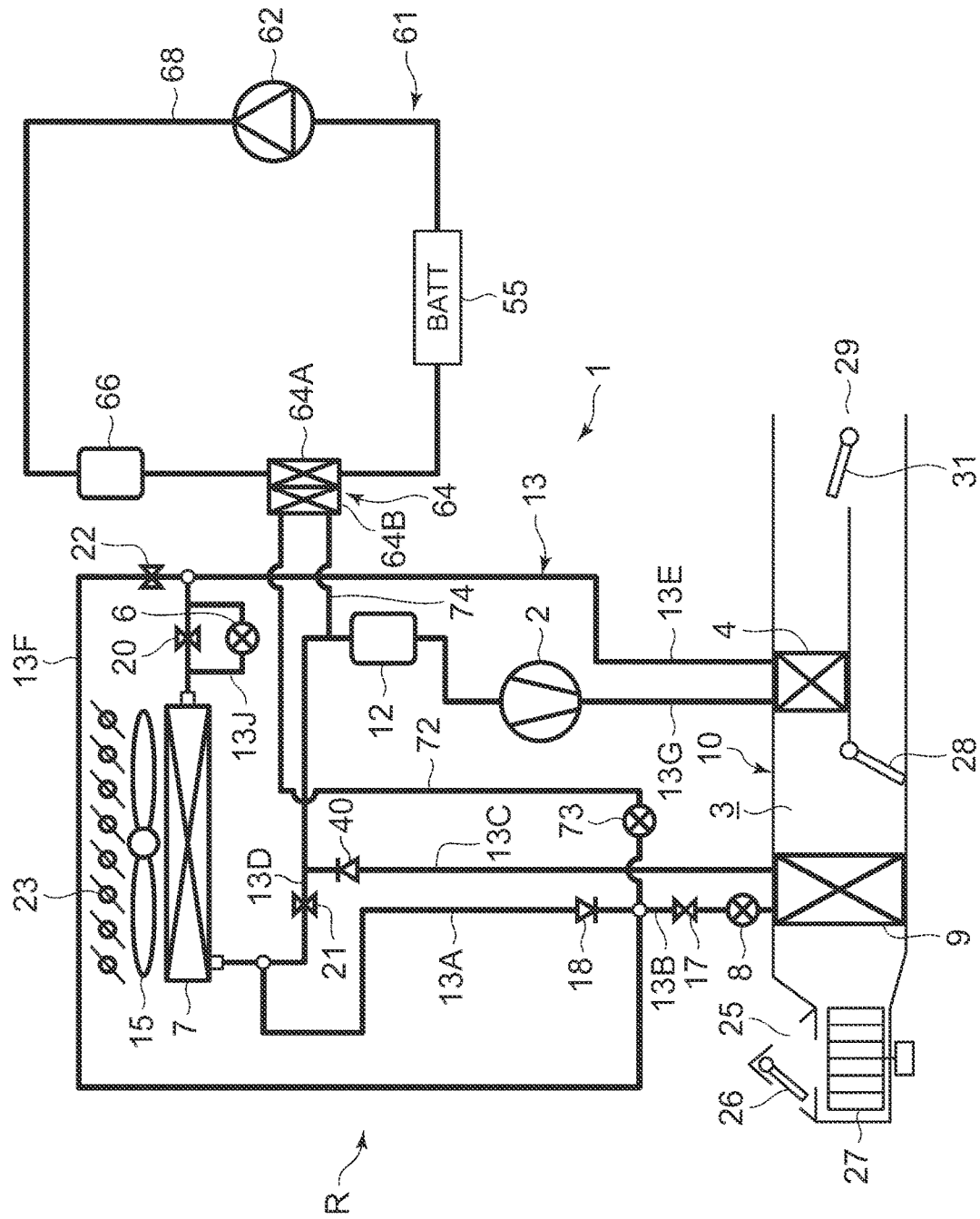
FIG. 38 is a constitutional view of a vehicular air conditioner of a further embodiment to which the present invention is applied (Embodiment 3)

Next, FIG. 38 shows a constitutional view of a further embodiment of a vehicular air conditioner 1 of the present invention. In the present embodiment, the check valve 35 of FIG. 37 is eliminated, and only the check valve 40 is provided in the refrigerant pipe 13C (the second refrigerant pipe) before joining the refrigerant pipe 13D (and before the refrigerant pipe 74 is connected). Then, similarly, the check valve 40 is constituted so that the flow to the accumulator 12 (the compressor 2) serves as a forward direction. Other constitutions are similar to the case (embodiment 2) of FIG. 37.

(9) Second Heating/Battery Cooling Mode (First Operation Mode) in Case of Constitution of FIG. 38 (Embodiment 3)

Figure 39:
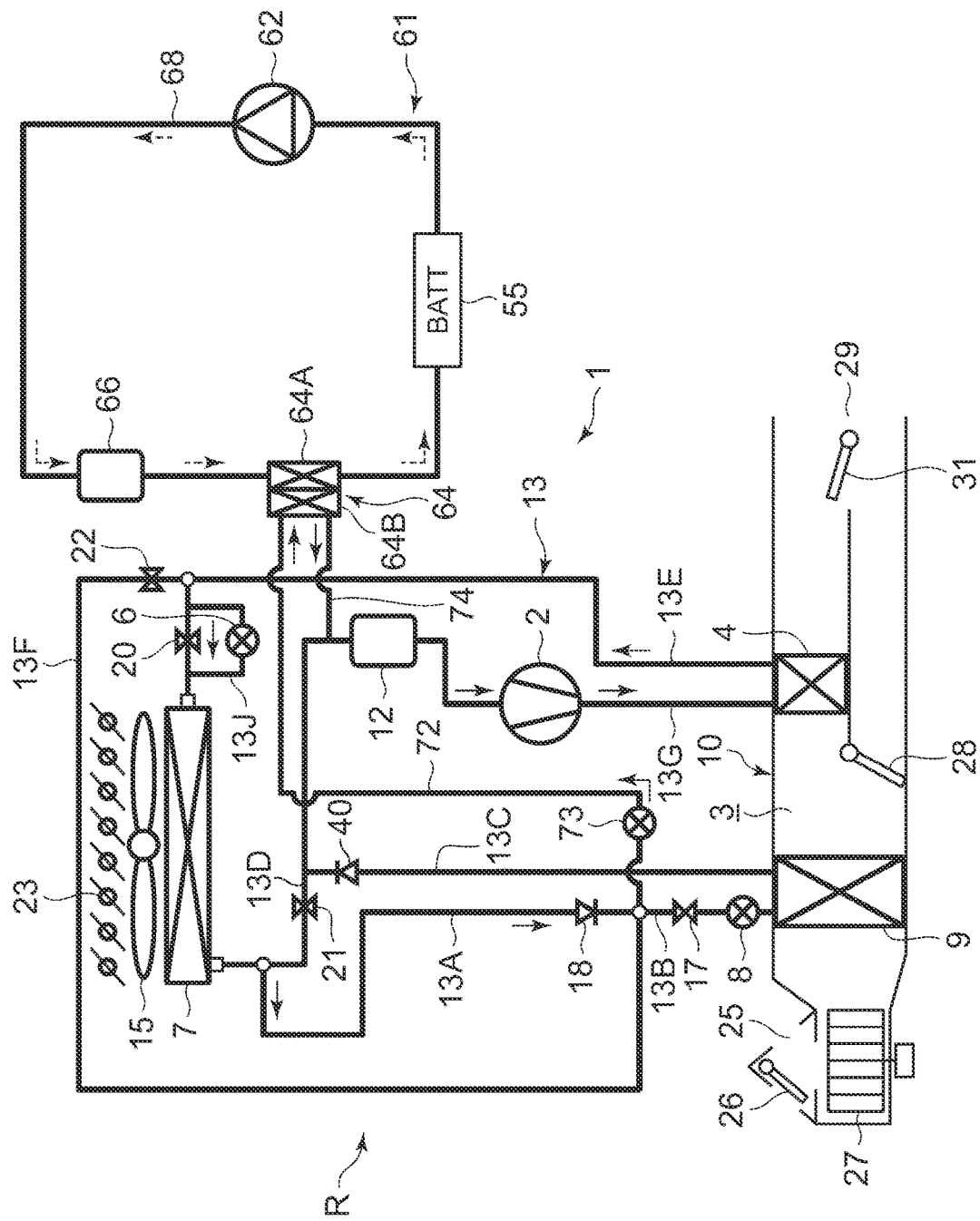
FIG. 39 is a diagram describing a second heating/battery cooling mode in the vehicular air conditioner of FIG. 38.

Even in the case of the present embodiment, an operation similar to that in the case of the aforementioned embodiment (embodiment 1) is performed. In particular, the flow of the refrigerant in the second heating/battery cooling mode (the first operation mode) in the constitution of FIG. 38 is shown in FIG. 39. Even in the present embodiment (embodiment 3), the reverse inflow of the refrigerant into the heat absorber 9 can be obstructed by the check valve 40 in the second heating/battery cooling mode in which no refrigerant flows into the heat absorber 9.

Further, when the heating load of the vehicle interior by the radiator 4 and the cooling load of the battery 55 by the refrigerant-heat medium heat exchanger 64 are balanced, the shutter 23 is closed to reduce the radiation capability in the outdoor heat exchanger 7, or the valve position of the outdoor expansion valve 6 is adjusted to set the temperature of the outdoor heat exchanger 7 to be almost equal to the outdoor air temperature, whereby the reverse inflow of the refrigerant into the outdoor heat exchanger 7 can also be prevented.

(10) Third Heating/Battery Cooling Mode (Second Operation Mode) in Case of Constitution of FIG. 38 (Embodiment 3)

Figure 40:
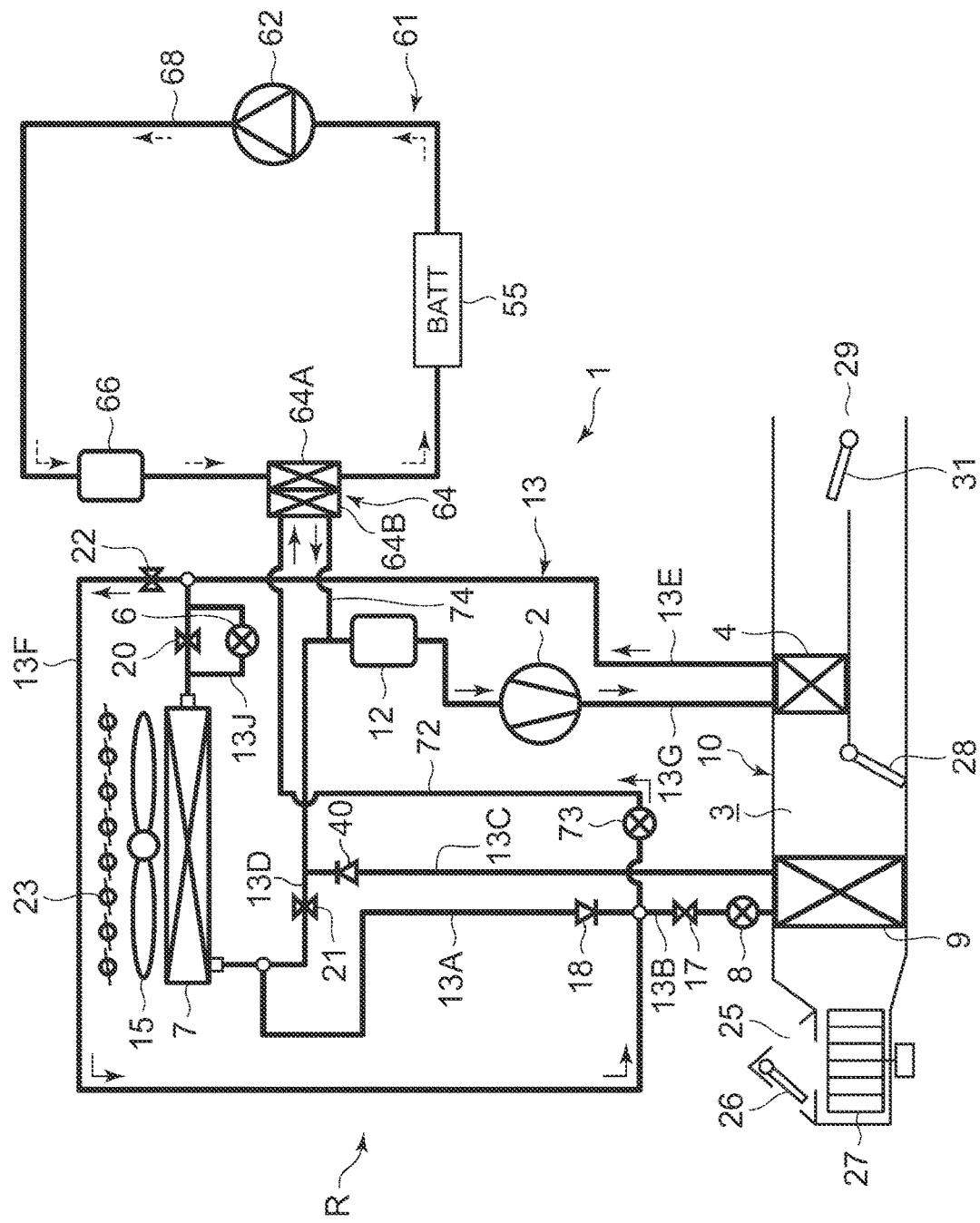
FIG. 40 is a diagram describing a third heating/battery cooling mode in the vehicular air conditioner of FIG. 38.

On the other hand, the flow of the refrigerant in the third heating/battery cooling mode (the second operation mode) in the constitution of FIG. 38 is shown in FIG. 40. In the present embodiment (embodiment 3), since no check valve is disposed in the refrigerant pipe 13D, it becomes difficult to obstruct the reverse inflow of the refrigerant into the outdoor heat exchanger 7 in the third heating/battery cooling mode in which the refrigerant does not flow into the outdoor heat exchanger 7. In that case, however, if the shutter 23 is closed as shown in FIG. 40 to obstruct the inflow of running wind into the outdoor heat exchanger 7, and the refrigerant pressure of the outdoor heat exchanger 7 is raised, the reverse inflow of the refrigerant into the outdoor heat exchanger 7 can also be obstructed.

Incidentally, when the battery temperature Tb becomes lower than the aforementioned appropriate temperature range under a low-temperature environment, the battery 55 is reduced in charging/discharging performance, but in the embodiment, the heat medium heating heater 66 is provided in the battery temperature adjustment device 61. Hence, when the battery temperature Tb is lowered than the above appropriate temperature range, the controller 32 allows the heat medium heating heater 66 to generate heat to heat the heat medium circulated through the battery 55. Consequently, the battery temperature Tb is raised to be maintained at the appropriate temperature range. However, it is to be noted that in that case, the controller 32 fully closes the auxiliary expansion valve 73 to prevent the refrigerant from being circulated in the refrigerant-heat medium heat exchanger 64.

Further, the constitutions of the refrigerant circuit R and the battery temperature adjustment device 61 described in each embodiment mentioned above are not limited thereto, and are needless to say changeable within the scope not departing from the gist of the present invention.

DESCRIPTION OF REFERENCE NUMERALS 1 vehicular air conditioner
2 compressor
3 air flow passage
4 radiator
6 outdoor expansion valve
7 outdoor heat exchanger
8 indoor expansion valve (valve device)
9 heat absorber
13C refrigerant pipe (second refrigerant pipe, third refrigerant pipe)
13D refrigerant pipe (first refrigerant pipe)
13F refrigerant pipe (bypass circuit)
17 solenoid valve (valve device)
18 check valve (another check valve)
21 solenoid valve (first solenoid valve)
22 solenoid valve (second solenoid valve)
23 shutter
30, 35, 40 check valve
32 controller (control device)
55 battery
61 battery temperature adjustment device
62 circulating pump
64 refrigerant-heat medium heat exchanger
66 heat medium heating heater
72 branch pipe (branch circuit)
73 auxiliary expansion valve
R refrigerant circuit.

The invention claimed is:

1. A vehicular air conditioner which conditions air of a vehicle interior, comprising:
a compressor to compress a refrigerant;
an air flow passage through which the air to be supplied to the vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger disposed outside the vehicle interior to let the refrigerant absorb or radiate heat;
a battery temperature adjustment device to let a heat medium circulate, thereby adjusting a temperature of a battery mounted in a vehicle; and
a control device,
wherein the battery temperature adjustment device has a refrigerant-heat medium heat exchanger to perform exchange of heat between the refrigerant and the heat medium, and returns the refrigerant flowing out from the refrigerant-heat medium heat exchanger to a suction side of the compressor,
wherein the vehicular air conditioner includes a check valve which obstructs the flow of the refrigerant flowing out from the refrigerant-heat medium heat exchanger and directed toward the outdoor heat exchanger and/or the heat absorber, and
wherein the control device executes a first operation mode to let the refrigerant discharged from the compressor to radiate heat in the radiator and the outdoor heat exchanger, decompress the refrigerant from which the heat has been radiated, and then let the refrigerant absorb heat in the refrigerant-heat medium heat exchanger.

2. A vehicular air conditioner which conditions air of a vehicle interior, comprising:
a compressor to compress a refrigerant;
an air flow passage through which the air to be supplied to the vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger disposed outside the vehicle interior to let the refrigerant absorb or radiate heat;
a battery temperature adjustment device to let a heat medium circulate, thereby adjusting a temperature of a battery mounted in a vehicle; and
a control device,
wherein the battery temperature adjustment device has a refrigerant-heat medium heat exchanger to perform exchange of heat between the refrigerant and the heat medium, and returns the refrigerant flowing out from the refrigerant-heat medium heat exchanger to a suction side of the compressor,
wherein the vehicular air conditioner includes a check valve which obstructs the flow of the refrigerant flowing out from the refrigerant-heat medium heat exchanger and directed toward the outdoor heat exchanger and/or the heat absorber, and
wherein the control device executes a second operation mode to obstruct inflow of the refrigerant into the outdoor heat exchanger, let the refrigerant discharged from the compressor to radiate heat in the radiator, decompress the refrigerant from which the heat has been radiated, and then let the refrigerant absorb heat only in the refrigerant-heat medium heat exchanger.

3. A vehicular air conditioner which conditions air of a vehicle interior, comprising:
a compressor to compress a refrigerant;
an air flow passage through which the air to be supplied to the vehicle interior flows;
a radiator to let the refrigerant radiate heat, thereby heating the air to be supplied from the air flow passage to the vehicle interior;

a heat absorber to let the refrigerant absorb heat, thereby cooling the air to be supplied from the air flow passage to the vehicle interior;
an outdoor heat exchanger disposed outside the vehicle interior to let the refrigerant absorb or radiate heat;
a battery temperature adjustment device to let a heat medium circulate, thereby adjusting a temperature of a battery mounted in a vehicle; and
a control device,
wherein the vehicular air conditioner including:
a first refrigerant pipe into which the refrigerant flowing out from the outdoor heat exchanger flows,
a second refrigerant pipe into which the refrigerant flowing out from the heat absorber flows,
a third refrigerant pipe to let a joining point between the first refrigerant pipe and the second refrigerant pipe, and the suction side of the compressor communicate with each other, and
a check valve disposed in the third refrigerant pipe,
wherein the check valve lets the flow of the refrigerant toward the compressor serve as a forward direction,
wherein the battery temperature adjustment device has a refrigerant-heat medium heat exchanger to perform exchange of heat between the refrigerant and the heat medium, and
wherein the refrigerant flowing out from the refrigerant-heat medium heat exchanger is returned between the check valve and the compressor.

4. A vehicular air conditioner which conditions air of a vehicle interior, comprising:
a compressor to compress a refrigerant;
an air flow passage through which the air to be supplied to the vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger disposed outside the vehicle interior to let the refrigerant absorb or radiate heat;
a battery temperature adjustment device to let a heat medium circulate, thereby adjusting a temperature of a battery mounted in a vehicle; and
a control device,
wherein the vehicular air conditioner including:
a first refrigerant pipe into which the refrigerant flowing out from the outdoor heat exchanger flows,
a second refrigerant pipe into which the refrigerant flowing out from the heat absorber flows,
wherein the first refrigerant pipe and the second refrigerant pipe communicate with the suction side of the compressor,
wherein the vehicular air conditioner includes check valves disposed in each of the first refrigerant pipe and the second refrigerant pipe, and each check valve lets the flow of the refrigerant toward the compressor serve as a forward direction,
wherein the battery temperature adjustment device has a refrigerant-heat medium heat exchanger to perform exchange of heat between the refrigerant and the heat medium, and
wherein the refrigerant flowing out from the refrigerant-heat medium heat exchanger is returned between each of the check valves and the compressor.

5. A vehicular air conditioner which conditions air of a vehicle interior, comprising:
a compressor to compress a refrigerant;
an air flow passage through which the air to be supplied to the vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger disposed outside the vehicle interior to let the refrigerant absorb or radiate heat;
a battery temperature adjustment device to let a heat medium circulate, thereby adjusting a temperature of a battery mounted in a vehicle; and
a control device,
wherein the vehicular air conditioner including:
a first refrigerant pipe into which the refrigerant flowing out from the outdoor heat exchanger flows,
a second refrigerant pipe into which the refrigerant flowing out from the heat absorber flows,
wherein the first refrigerant pipe and the second refrigerant pipe communicate with the suction side of the compressor,
wherein the vehicular air conditioner includes a check valve disposed in f the second refrigerant pipe, and the check valve lets the flow of the refrigerant toward the compressor serve as a forward direction,
wherein the battery temperature adjustment device has a refrigerant-heat medium heat exchanger to perform exchange of heat between the refrigerant and the heat medium, and
wherein the refrigerant flowing out from the refrigerant-heat medium heat exchanger is returned between the check valve and the compressor.

6. The vehicular air conditioner according to claim 5, including a shutter to obstruct the inflow of running wind into the outdoor heat exchanger,
wherein the control device executes a second operation mode to obstruct the inflow of the refrigerant into the outdoor heat exchanger, let the refrigerant discharged from the compressor radiate heat in the radiator, decompress the refrigerant from which the heat has been radiated, and then let the refrigerant absorb heat only in the refrigerant-heat medium heat exchanger, and
wherein when the second operation mode is executed, the control device obstructs the inflow of the running wind into the outdoor heat exchanger by the shutter.

7. A vehicular air conditioner which conditions air of a vehicle interior, comprising:
a compressor to compress a refrigerant;
an air flow passage through which the air to be supplied to the vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger disposed outside the vehicle interior to let the refrigerant absorb or radiate heat;

a battery temperature adjustment device to let a heat medium circulate, thereby adjusting a temperature of a battery mounted in a vehicle; and a control device, wherein the battery temperature adjustment device has a refrigerant-heat medium heat exchanger to perform exchange of heat between the refrigerant and the heat medium, and returns the refrigerant flowing out from the refrigerant-heat medium heat exchanger to a suction side of the compressor, wherein the vehicular air conditioner includes a check valve which obstructs the flow of the refrigerant flowing out from the refrigerant-heat medium heat exchanger and directed toward the outdoor heat exchanger and/or the heat absorber, wherein the vehicular air conditioner further including:

an outdoor expansion valve to decompress the refrigerant flowing out from the radiator and flowing into the outdoor heat exchanger, a valve device to control the inflow of the refrigerant into the heat absorber, a first refrigerant pipe to let the refrigerant flowing out from the outdoor heat exchanger suck into the compressor without flowing into the valve device, a first solenoid valve disposed in the first refrigerant pipe, a bypass circuit to distribute the refrigerant flowing out from the radiator from a refrigerant upstream side of the outdoor expansion valve to let the refrigerant flow to a refrigerant upstream side of the valve device, a second solenoid valve disposed in the bypass circuit, a branch circuit to let the refrigerant flowing out from the bypass circuit flow into the refrigerant-heat medium heat exchanger, an auxiliary expansion valve disposed in the branch circuit to decompress the refrigerant flowing into the refrigerant-heat medium heat exchanger, and another check valve to obstruct the flow of the refrigerant flowing out from the bypass circuit and directed toward the outdoor heat exchanger, wherein the control device opens the outdoor expansion valve, closes the first solenoid valve, the second solenoid valve, and the valve device, decompresses the refrigerant flowing into the refrigerant-heat medium heat exchanger by the auxiliary expansion valve, and controls the battery temperature adjustment device to thereby execute a first operation mode to let the refrigerant discharged from the compressor radiate heat in the radiator and the outdoor heat exchanger, decompress the refrigerant from which the heat has been radiated, and then let the refrigerant absorb heat in the refrigerant-heat medium heat exchanger, or opens the second solenoid valve, closes the outdoor expansion valve, the first solenoid valve, and the valve device, decompresses the refrigerant flowing into the refrigerant-heat medium heat exchanger by the auxiliary expansion valve, and controls the battery temperature adjustment device to thereby execute a second operation mode to obstruct inflow of the refrigerant into the outdoor heat exchanger, let the refrigerant discharged from the compressor radiate heat in the radiator, decompress the refrigerant from which the heat has been radiated, and then let the refrigerant absorb heat only in the refrigerant-heat medium heat exchanger, or executes by switching between the first operation mode and the second operation mode.

* * * * *